United States Patent [19]

Mukaida

[11] Patent Number: 5,802,021

[45] Date of Patent: Sep. 1, 1998

[54] DISC RECORDING AND/OR REPRODUCING APPARATUS AND DISC RECORDING MEDIA EXCHANGE APPARATUS

[75] Inventor: Kumio Mukaida, Saitama, Japan

[73] Assignee: Sony Corporation, Tokyo, Japan

[21] Appl. No.: 917,042

[22] Filed: Aug. 19, 1997

Related U.S. Application Data

[63] Continuation of Ser. No. 549,669, Nov. 30, 1995, abandoned.

[30] Foreign Application Priority Data

Apr. 14, 1994 [JP] Japan .................. 6-099112

[51] Int. Cl.$^6$ .................................. G11B 17/22
[52] U.S. Cl. .................. 369/34; 369/36; 369/178
[58] Field of Search ...................... 369/34, 36, 38, 369/75.2, 77.1, 178, 191, 192, 194

[56] References Cited

U.S. PATENT DOCUMENTS

| | | | |
|---|---|---|---|
| 4,796,244 | 1/1989 | Tsuruta et al. | 369/38 |
| 4,845,700 | 7/1989 | Koizumi et al. | 369/75.2 |
| 4,949,324 | 8/1990 | Arata | 369/36 |
| 5,063,553 | 11/1991 | Suzuki | 369/77.1 |
| 5,123,001 | 6/1992 | Nakamichi et al. | 369/36 |
| 5,140,579 | 8/1992 | Suzuki et al. | 369/77.1 |
| 5,245,602 | 9/1993 | Ikedo et al. | 369/75.2 |
| 5,282,183 | 1/1994 | Arifuku et al. | 369/36 |
| 5,327,412 | 7/1994 | Lee | 369/75.2 |
| 5,329,516 | 7/1994 | Hoshi et al. | 369/77.1 |
| 5,384,760 | 1/1995 | Kumakura | 369/38 |

FOREIGN PATENT DOCUMENTS 0563927  10/1993  European Pat. Off.

*Primary Examiner*—Stuart S. Levy
*Assistant Examiner*—William J. Klimowicz
*Attorney, Agent, or Firm*—Jay H. Maioli

[57] ABSTRACT

A disc recording and/or reproducing apparatus adapted for selectively taking out discs accommodated within an accommodating unit to carry out recording and/or reproduction of information signals has an accommodating unit disposed at the front side within the apparatus body and within which a plurality of trays on which discs are respectively mounted are accommodated in parallel relation. A taking-out mechanism selectively draws out any one of a plurality of trays accommodated within the accommodating unit to take out the disc mounted on the tray. A recording and/or reproducing unit carries out recording and/or reproduction of information signals with respect to the disc which has been taken out by the taking-out mechanism toward the backward side within the apparatus body. An eject mechanism selectively draws out the remaining trays accommodated within the accommodating unit in an external direction of the apparatus body. A control independently drives and controls the eject mechanism and the taking-out mechanism. The taking-out mechanism selectively draws out trays from the accommodating unit, and the eject mechanism selectively draws out trays in an external direction of the apparatus body. This enables eject operation of any other tray even if information signals are being recorded on or reproducted from the disc.

26 Claims, 33 Drawing Sheets

DISC RECORDING AND/OR REPRODUCING APPARATUS AND DISC RECORDING MEDIA EXCHANGE APPARATUS

This is a continuation of application Ser. No. 08/549,669, filed as PCT/JP95/00734, Apr. 14, 1995, published as WO95/28710, Oct. 26, 1995, now abandoned.

TECHNICAL FIELD

This invention relates to a disc recording and/or reproducing apparatus using, as a recording medium, disc-shaped recording media like optical discs, and more particularly to a disc recording and/or reproducing apparatus adapted for selectively taking out a plurality of disc-shaped recording media accommodated within an accommodating unit to load the recording medium thus taken out onto a recording and/or reproducing unit to carry out recording and/or reproduction of information signals, and an exchanging apparatus for disc-shaped recording media, which is adapted for selectively taking out a plurality of disc-shaped recording media accommodated within an accommodating unit to allow the recording medium thus taken out to undergo loading onto a recording and/or reproducing unit.

BACKGROUND ART

Hitherto, there have been used disc players having a disc exchange function, which are adapted to accommodate a plurality of disc-shaped recording media, e.g., optical discs in a multi-stop form within an accommodating unit provided within the player body to selectively take out an arbitrary one of optical discs accommodated within the accommodating unit to allow it to undergo loading onto a disc driving unit (disc drive) to carry out reproduction of information signals such as music signals, etc. recorded on the optical disc.

As the disc player of this kind, some disc players are of a structure in which, within the player body, an accommodating unit for accommodating, in a multi-step form, a plurality of trays on which optical disc can be mounted so that they are stacked and a loading mechanism for loading the optical disc mounted on the tray onto the disc driving unit are disposed. The accommodating unit for disc player is movably supported in a stacking direction of the accommodated trays, and is adapted to undergo vertical movement operation in upper and lower directions which are the stacking direction of the tray so that an arbitrary tray is opposed to the loading mechanism. Further, the tray accommodated within the accommodating unit, which has been opposed to the loading mechanism, is drawn out in a horizontal direction from the accommodating unit by the loading mechanism. The tray thus drawn out is carried (transferred) to the disc drive side disposed within the player body when the loading mechanism is subjected to vertical movement operation in upper and lower directions perpendicular to the drawing-out direction of the tray. When the tray is carried to the disc drive side, the optical disc mounted on the tray is mounted (loaded) on the disc table of the disc drive. Further, when the disc drive is driven, reproduction of information signals recorded on the optical disc mounted (loaded) on the disc drive is carried out.

In addition, the loading mechanism provided at the above-described disc player has an eject function to draw out in an outward direction of the player body, the tray drawn out from the accommodating unit. Thus, with respect to the tray drawn out outwardly of the player body, exchange of the optical disc mounted on the tray can be carried out. Accordingly, it is possible to desirably exchange optical discs accommodated within the accommodating unit in the state mounted on respective trays.

Meanwhile, in the above-described disc player, at a time period during which the optical disc is mounted (loaded) on the disc drive and reproduction of the optical disc is being carried out, it is impossible to draw out, in an outward direction of the player body, any other tray accommodated within the accommodating unit to carry out exchange of the optical disc mounted on the tray.

This is because the loading mechanism disposed at the disc player cannot execute, at the same time, loading operation for loading an optical disc mounted on the train drawn out from the accommodating unit onto the disc driving unit and eject operation for drawing out, in an outward direction of the player body, any other tray accommodated within the accommodating unit. In view of the above, it is conceivable to provide two sets of loading mechanisms in order to permit the loading operation and the eject operation to be carried out at the same time in parallel. However, since an arbitrary tray is opposed to the loading mechanism, it is necessary to carry out vertical movement operation of one accommodating unit within which trays are accommodated. For this reason, it is impossible to execute at the same time the loading operation and eject operation.

Meanwhile, in disc players provided with an accommodating unit with in which a plurality of trays on which optical discs are respectively mounted are accommodated in a stacked state, there is restriction in the position from which the tray is drawn out outwardly of the player body. Namely, on the front surface side of the player body, an operation unit for selecting the operation of the disc player is disposed, and a display unit for displaying the operating state, or the like is disposed. For this reason, the position where an opening portion for drawing out tray would be restricted. Moreover, in order to select tray drawn out outwardly of the player body, it is necessary to carry out vertical movement operation of the accommodating unit to thereby allow it to be opposite to the loading mechanism. Accordingly, in the state where vertical movement operation of the accommodating unit is unable to be carried out, it is impossible to carry out the eject operation of trays accommodated within the accommodating unit.

Further, there have been used disc players in which a plurality of optical discs are mounted in circumferential direction of a turn table rotationally operated to rotationally operate the turn table to thereby allow an arbitrary optical disc mounted on the turn table to undergo loading onto the disc driving unit, thereby permitting reproduction of a plurality of optical discs in succession. Such disc players are of structure in which even if one optical disc is being reproduced, the turn table is permitted to be drawn out outwardly of the player body. Accordingly, the turn table is desirably drawn out in the outward direction of the player body without undergoing restriction in the operation mode of the disc player, thus permitting exchange of optical disc mounted on the turn table.

However, when attempt is made to allow a larger number of optical discs to be mountable on the turn table, it is necessary to enlarge the turn table. When the turn table is enlarged, the disc player itself including such turn table therewithin is enlarged. For example, in disc players using, as recording medium, an optical disc of diameter of 12 cm, in the case where the turn table is formed to have dimensions such that about three optical discs can be mounted, the disc player can be constituted so as to have dimensions, which are not inconvenient from a viewpoint of practical use, such that it can be mounted on an accommodating cabinet, etc. However, in the case where the turn table is caused to have dimension such that a larger number of optical discs can be mounted, the disc player itself would be enlarged, thus failing to be put to practical use. Namely, the disc player would have dimensions such that it cannot be installed at a predetermined installation place.

DISCLOSURE OF THE INVENTION

An object of this invention is to provide a novel disc recording and/or reproducing apparatus, and a novel disc recording media exchanging apparatus, which can solve the problems with conventionally proposed disc recording and/or reproducing apparatuses such as a disc player, etc. provided with a disc exchange function.

Another object of this invention is to provide a disc-shaped recording media recording and/or reproducing apparatus, and a disc recording media exchanging apparatus such that even at a time period during which a disc-shaped recording medium is loaded onto the recording and/or reproducing unit within the apparatus body and recording and/or reproducing operations are being conducted, the apparatus is adapted to selectively draw out, in an outward direction of the apparatus body, a tray in which any disc recording medium accommodated within the accommodating unit is reproduced, thus permitting exchange of the disc-shaped recording medium mounted on the tray.

A further object of this invention is to provide a disc-shaped recording media recording and/or reproducing apparatus, and a disc recording media exchanging apparatus, which are adapted to precisely select one of a plurality of trays accommodated within the accommodating unit to allow it to undergo loading onto the recording and/or reproducing unit, thus making it possible to securely record and/or reproduce information signals onto or from a desired disc-shaped recording medium.

A further object of this invention is to provide a disc-shaped recording media recording and/or reproducing apparatus, and a disc recording media exchanging apparatus, which permits a tray drawn out in an outward direction of the apparatus body to be securely accommodated at a predetermined accommodating position of the accommodating unit.

A further object of this invention is to provide a disc-shaped recording media recording and/or reproducing apparatus and a disc recording media exchanging apparatus, which can smoothly carry out a series of loading operations to select an arbitrary tray from a plurality of trays accommodated within the accommodating unit to allow the disc-shaped recording medium mounted on the tray to undergo loading onto the recording and/or reproducing unit.

A further object of this invention is to realize a small-sized disc-shaped recording media recording and/or reproducing apparatus, and a small-sized disc recording media exchanging apparatus, which are provided with an accommodating unit adapted so that a plurality of disc recording media are accommodated therewithin.

A disc recording and/or reproducing apparatus according to this invention comprises: an accommodating unit disposed at the front side within the apparatus body and within which a plurality of trays formed so that disc-shaped recording media can be respectively mounted are accommodated in the state where they are in parallel to each other, a taking-out mechanism for selectively drawing out one of the plurality of trays accommodated within the accommodating unit to take out the disc-shaped recording medium mounted on the tray, a recording and/or reproducing unit for carrying out recording and/or reproduction of information signals with respect to the disc-shaped recording medium taken out by the taking-out mechanism to the backward side within the apparatus body, an eject mechanism for selectively taking out, in an outward direction of the apparatus body, the remaining trays accommodated within the accommodating unit, and control means for independently driving and controlling the eject mechanism and the taking-out mechanism. Further, the eject mechanism and the taking-out mechanism are independently driven and controlled by the control unit so that the tray is selectively drawn out from the accommodating unit by the taking-out mechanism and the tray is selectively drawn out toward outward direction of the apparatus body from the accommodating unit by the ejection mechanism.

Moreover, the accommodating unit is caused to undergo vertical movement by the vertical movement mechanism in a direction perpendicular to the plane of the disc-shaped recording medium accommodated within the accommodating unit with respect to the recording and/or reproducing unit so that it oppose an arbitrary tray accommodated within the accommodating unit is caused to be opposed to the taking-out mechanism.

Further, the control unit for independently controlling the eject mechanism and the taking-out mechanism controls the vertical movement mechanism on the basis of a detection signal from a detection unit operated by the vertical movement mechanism for carrying out vertical movement operation of the accommodating unit to allow one tray selected from a plurality of trays accommodated within the accommodating unit to be opposed to the recording and/or reproducing unit.

Further, the disc recording and/or reproducing apparatus according to this invention includes a control unit for controlling respective operations of a position detecting unit for detecting position of the tray accommodated within the accommodating unit, the taking-out mechanism, and the eject mechanism, thus to control the operations of the drawing-out mechanism and the eject mechanism on the basis of a detection signal from the position detecting unit. Moreover, a detection output from the detecting unit operated by the vertical movement mechanism is inputted to the control unit. Further, the control unit controls the vertical movement mechanism on the basis of a detection signal from the detecting unit to allow one tray selected from plural trays accommodated within the accommodating unit to be opposed to the recording and/or reproducing unit.

Furthermore, the disc recording and/or reproducing apparatus according to this invention includes an initial position detecting unit for detecting initial position of the accommodating unit caused to undergo vertical movement operation by the vertical movement mechanism. Prior to starting the recording and/or reproducing operation with respect to the disc-shaped recording medium, the control unit drives the vertical movement mechanism to carry out vertical movement of the accommodating unit to allow the vertical movement mechanism to operate the initial position detecting unit to thereby allow the accommodating unit to be positioned at the initial position.

Moreover, when the tray drawn out in an outward direction of the apparatus body by the eject mechanism is moved toward the inward direction of the apparatus body by the eject mechanism for a second time, detection as to whether or not the disc-shaped recording medium exists on the tray is carried out by a recording medium detecting unit. Thus, secure mounting of the disc-shaped recording medium onto the tray accommodated within the accommodating unit is realized.

A recessed portion is formed at the side surface of the tray accommodated within the accommodating unit, and an engagement projection engaged with the recessed portion is provided at the eject mechanism for carrying out drawing operation of the tray form the accommodating unit. At the time of drawing operation of the tray, the recessed portion of one tray of a plurality of trays accommodated within the accommodating unit and the engagement projection are relatively engaged with each other. Thus, drawing operation of the tray is carried out.

Moreover, a rack gear portion is formed at the side surface of the tray, and a gear which engages with the rack gear portion is provided at the eject mechanism for carrying out drawing operation of the tray from the accommodating unit. At the time of drawing operation of the tray, the rack gear portion and the gear portion of one tray of a plurality of trays accommodated within the accommodating unit are meshed with each other so that drawing operation of the tray is carried out. Teeth of the gear provided at the eject mechanism are such that both side surface portions in a direction perpendicular to the rack gear portion are formed so that they become narrow in width in tapered form.

An exchanging apparatus for disc-shaped recording media according to this invention comprises: an accommodating unit within which a plurality of trays formed so that disc-shaped recording media can be respectively mounted thereon are accommodated in the state where they are in parallel to each other, a loading mechanism for selectively drawing out one of a plurality of trays accommodated within the accommodating unit to take out the disc-shaped recording medium mounted on the tray to allow it to undergo loading onto the recording and/or reproducing unit, an eject mechanism for selectively drawing out, in an outward direction of the apparatus body, the remaining trays accommodated within the accommodating unit, a vertical movement mechanism for allowing the accommodating unit to undergo vertical movement operation with respect to the recording and/or reproducing unit in a direction perpendicular to the plane of the disc-shaped recording medium, and a control unit for controlling the loading mechanism, the eject mechanism, and the vertical movement mechanism. This control unit independently controls the loading mechanism and the eject mechanism, and controls the vertical movement mechanism to allow the loading mechanism to carry out loading of a desired tray from the accommodating unit onto the recording and/or reproducing unit, and to allow the eject mechanism to selectively carry out drawing operation of tray from the accommodating unit in an outward direction of the apparatus body. At this time, the tray is moved in a horizontal direction between the position where the tray is drawn out in an outward direction of the apparatus body by the eject mechanism and the position where loading can be made onto the recording and/or reproducing unit.

BEST MODE FOR CARRYING OUT THE INVENTION

More practical embodiments described below show the example where a disc recording and/or reproducing apparatus according to this invention is applied to a reproduction only type disc player using, as a disc-shaped recording medium, a reproduction only optical disc on which information signals such as music signals, etc. are recorded in advance. In this invention, an optical disc, etc., which permits write once or re-recording operation of information signals is used as the disc-shaped recording medium, and an optical pick-up unit for carrying out recording/reproduction of information signals and a magnetic head unit for application of external magnetic field are used as the recording/reproducing unit, thereby making it possible to constitute the recording/reproducing apparatus of this invention as a recording/reproducing apparatus for disc-shaped recording media.

As a disc recording medium used as a recording medium for the disc player of this embodiment, a reproduction only optical disc 201 of diameter of 12 cm and a reproduction only optical disc 202 of diameter of 8 cm on which information signals such as music signals, etc. are recorded in advance are used. In these optical discs 201, 202, recording of information signals is carried out by forming very small uneven trains corresponding to information signals recorded on one surface of a disc substrate (base) having light transmission property formed by molding synthetic resin material like polycarbonate. Moreover, on the surface plane where uneven trains are provided of the disc substrate, a reflection layer formed by metal such as aluminum, etc. for allowing light beams for reading signals irradiated onto the optical disc to be reflected is formed and a protective layer of synthetic resin is formed so as to cover the reflection layer. Moreover, at the center portions of these optical discs 201, 202, there are respectively provided center holes 203 with which the centering member provided at the central portion of the disc table constituting the disc rotation operation mechanism of the disc driving unit is engaged.

Figure 1:
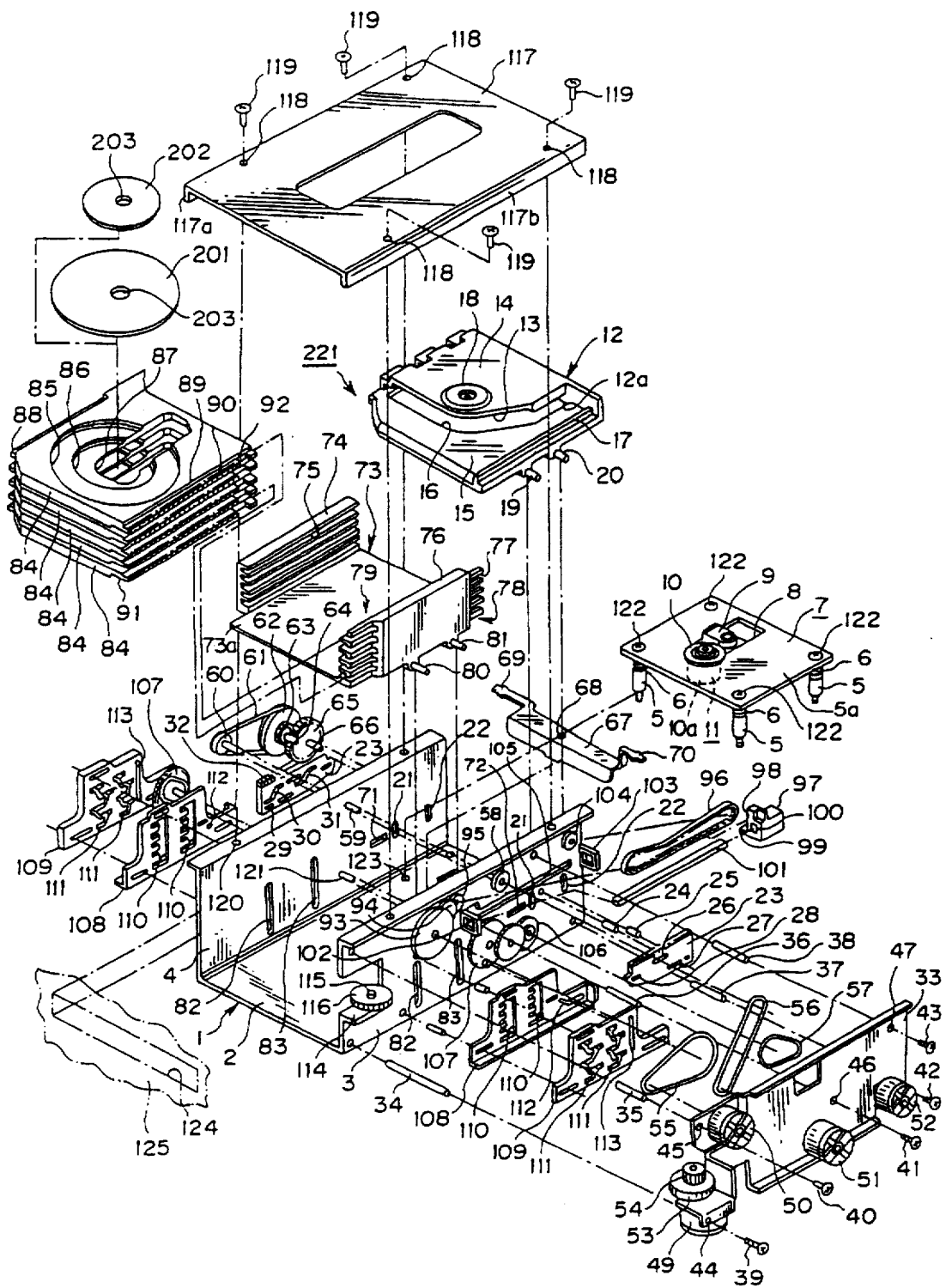
FIG. 1 is an exploded perspective view showing a disc player according to this invention.

This disc player includes, as described later, a chassis 1 formed by punch-bending a metal plate in which various kinds of mechanism portions are disposed to constitute the player body along with outer casing 125 which will be described later. In this chassis 1, as shown in FIG. 1, a bottom plate 2 is formed, and a right side plate 3 and a left side plate 4 are formed in a rising manner (hereinafter simply referred to as rising-formed) so that they are opposite to each other. Thus, the chassis 1 is formed U-shaped (channel shaped) in cross section as a whole. This chassis 1 is disposed within outer casing 125 where various kinds of mechanism portions are arranged to constitute the player body as shown in FIGS. 46 to 64 which will be described later. The outer casing 125 constituting the player body is of a structure in which lateral width extending in a direction of left and right side plates 3, 4 of the chassis 1 is set to substantially 355 mm.

Further, at the upper end side of left and right side plates 3, 4 of the chassis 1, a top plate 117 which takes a shape of flat plate serving as reinforcing member is attached by a plurality of set (lock) screws 119. This top plate 117 is such that a plurality of screw penetration holes 118, 118 are bored at the both side edges, and bent portions 117a, 117b are provided on the both side portions opposite to each other so that it is formed in a rectangular form. Further, the top plate 117 is attached to the chassis 1 by screw-connecting set screws 119 penetrated through screw penetration holes 118, 118 into screw holes 120 bored at the upper end portions of the respective side plates 3, 4. As stated above, by attaching the flat plate like top plate 117 onto side plates 3, 4 of the chassis 1 which takes a channel shape, the chassis 1 is constituted in a casing form such that the front surface side and the side of both side surfaces are opened.

On the bottom surface 2 of the (chassis 1, there is disposed a disc driving unit (disc drive) 7 onto which the optical disc 201 or 202 is loaded (mounted) in the state positioned at the inward side of the outer casing 125 when the chassis 1 is disposed within the outer casing 125 to carry out reproduction of information signals of music signal, etc. recorded on the optical disc 201 or 202. This disc driving unit 7 comprises a disc table 10 constituting a disc rotational operation mechanism 11 for rotationally operating the optical disc 201 or 202, and an optical pick-up section 9 for carrying out reading of information signals recorded on the optical disc 201 or 202 loaded (mounted) on the disc table 10. At the upper side of the disc table 10 constituting the disc rotation operation mechanism 11, a chucking frame 12 constituting a chucking mechanism 221 supported at the side plates 3, 4 of the chassis 1 and adapted for clamping optical disc 201 or 202 onto the disc table 10 is disposed. This chucking frame 12 is movably supported in a direction to be in contact with or remote from the disc table 10, which is height direction of the side plates 3, 4, and is moved in a direction closer to the disc table 10 to thereby pressure-support the optical disc 201 or 202 with respect to the disc table 10, thus permitting it to be rotated in one body with the disc table 10.

Moreover, within the casing 125, there is disposed an accommodating unit 73 within which trays 84 formed so that the optical disc 201 or 202 can be mounted thereon are accommodated so that they are stacked in the state parallel to each other. This accommodating unit 73 is disposed on the chassis 1 in a manner opposite to the disc driving unit 7 in the state positioned at the front surface side within the casing 125. Further, the accommodating unit 73 is movably supported in a height direction of the side plates 3, 4 of the chassis 1, and is caused to undergo vertical movement operation by vertical movement mechanism 210 which will be described later.

Figure 5:
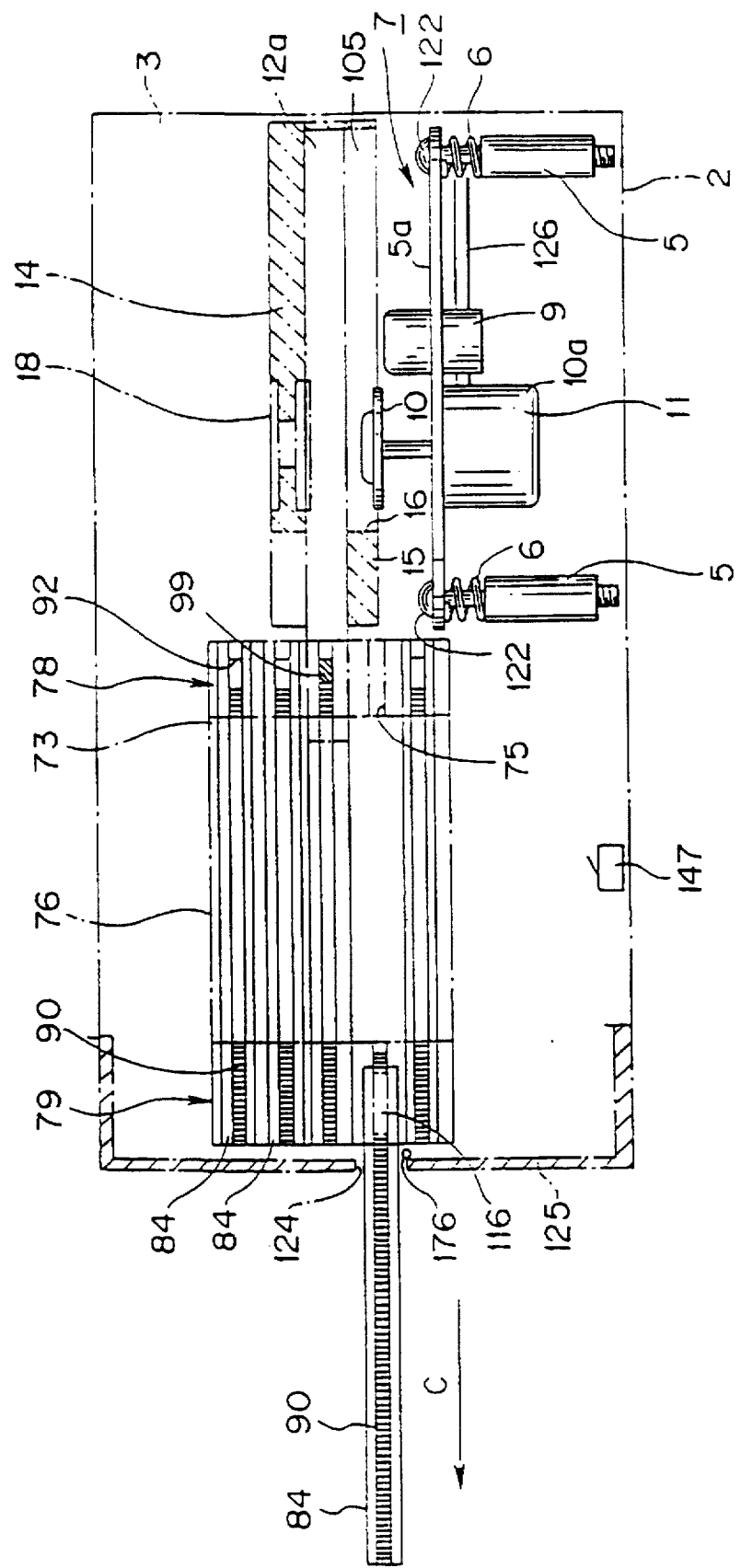
FIG. 5 is a side view showing the state where one tray accommodated within the accommodating unit is drawn out in an outward direction of the outer casing.
Figure 6:
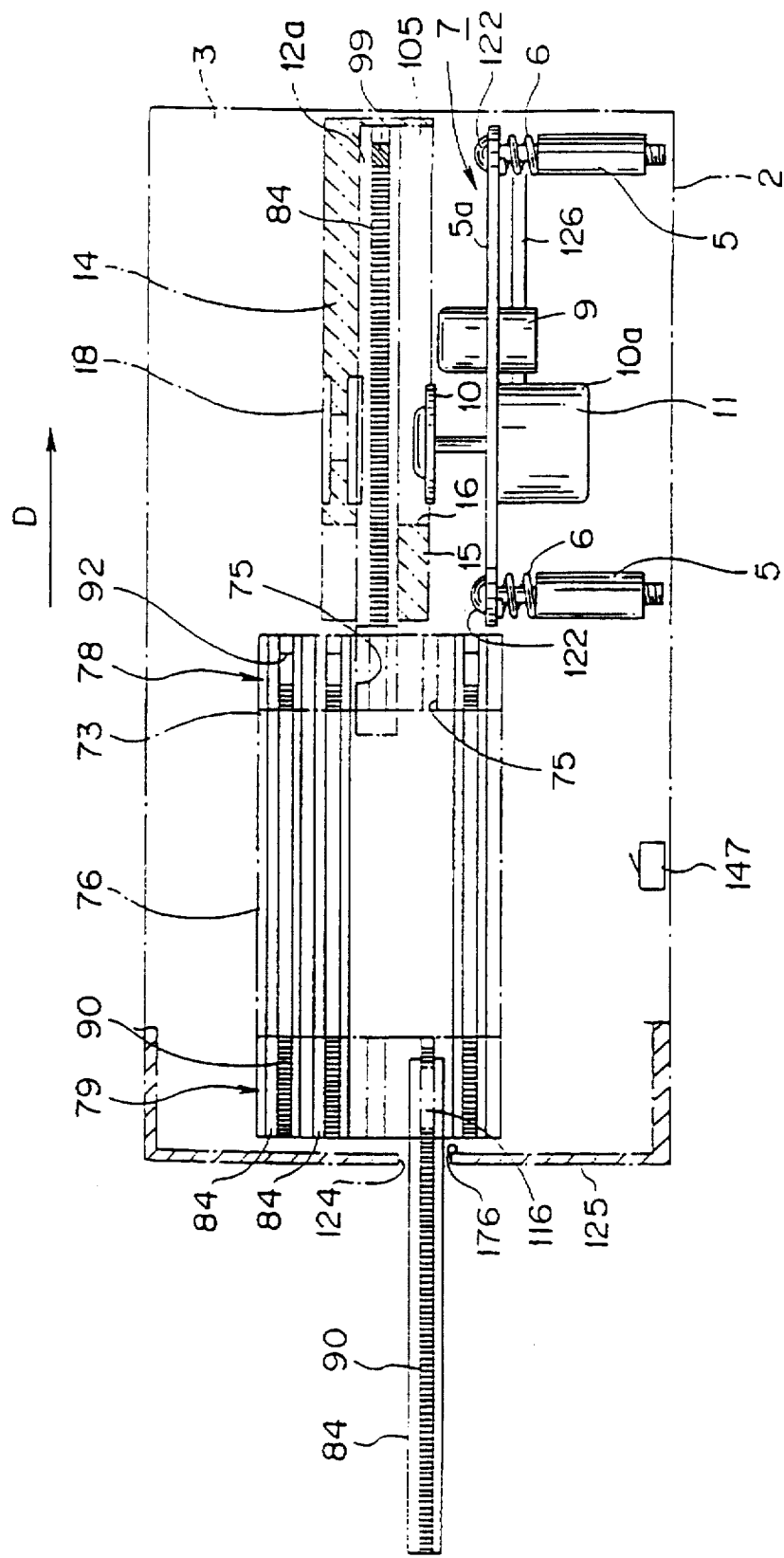
FIG. 6 is a side view showing the state where one tray accommodated within the accommodating unit is drawn out in an outward direction of the outer casing and the other tray is drawn out to the loading position.
Figure 7:
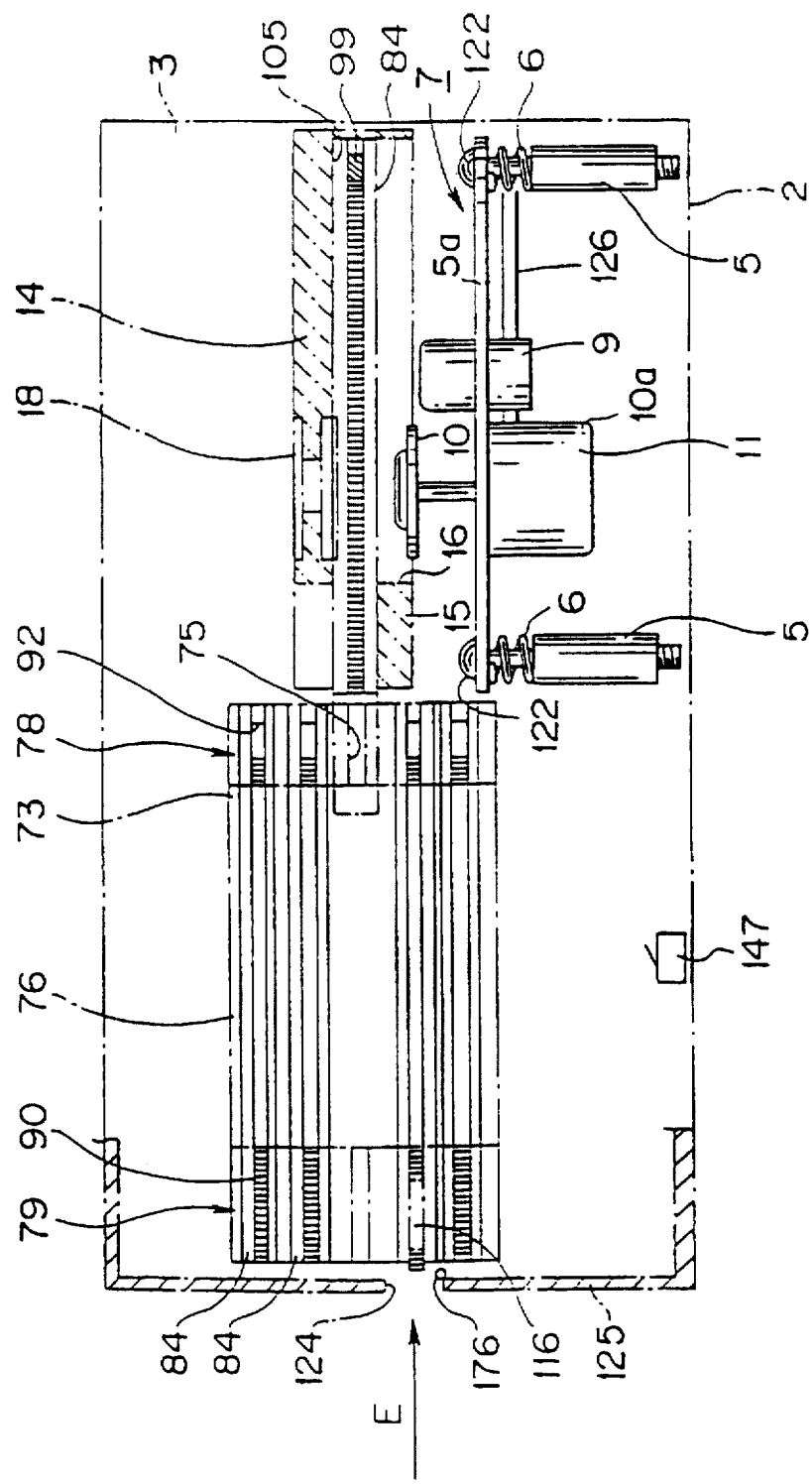
FIG. 7 is a side view showing the state where one tray is drawn out to the loading position and the other tray is accommodated within the accommodating unit.
Figure 11:
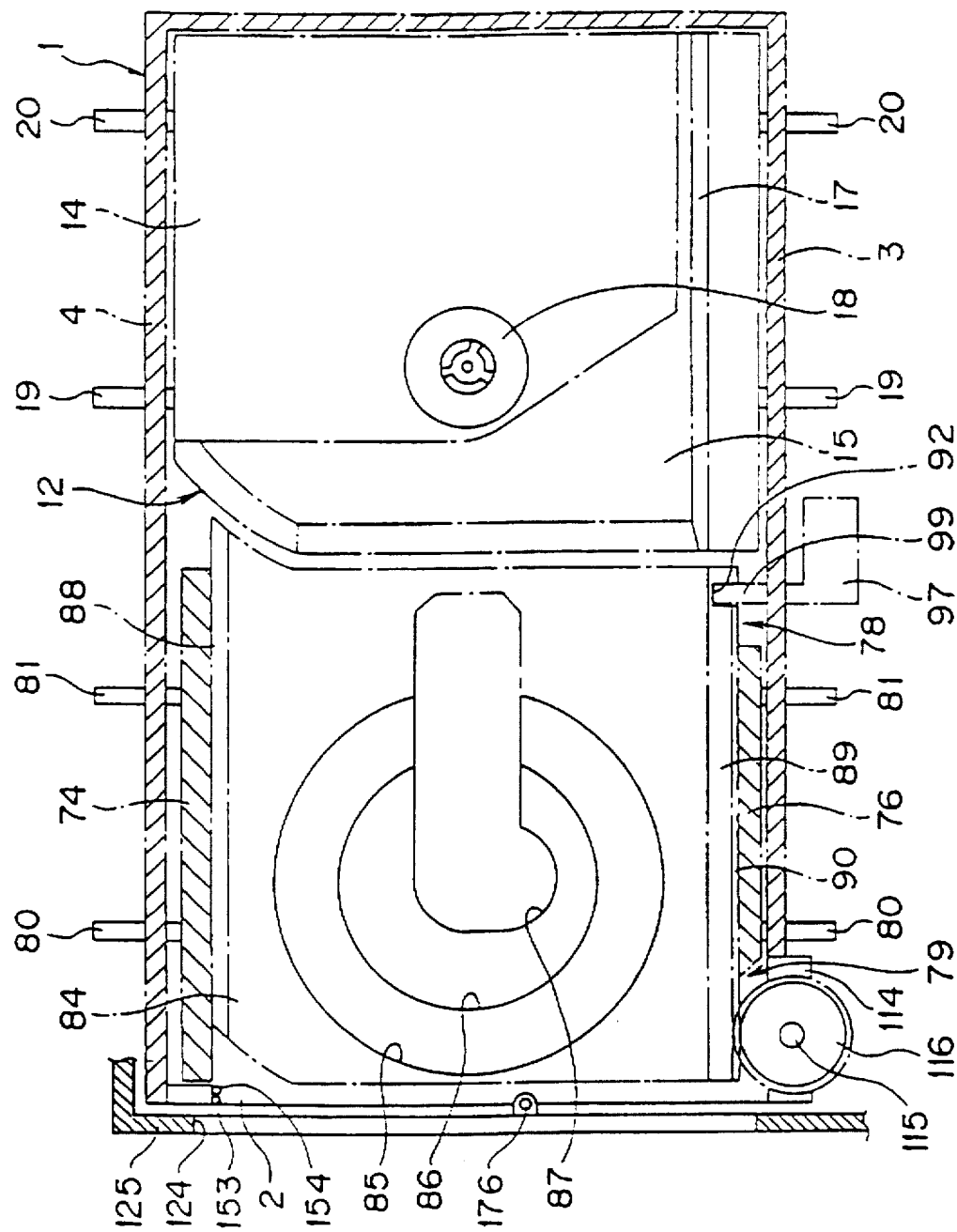
FIG. 11 is a plan view showing the state where trays are all accommodated at accommodating positions of the accommodating unit.
Figure 12:
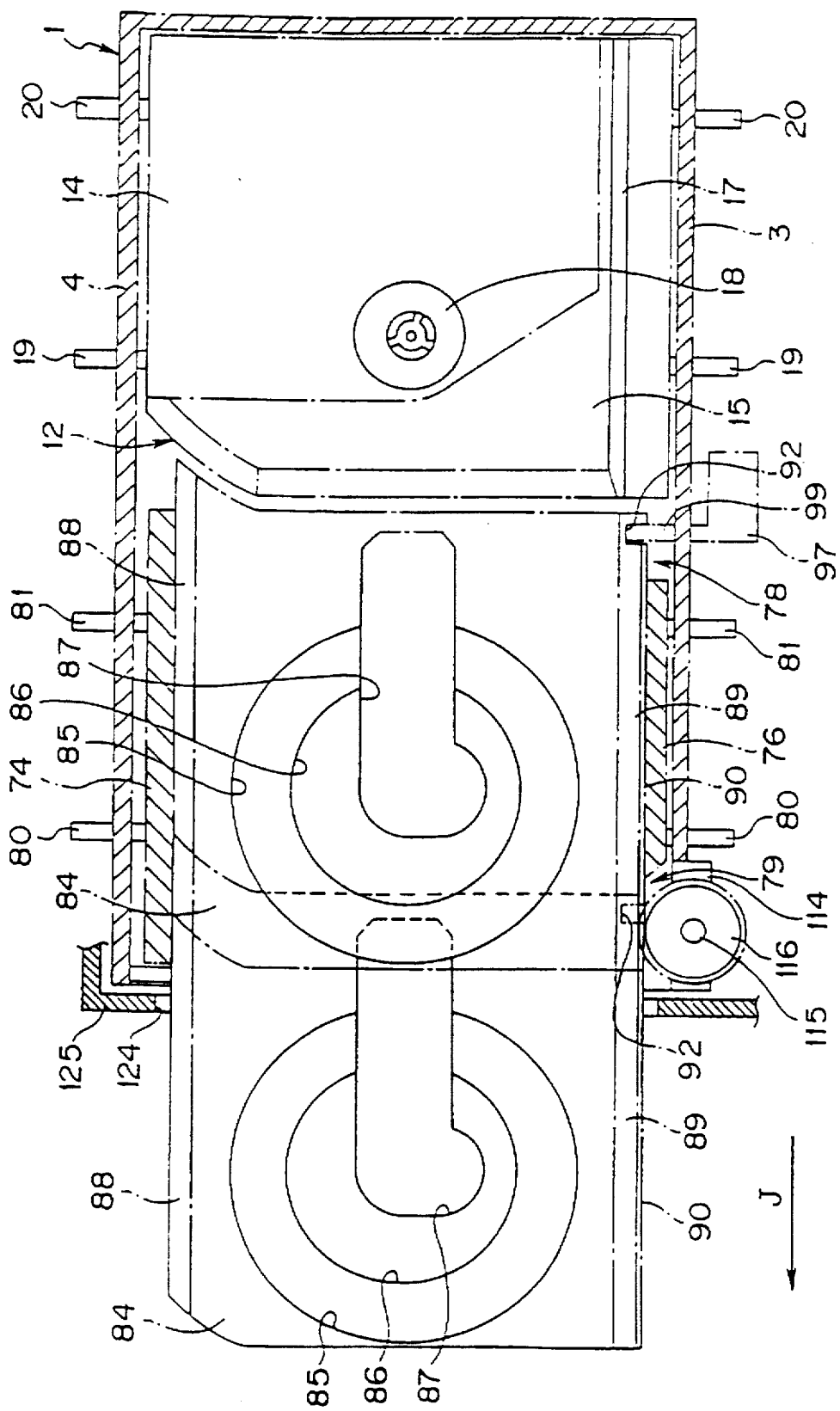
FIG. 12 is a plan view showing the state where one try accommodated within the accommodating unit is drawn out in an outward direction of the outer casing.
Figure 13:
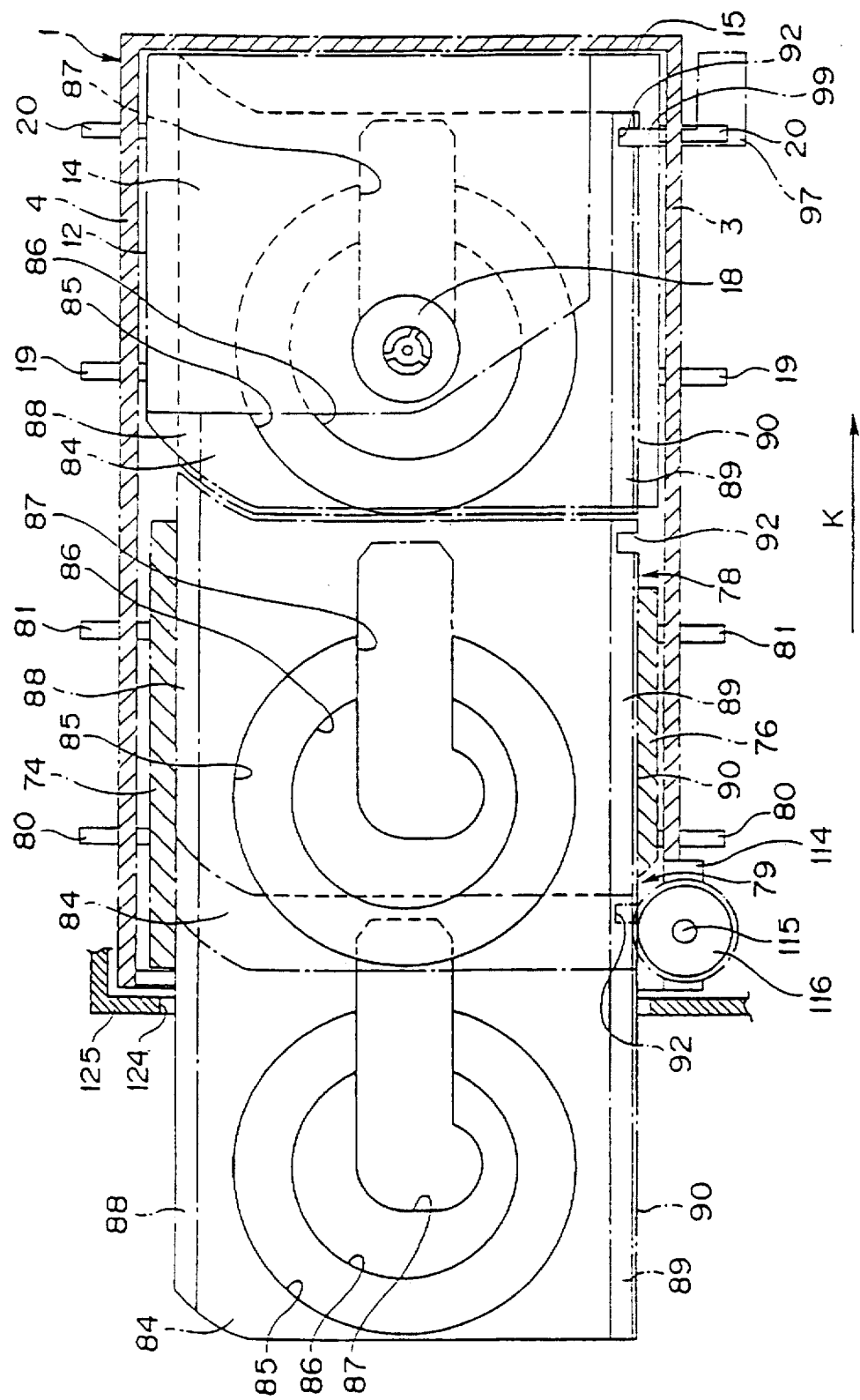
FIG. 13 is a plan view showing the state where one tray is drawn to the loading position and the other tray is drawn out in an outward direction of the outer casing.

Meanwhile, trays 84 accommodated within the accommodating unit 73 are caused to undergo transfer operation extending over the accommodating position where they are accommodated within the accommodating unit 73 as shown in FIGS. 2, 3, 4, and 11, the loading position which is the position where they are held by the chucking frame 12 constituting the chucking mechanism 221 as shown in FIGS. 6, 7 and 13, and the eject position where they are drawn out in an outward direction of the outer casing 125 constituting the player body as shown in FIGS. 5, 6, 9, 10, 12 and 13. In this example, ones of trays 84 accommodated within the accommodating unit 73 are caused to respectively selectively undergo transfer operation to the loading position and the eject position.

Further, the tray 84 is caused to undergo drawing operation in an outward direction of the outer casing 125 through an insertion/withdrawal (eject) hole 124 formed at the front surface side of the outer casing 125, and is placed at the eject position located outwardly of the casing 125. When the tray 84 is placed at the eject position where it is drawn out in an outward direction of the outer casing 125, it is possible to carry out exchange of optical disc 201 or 202 mounted on the tray 84.

Figure 8:
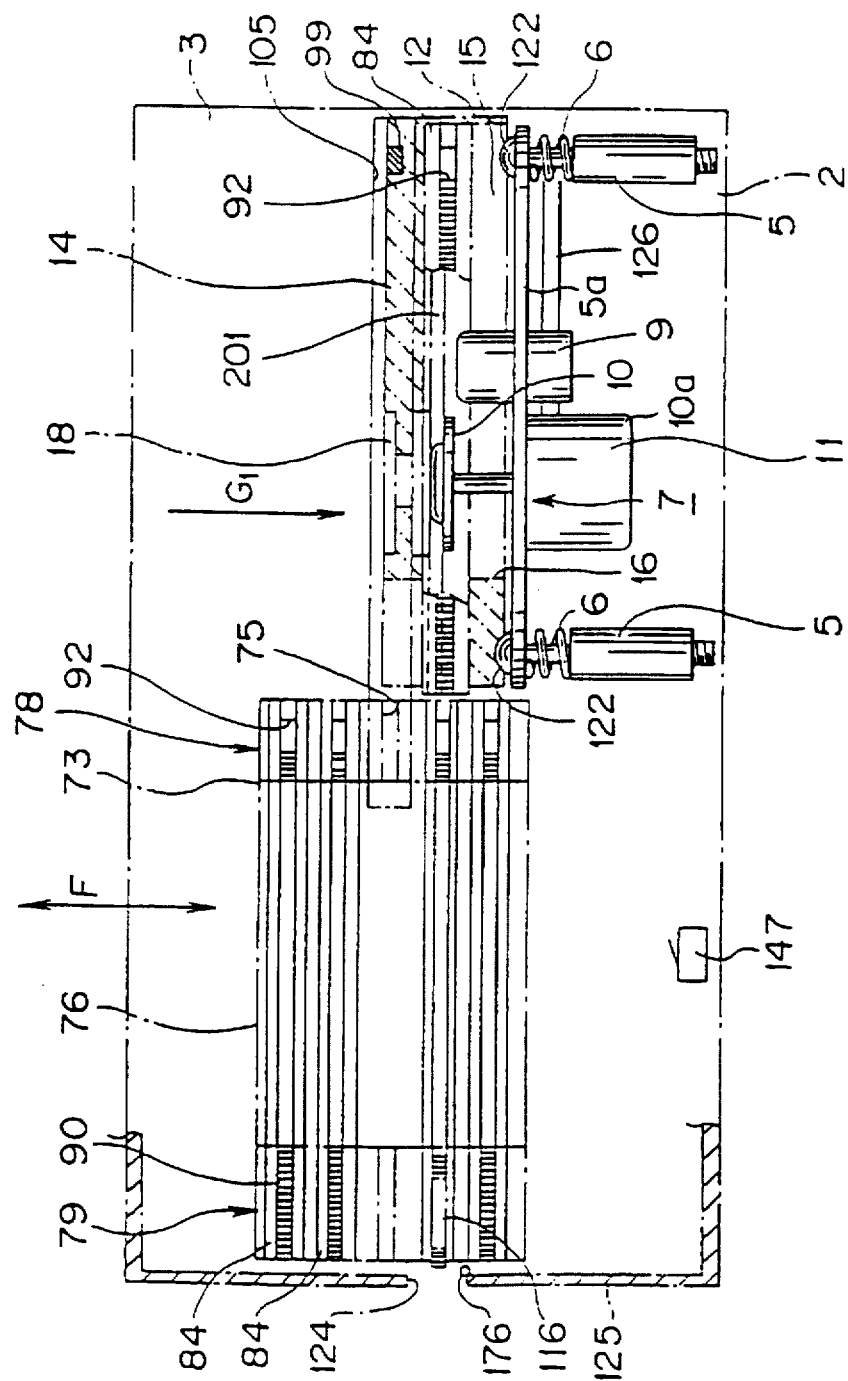
FIG. 8 is a side view showing the state where optical disc mounted on one tray is loaded onto the disc driving unit.
Figure 9:
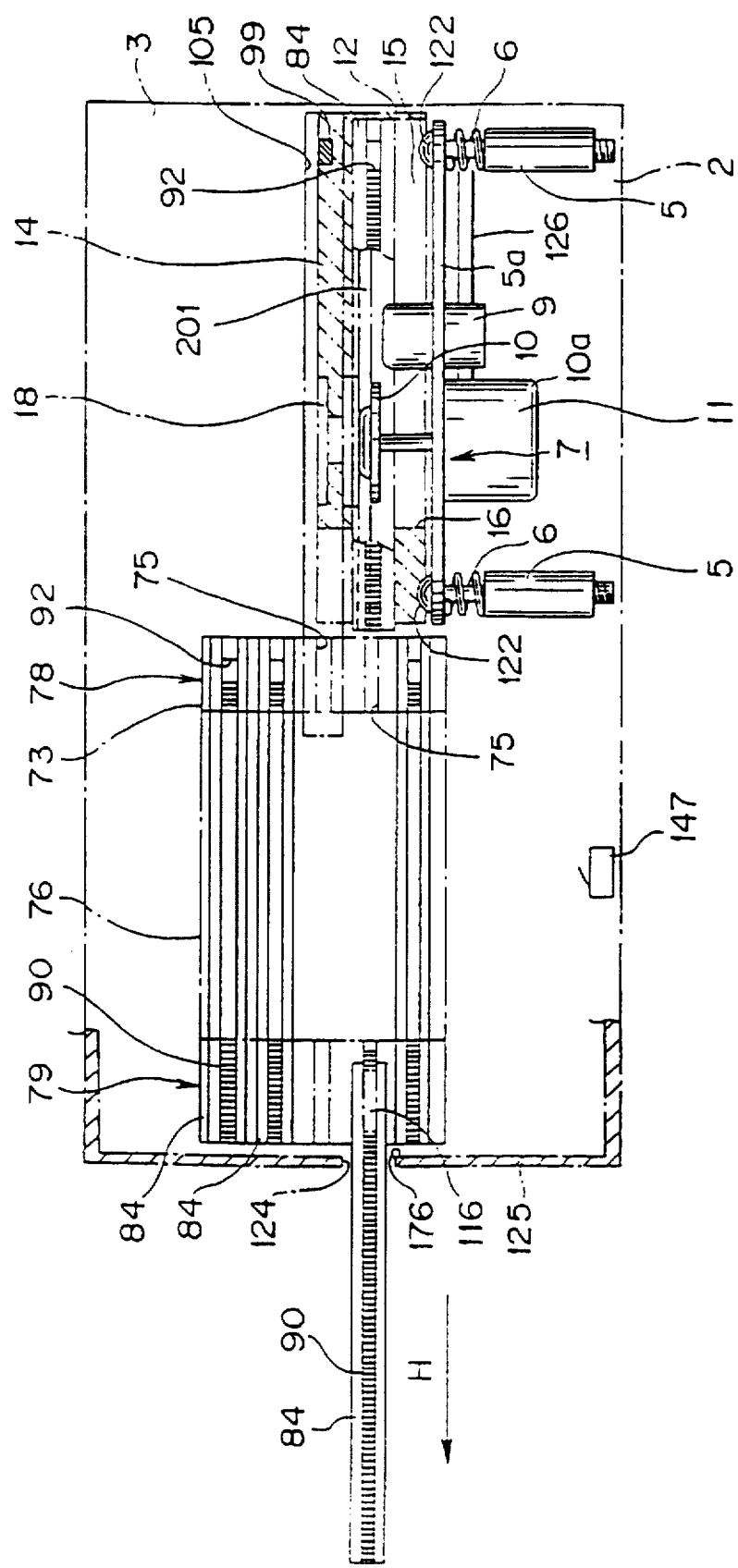
FIG. 9 is a side view showing the state where optical disc mounted on one tray is loaded onto the disc driving unit and the other tray is drawn out in an outward direction of the outer casing.
Figure 10:
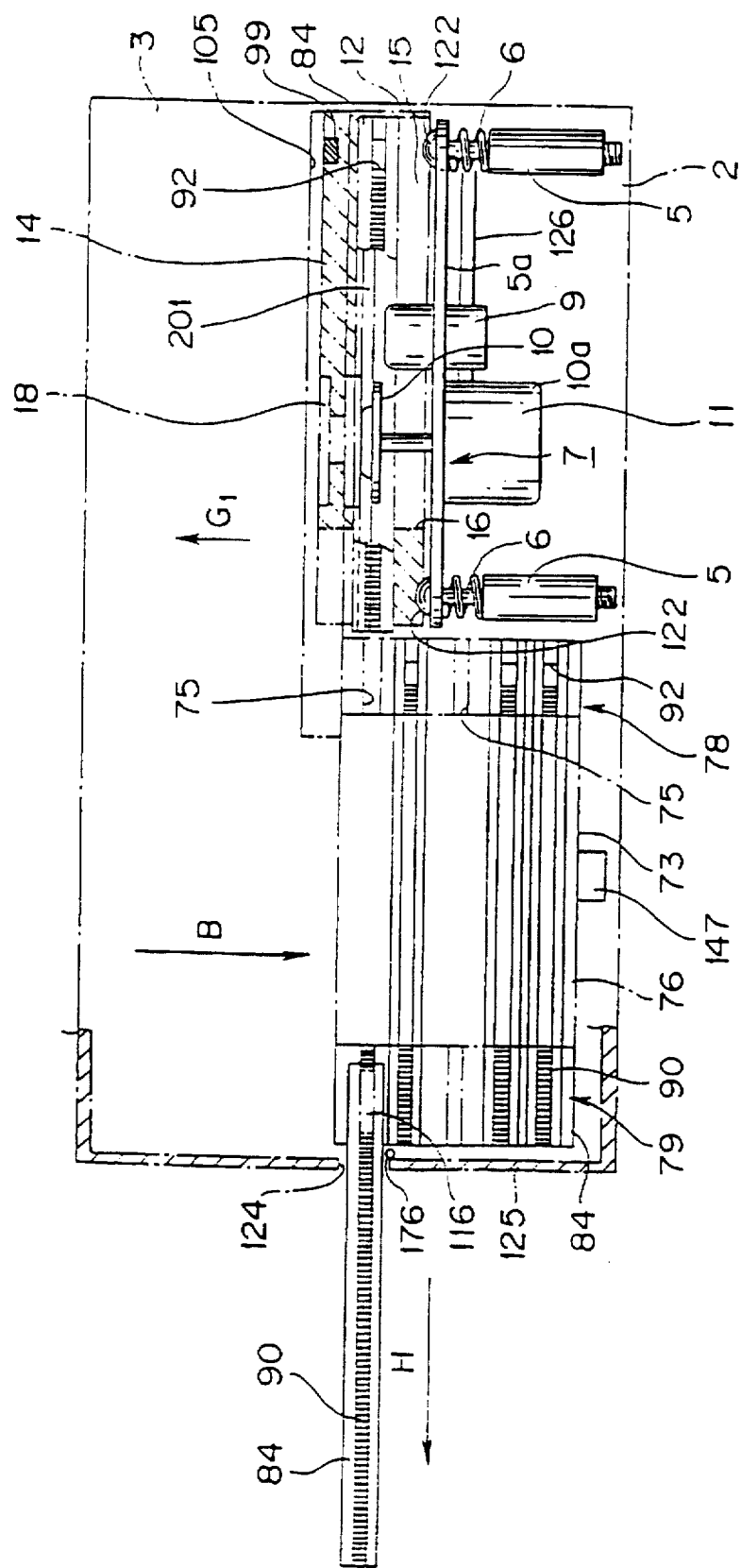
FIG. 10 is a side view showing she state where optical disc mounted on one tray is loaded onto the disc driving unit and other tray different from the tray shown in FIG. 9 is drawn out in an outward direction of the outer casing.

Moreover, the optical disc 201 or 202 mounted on the tray 84, which is drawn out from the accommodating unit 73 and is placed at the loading position, is held by the chucking frame 12, and is loaded onto the disc table 10 of the disc rotational operation mechanism 11 by the chucking mechanism 221 including the chucking frame 12 as shown in FIGS. 8, 9 and 10.

Then, the tray 84 accommodated within the accommodating unit 73 is drawn out from the accommodating unit 73 through loading mechanism 220 which will be described later, and is caused to undergo feed operation to the loading position. In this case, the eject operation for drawing out the tray 84 accommodated within the accommodating unit 73 to draw out it in an outward direction of the outer casing 125 is carried out by eject mechanism 230 which will be described later.

Figure 2:
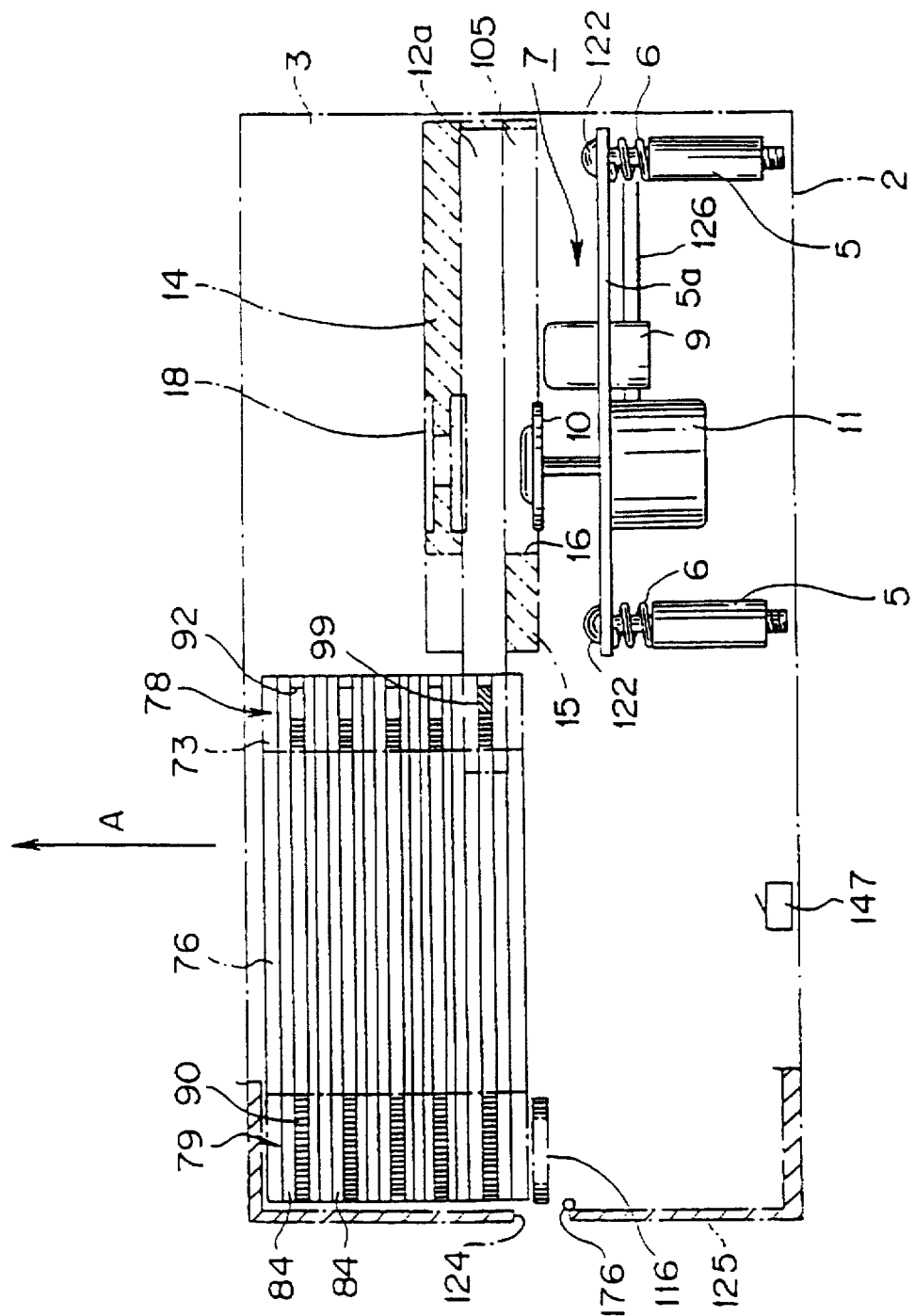
FIG. 2 is a side view showing the state where trays are all accommodated at accommodating positions of the accommodating unit and the accommodating unit is moved to the uppermost position within the outer casing.

The accommodating unit 73 allows one of a plurality of trays 84 accommodated within the accommodating unit 73 to be opposed to the loading mechanism 220, and is moved to the drawing out position by the loading mechanism 220. Namely, the accommodating unit 73 is caused, as shown in FIG. 2, to undergo vertical movement operation by the vertical movement mechanism 210 extending between the position where the tray 84 accommodated at the lowermost step position is opposed to the loading mechanism 220 and the falling position where the tray 84 accommodated at the uppermost step position is opposed to the loading mechanism 220.

Figure 3:
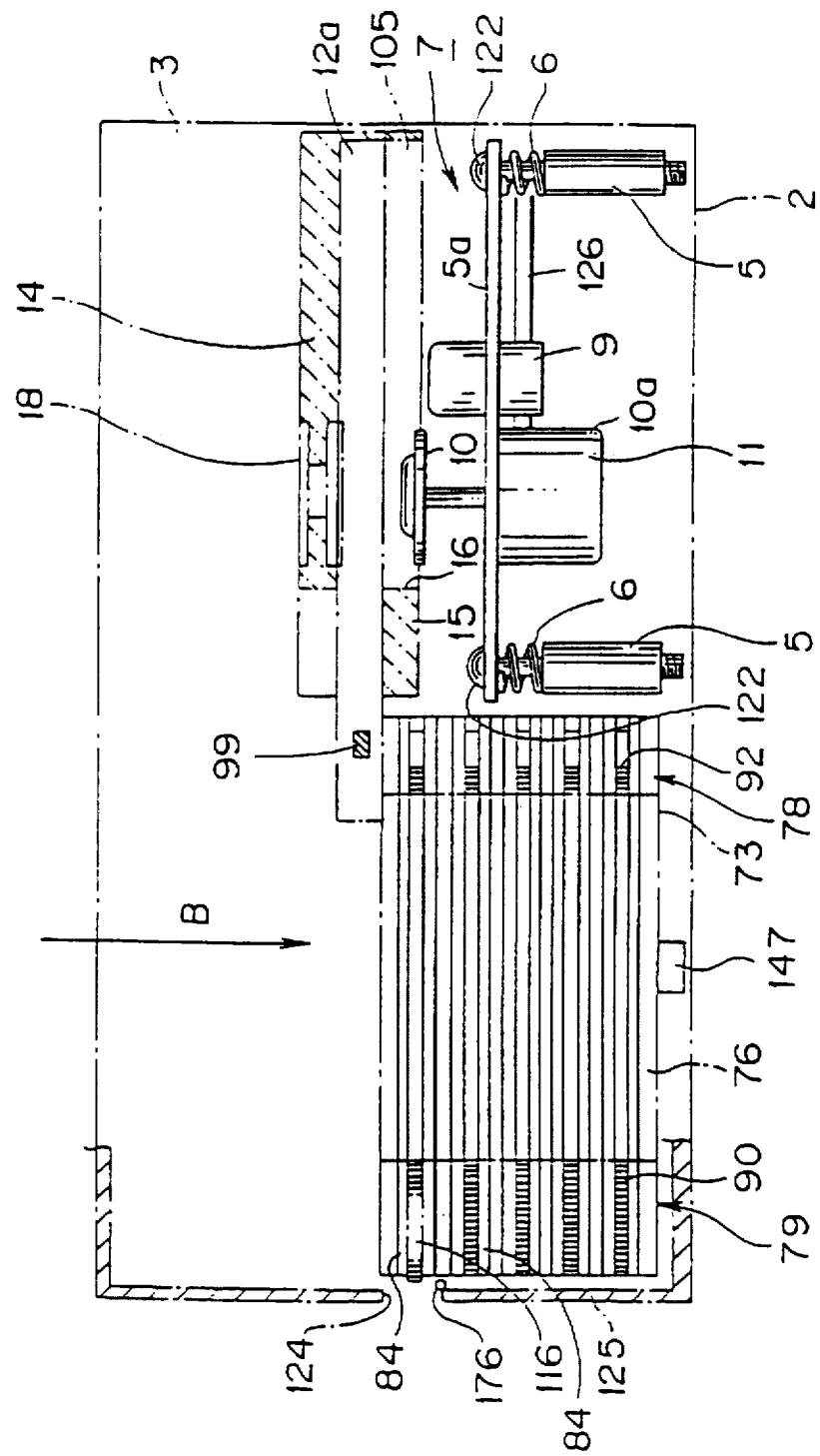
FIG. 3 is a side view showing the state where trays are all accommodated at accommodating positions of the accommodating unit and the accommodating unit is moved to the lowermost position within the outer casing.
Figure 4:
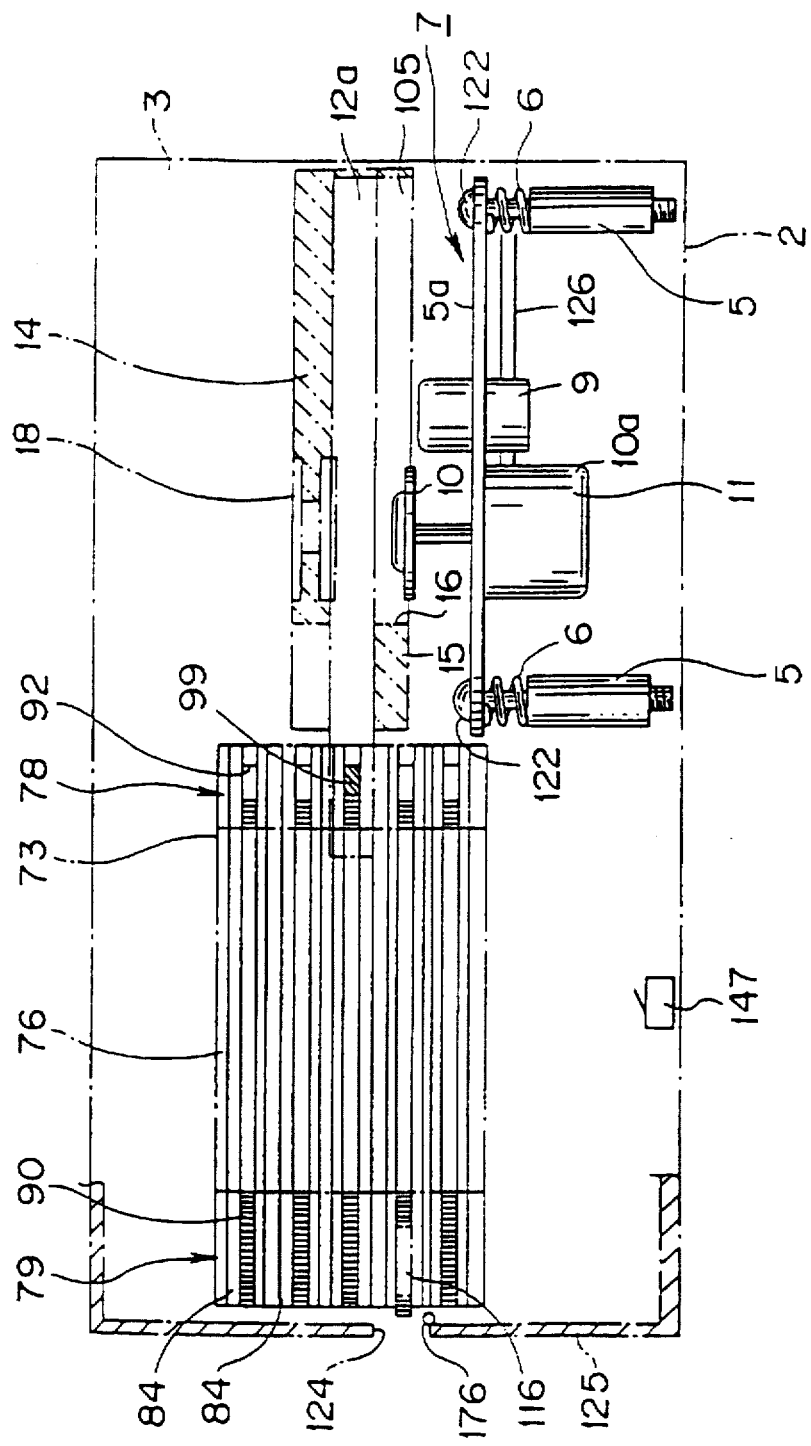
FIG. 4 is a side view showing the state where trays are all accommodated at accommodating positions of the accommodating unit and the accommodating unit is moved to the middle portion within the outer casing.

Moreover, the accommodating unit 73 allows one of a plurality of trays 84 accommodated within the accommodating unit 73 to be opposed to the eject mechanism 230, and is moved to the position where it can be drawn out by the eject mechanism 230. Namely, the accommodating unit 73 is caused to undergo vertical movement operation, as shown in FIGS. 3 and 10, by the vertical movement mechanism 210 extending between the position where the tray 84 accommodated at the uppermost step position is opposed to the insertion/withdrawal hole 124 of the outer casing 125, thus permitting the tray 84 to be drawn out outwardly of the outer casing 125 and the position where the tray 84 accommodated at the lowermost stage position is opposed to the insertion/withdrawal hole 124 of the outer casing 125, thus permitting the tray 84 tb be drawn out in an outward direction of the outer casing 125.

Then, the tray 84 which has been drawn out from the accommodating unit 73 by the loading mechanism 220 or the eject mechanism 230 is accommodated at the original accommodating position within the accommodating unit 84 for a second time through the loading mechanism 220 or the eject mechanism 230.

Moreover, in the disc player of this embodiment, even if there even results the state where the tray 84 accommodated within the accommodating unit 73 is drawn out to the loading position where it is held by the chucking frame 12 as shown in FIGS. 6 and 7, and the state where the optical disc 201 or 202 mounted on one tray 84, which has been drawn out from the accommodating unit 73, is loaded onto the disc table 10 of the disc rotational operation mechanism 11 so that it is reproduced, it is possible to perform an eject operation to draw out another tray 84 accommodated within the accommodating unit 73 in an outward direction of the casing 125 through the eject mechanism 230, thus permitting the optical disc 201 or 202 mounted on the tray 84 to be exchanged.

Namely, when one of a plurality of trays 84 accommodated within the accommodating unit 73, e.g., tray 84 accommodated at the position of the third step (stage) from the top is loaded onto the disc driving unit 7 as shown in FIG. 9, the accommodating unit 73 is caused to undergo vertical movement operation, whereby any other tray 84, e.g., tray 84 accommodated at the fourth step position from the top as shown in FIG. 9, or at the uppermost step position as shown in FIG. 10 is moved to the position where it is opposed to the eject mechanism 230, thus permitting such tray to undergo drawing operation in the outward direction of the casing 125 through the eject mechanism 230. This tray 84 which has been drawn out outwardly of the outer casing 125 is caused to undergo exchange of disc 201 or 202 mounted thereon, or the like, and is then accommodated for a second time at the original accommodating position within the accommodating unit 73 as shown in FIG. 7.

On the other hand, the tray 84 which has mounted thereon the optical disc 201 or 202 which has been loaded on the disc table 10 of the disc rotational operation mechanism 11 and has been being reproduced is caused to undergo rising operation of the chucking frame 12 after reproduction of the optical disc 201 or 202 has been completed. After the optical disc 201 or 202 is mounted thereon, the tray 84 is caused to be located for a second time at the original accommodating position within the accommodating unit 73 by the loading mechanism 220.

Respective mechanism portions constituting the disc player of this embodiment will now be described in more practical sense.

Initially, the disc driving unit 7 disposed on the chassis 1 is attached through an attachment base (substrate) 5a supported by a plurality of supporting legs 5 vertically provided on a bottom plate 2 of the chassis 1 as shown in FIGS. 1 to 10. Between the front end side of the supporting legs 5 and the attachment base 5a, dumpers 6 are interposed, whereby the disc driving unit 7 is supported on the bottom surface 2 of the chassis so that it can undergo elastic (resilient) displacement. In this example, the supporting legs 5 are attached on the attachment base 5a by fixing screws 122 screw-connected to the front end side inserted through the attachment base 5a.

This disc driving unit 7 includes, as shown in FIGS. 1 to 10, disc rotational operation mechanism 11 for rotationally operating the optical disc 201 or 202, and an optical pick-up section (device) 9 for irradiating light beams onto the signal recording surface of the optical disc 201 or 202 rotationally operated by the disc rotational operation mechanism 11 to carry out read-out of an information signal.

More particularly, the disc rotational operation mechanism 11 is composed of disc table 10 on which the optical disc 201 or 202 is loaded, and a spindle motor 10a for rotationally driving the disc table 10. The disc table 10 is attached to the front end of the spindle motor 10a by projecting the drive shaft thereof toward the upper surface side of the bottom plate 2. This disc table 10 is formed substantially disc-shaped, and is provided at the central portion of the upper surface portion with a centering portion of truncated cone shape. This centering portion has a role such that when the optical disc 201 or 202 is mounted on the disc table 10, center hole 203 of the optical disc 201 or 202 is engaged with the centering portion so as to carry out centering with respect to the disc table 10 of the optical disc 201 or 202. Further, the optical disc 201 or 202 is loaded on the disc table 10, and is rotationally operated by the spindle motor 10a in one body with the disc table 10.

Moreover, the optical pick-up section 9 is supported by a slide guide shaft 126 supported by frame 5a, and is caused to movement operation extending in a racial direction of the optical disc loaded (mounted) on the disc table 10 by the pick-up feed mechanism while being guided by the slide guide shaft 126. This optical pick-up section 9 irradiates light beams emitted from a light source such as a semiconductor laser, etc. accommodated within an optical block to the optical disc 201 or 202 on the disc table 10 through an objective (object lens), and detects return light beams reflected from the optical disc 201 or 202 by a photodetector disposed within the optical block to thereby carry out read-out of information signals with respect to the optical disc.

Moreover, the accommodating unit 73 is of a structure in which plural, e.g., five trays 84 formed so that the optical disc 201 or 202 can be mounted can be accommodated in such a manner that they are in parallel to each other. This accommodating unit 73 comprises, as shown in FIGS. 1 and 19, a bottom plate 73a and a pair of left and right side plates 74, 76 rising-formed in a manner opposite to each other on the both sides of the bottom plate 73a.

Figure 19:
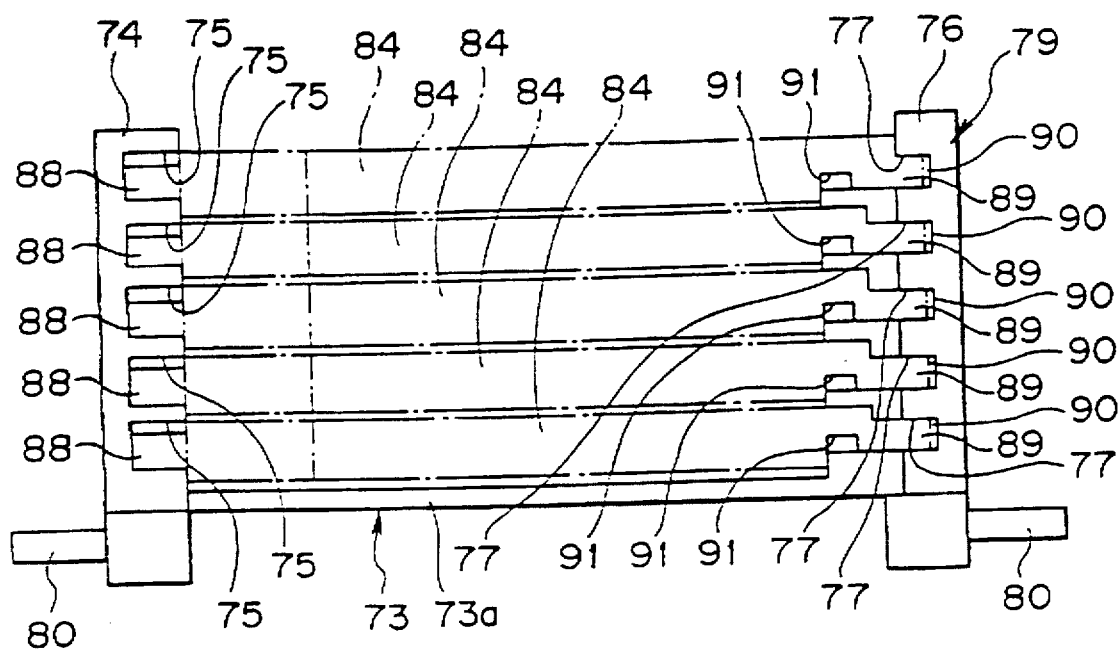
FIG. 19 is a front view showing the accommodating unit.

Trays 84 accommodated in the state parallel to each other so that they are stacked in a height direction of the accommodating unit 73 are formed so as to take a rectangular dish shape as shown in FIGS. 1 and 19. Further, at the upper surface side of the tray 84, there are formed a first accommodation recessed portion 85 adapted so that optical disc 201 of diameter of 12 cm is mounted after undergone positioning, and a second accommodation recessed portion 86 adapted so that the optical disc 202 of diameter of 8 cm is mounted after undergone positioning. These first and second accommodation recessed portions 85, 86 are formed so as to concentric circular shape, wherein the second accommodation recessed portion 86 of small diameter is formed so that its height is lower by one step than the bottom surface of the first accommodation recessed portion 85 of large diameter. In addition, at the bottom surface of the tray 84, there is provided an opening portion 87 which allows a portion of the signal recording area to be faced to the lower surface side of the tray 84 extending over inner and outer circumferences so as to include the center hole 203 of the optical disc 201 mounted within the first accommodation recessed portion 85 and the periphery thereof.

Moreover, at both side portions opposite to each other of the tray 84, supporting pieces 88, 89 are formed. The supporting piece 88 formed on one side positioned at the left in FIG. 1 of the tray 84 is formed extending over the intermediate portion from the front end side toward the backward end side of the tray 84. Namely, at one side of the tray 84, its backward end side is caused to have thickness equal to that of the body of the tray 84. On the other hand, the other supporting piece 89 positioned at the right in FIG. 1 of the tray 84 is formed extending from the front end side toward the backward end side of the tray 84. At the front end portion of the other supporting piece 89, a rack gear portion 90 is formed extending over the total length of the supporting piece 89. At the backward side portion of the other supporting piece 89, an engagement recessed portion 92 adapted so that a movement block 97 of loading mechanism 220 which will be described later is engaged therewith is formed.

At the inside surface side of one side plate 74 positioned in the left direction in FIG. 1 of the accommodating unit 73 which accommodates the tray 84 thus constituted, first groove portions 75 corresponding to the number of trays accommodated are formed. These first groove portions 75 are equidistantly formed in parallel to the bottom plate 73a of the accommodating unit 73. These first groove portions 75 have a width corresponding to the thickness of the tray 84. Moreover, also at the inside surface side of the other side plate 76 positioned in the right direction in FIG. 1 of the accommodating unit 73, second groove portions 77 corresponding to the number of trays 84 accommodated are equidistantly formed in parallel to the bottom plate 73a of the accommodating unit 73. These second groove portions 77 have a width corresponding to thickness of the other supporting piece 89 of the tray 84.

By allowing one side of the tray 84 to be insertion-engaged with the first groove portion 75 and allowing the supporting piece 89 provided on the other side to be insertion-engaged with the second groove portion 77 to accommodate the tray 84 within the accommodating unit 73, the tray 84 is held in parallel to the bottom plate 73a of the accommodating unit 73. It is to be noted that when plural trays 84 are held in correspondence with the first and second groove portions 75, 77, spacings between respective trays 84 are caused to be narrower than thickness of the optical disc 201 or 202 mounted on these trays 84.

Moreover, at the front end side and the rear end side of the other side plate 76 of the accommodating unit 73, cut portions 79, 78 are respectively formed. The front side cut portions 79 and the back side cut portions 78 are formed by cutting the outside surface side of the other side plate 76 thus to open the outside surface sides of the first and second groove portions 75, 77. The front side cut portions 79 and the back side cut portions 78 are formed in this way, whereby the portions of the front end side and the back end side of the other side plate 76 are caused to be comb-shaped. Further, the tray 84 accommodated within the accommodating unit 73 in the state where their both sides are supported by the first and second groove portions 75, 77 allows engagement recessed portions 92 formed at the front end side portion and the back end portion of the rack gear portion 90 formed at the front end portion of the other supporting piece 89 to be faced to the outer direction of the accommodating unit 73 through first and second groove portions 77.

The accommodating unit 73 is of a structure as shown in FIGS. 1 and 19 in which supporting pins 80, 81 are projected by one pair on the both sides of the lower end side, and is supported by vertical movement mechanism 210 through these supporting pins 80, 81. In addition, the accommodating unit 73 is caused to undergo vertical movement operation in upper and lower directions of directions to allow the portion between left and right side plates 3, 4 of the chassis 1 to be close to the bottom plate 2 and to be away therefrom through the vertical movement mechanism 210.

The vertical movement mechanism 210 for allowing the accommodating unit 73 to undergo vertical movement operation will now be described in more practical sense.

Figure 20:
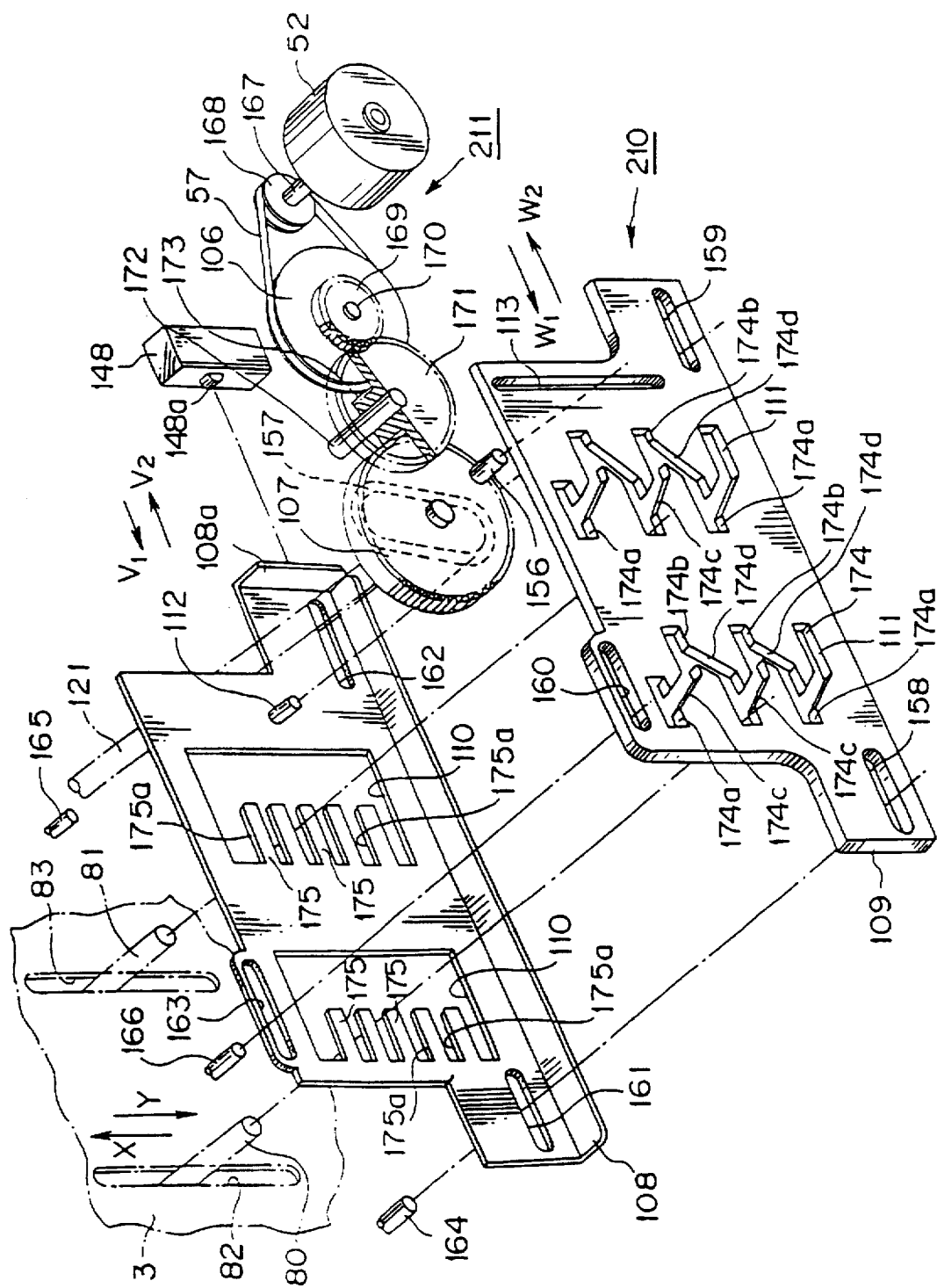
FIG. 20 is an enlarged perspective view showing the essential part of vertical movement mechanism of the disc player according to this invention.

The accommodating unit 73 caused to undergo vertical movement operation in the state positioned between left and right side plates 3, 4 of the chassis 1 is caused to undergo vertical movement operation in X-and Y-directions indicated by arrow in FIG. 20 which are height directions of the side plates 3, 4 in the state where supporting pins 80, 81 projected by one pair on the both sides of the lower end side are respectively inserted into vertical movement guide grooves 82, 83 bored extending in height direction of the side plates 3, 4, and are guided by these vertical movement guide grooves 82, 83.

It is to be noted that the accommodating unit 73 is biased in a falling direction (the Y direction indicated by an arrow in FIG. 20) at all times through biasing means such as extension spring, etc.

At outside surface sides of left and right side plates 3, 4 rising-formed on the both sides opposite to each other of the chassis 1, cam plates 109 and supporting plates 108 constituting the vertical movement mechanism 210 for allowing the accommodating unit 73 to undergo vertical movement operation are movably attached in forward and backward directions of directions perpendicular to respective vertical movement guide grooves 82, 83 and 82, 83 by one pairs. The cam plate 109 is formed so as to take a shape of substantially flat plate as shown in FIGS. 1 and 20, and movement guide grooves 158, 159, 160 are formed in the state positioned on the both sides of the upper side and the lower side of the central portion. At one side plate 3 positioned at the right side in FIG. 1 of the chassis 1, supporting pins 166, 164, 165 are projected toward the outer side. These supporting pins 166, 164, 165 are respectively inserted into movement guide grooves 158, 159, 160 and movably support the cam plate 109 in forward and backward directions within the range of movement guide grooves 158, 159, 160. Also at the other side plate 4 positioned at the left side in FIG. 1 of the chassis 1, supporting pins 166, 164, 165 are projected similarly to one side plate 3. By these supporting pins 166, 164, 165, the cam plate 109 is movably supported in forward and backward directions. Respective cam plates 109, 109 disposed on these left and right side plates 3, 4 are formed bilaterally symmetrically with each other.

At the cam plates 109 disposed on respective side plates 3, 4, a pair of cam grooves 111, 111 are provided in parallel extending in the traveling direction as shown in FIG. 20. Within these cam grooves 111, 111, a plurality of horizontal portions 174a, 174b are formed in a multi-step form extending in the height direction in a manner opposite to each other, and inclined surface portions 174c, 174d are formed extending between respective horizontal portions 174a, 174b. Further, the horizontal portion 174a formed on one side and the horizontal portion 174b formed on the other side are formed with their heights being varied alternately. In addition, the spacing in height direction between respective horizontal portions 174a, 174b is caused to be equal to the spacing between respective trays 84 accommodated in a multi-step form within the accommodating unit 73.

Further, cam plates 109, 109 respectively disposed on the side plates 3, 4 are caused to undergo movement operation in the $W_1$ direction indicated by arrow and in the $W_1$ direction indicated by arrow in FIG. 20 extending between the backward side position, i.e., the initial position moved inwardly of the player body where horizontal portion 174a formed at the front end side serving as the front surface side of outer casing 125 constituting the player body of respective cam grooves 111, 111 are overlapping (in alignment) with vertical movement guide grooves 82, 83 and the forward side position, i.e., the operating position moved to the forward side of the player body where the other horizontal portion 174b opposite to one horizontal portion 174a positioned at the backward side of the respective cam grooves 111, 111 are overlapping (in alignment) with the vertical movement guide grooves 82, 83.

On the other hand, the supporting plate 108 is formed so as to take substantially flat plate which is substantially the same dimensions as those of the cam plate 109, and movement guide groves 163, 161, 162 are formed in the state positioned on both sides of the upper side and the lower side of the central portion. Supporting pins 166, 164, 165 projected at the side plates 3, 4 are inserted into these movement guide grooves 163, 161, 162. The respective supporting plates 108 can be moved in the $W_1$ direction indicated by arrow and in the $W_1$ direction indicated by arrow in FIG. 20 within the range of the movement guide grooves 163, 161, 162. In this example, supporting plates 108, 108 disposed on respective side plates 3, 4 are formed bilaterally symmetrically with each other, and are disposed on the outside surfaces of respective side walls 3, 4. Namely, respective supporting plates 108, 108 are disposed on respective side plates 3, 4 through supporting pins 166, 164, 165 common to the cam plates 109, 109. Namely, they are interposed between cam plates 109, 109 and side plates 3, 4, and are disposed in a manner to overlap with the cam plates 109, 109.

In this example, fixing metals are attached at the front ends of respective supporting pins 166, 164, 165 in order to prevent slip-off of the cam plate 109 and the supporting plate 108 supported through these supporting pins 166, 164, 165.

At the supporting plate 108, as shown in FIG. 20, a pair of opening portions 110, 110 serving as a pair of rectangular opening portions are bored in parallel to the movement direction. From the side edges of the forward side positioned at the front surface sides of the outer casing 125 of these opening portions 110, 110, a plurality of supporting projecting pieces 175, 175 are provided in a projected manner (hereinafter simply referred to as projected) in a multi-step form in parallel to each other. These supporting projecting pieces 175, 175 are such that the upper sides thereof serve as supporting surfaces 175a of supporting pins 80, 81. Further, respective supporting projecting pieces 175, 175 are formed so that heights of respective supporting surfaces 175a are in correspondence with those of horizontal portions 174a, 174b formed within the cam groove 111 formed at the cam plate 109.

These supporting plates 108, 108 are moved in the $V_2$ direction indicated by arrow in FIG. 20 which is the backward side of the outer casing 125 where supporting projecting pieces 175, 175 are overlap (in alignment) with vertical movement guide grooves 82, 83, and are caused to undergo movement operation between the supporting position where respective supporting pins 80, 81 and 80, 81 of the accommodating body 73 are caused to be supported on the respective supporting projecting pieces 175, 175 and the non-supporting position where the respective supporting pieces 175, 175 are moved in the $V_1$ direction indicated by arrow in FIG. 20 which is the forward side of the outer casing 125, and are withdrawn from vertical movement guide grooves 82, 83 to release supporting of respective supporting pins 80, 81 and 80, 81 of the accommodating body 73 by the respective contact supporting piece supporting projecting pieces 175, 175 so that the accommodating body 73 can be vertically moved while allowing supporting pins 80, 81 and 80, 81 to be guided by vertical movement guide grooves 82, 83.

At the end portion of the backward side positioned inwardly of the outer casing 125 of the cam plate 109, an engagement groove 113 with which a drive pin 156 vertically provided at drive cam gear 107 which will be described later is engaged is board. This engagement groove 113 is bored extending in a height direction perpendicular to the movement direction of the cam plate 109 as shown in FIG. 20.

Respective supporting pins 80, 81 and 80, 81 projected on the both sides opposite to each other of the accommodating body 73 are inserted into vertical movement guide grooves 82, 83 and 82, 83 as shown in FIGS. 1 and 20, are inserted into respective opening portions 110, 110 and 110, 110 of supporting plates 108, 108, and are further inserted into respective cam grooves 111, 111 and 111, 111 of the cam plate 109, 109.

The cam plate 109 and the supporting plate 108 constituting the vertical movement mechanism 210 for allowing the accommodating body 73 to undergo vertical movement operation are caused to undergo movement operation in the $W_1$ direction indicated by arrow and in the $W_2$ direction indicated by arrow, and in the $V_1$ direction indicated by arrow and in the $V_2$ direction indicated by arrow in FIG. 20 by vertical movement drive motor 52 constituting vertical movement drive mechanism 211 attached on the attachment base 33 disposed so that it is overlaid upon the side plate 3 positioned at the right side in FIG. 1.

Meanwhile, the attachment base 33 on which the vertical movement drive motor 52 is attached is mounted (attached) on the side plate 3 in an overlapping manner in the state where a plurality of supporting rods 34 to 38 are interposed between the attachment base 33 and the side plate 3, and spacing corresponding to length of supporting rods 34 to 38 is kept with respect to the side plate 3. In this example, the attachment base 33 is fixed on the side plate 3 by means of set (locking) screws 39 to 43 inserted through screw penetration holes 44 to 48 and adapted for screw-connecting it to the front end side of the supporting rods 34 to 38.

Drive force of the vertical movement drive motor 52 is transmitted, as shown in FIG. 20, to a driven pulley 106 on which a drive belt 57 is wound through a drive pulley 168 attached on a drive shaft 167 of the vertical movement drive motor 52 and the drive belt 57 wound on the drive pulley 168. This driven pulley 106 is rotatably attached to the side plate 3 through a support shaft 170. As shown in FIG. 20, a gear portion 169 of small diameter is coaxially integrally formed on the driven pulley 106, and is meshed with a drive force transmission gear 171 rotatably supported extending between side plates 3, 4 opposite to each other on the gear portion 169 and attached on one end side of the support shaft 172. At the drive force transmission gear 171, a small diameter gear portion 173 is integrally formed. This small diameter gear portion 173 is meshed with the drive cam gear 107 attached on one side which is the right end side in FIG. 1 of the support shaft 121 rotatably supported extending between left and right side plates 3 and 4.

Also at the other end side which is the left end side in FIG. 1 of the support shaft 121, drive cam gear 107 is attached as shown in FIG. 1. Respective drive cam gears 107, 107 attached at both ends of the support shaft 121 are rotationally driven in the same direction when the vertical movement drive motor 52 is rotationally driven.

Further, the respective drive cam gears 107, 107 are disposed in the state positioned to the backward side of a pair of cam plates 109, 109 and a pair of supporting plates 108, 108 respectively attached to the respective side plates 3, 4, i.e., the inward side of the outer casing 125, and a portions thereof are faced to the portion between cam plates 109, 109 and supporting plates 108, 108. At the principal surface opposite to respective side plates 3, 4 of these drive cam gears 107, 107, drive pins 156 is vertically provided. This drive pin 156 is insertion-engaged with the engagement groove 113 bored at the cam plate 109. Namely, when respective drive cam gears 107, 107 make one revolution, respective cam plates 109, 109 are reciprocated in the $W_1$ direction indicated by arrow and in the $W_2$ direction indicated by arrow in FIG. 20.

Figure 21:
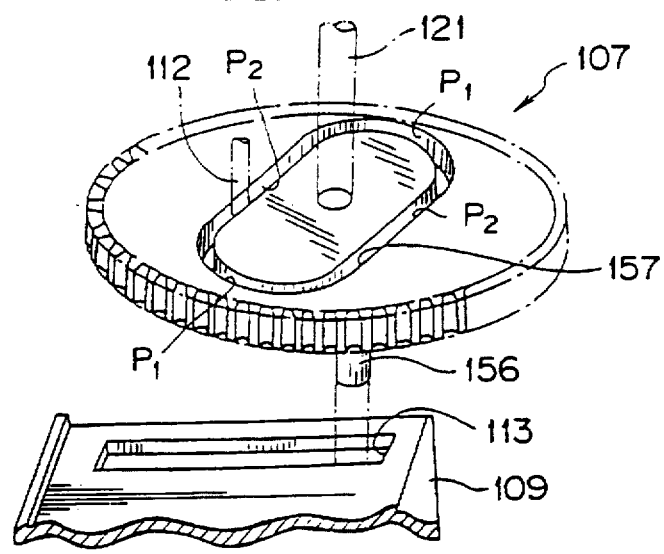
FIG. 21 is an enlarged perspective view showing drive cam gear constituting the vertical movement mechanism.

Moreover, at the other principal surface side opposite to the supporting plates 108 of each drive cam gear 107, a groove 157 which takes an elliptical shape is board as shown in FIG. 21. This cam groove 157 is formed elliptical so as to have two points $P_1$, $P_2$ in long axis direction opposite by 180° to each other and two points in short axis direction opposite to each other by 180° located angularly spaced by 90° with respect to these points $P_1$, $P_2$. An engagement pin 112 vertically provided on the supporting plate 108 is engaged with the cam groove 157. Further, when respective drive cam gears 107, 107 make one rotation, supporting plates 108, 108 disposed on respective side plates 3, 4 are reciprocated two times in the $V_1$ direction indicated by arrow and in the $V_2$ direction indicated by arrow in FIG. 20.

Figure 35:
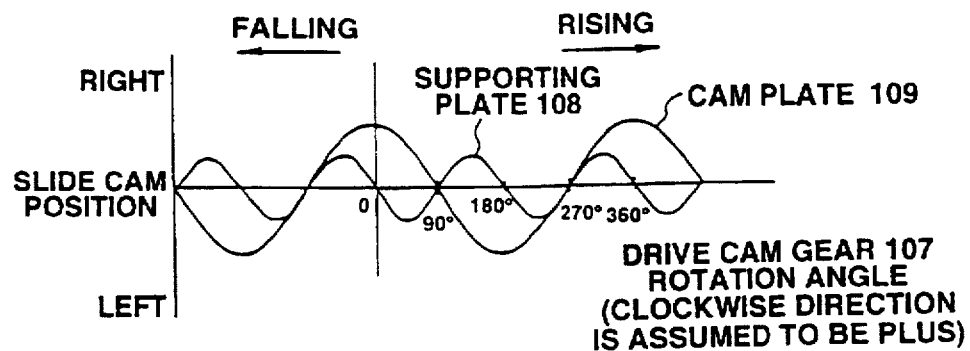
FIG. 35 is a graph for explaining movement operation state of the supporting plate and the cam plate constituting the vertical movement mechanism.
Figure 36:
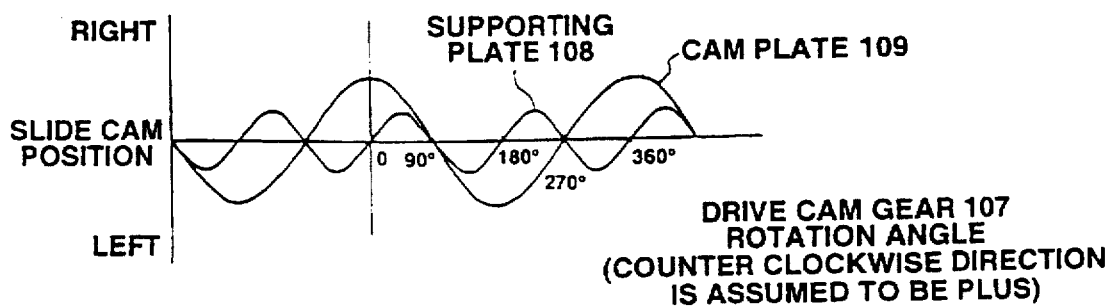
FIG. 36 is a graph for explaining movement operation state of the supporting plate and the cam plate constituting the vertical movement mechanism, wherein there is shown the case where direction of shift of phase between the supporting plate and the cam plate is inverted.

Further, when the drive cam gear 107 is caused to undergo rotational operation, cam plates 109 and supporting plates 108 respectively disposed by one pairs on the left and right side plates 3, 4 are caused to cyclically undergo reciprocating operation in the $W_1$ direction indicated by arrow and in the $W_2$ direction indicated by arrow, and in the $V_1$ direction indicated by arrow, and in the $V_2$ direction indicated by arrow in FIG. 20 with a predetermined phase difference therebetween. Namely, when the cam plate 109 is reciprocated once in the $W_1$ direction indicated by arrow and in the $W_2$ direction indicated by arrow in FIG. 20, the supporting plate 108 is reciprocated twice in the $V_1$ direction indicated by arrow and in the $V_2$ direction indicated by arrow in FIG. 20. Namely, with respect to the cam plate 109 and the supporting plate 108 attached to one side plate 3 side, when the drive cam gear 107 is rotated in a right direction which is clockwise direction in FIG. 20, such a phase difference to produce lag of 45° as rotational angle of the drive cam gear 107 takes place as shown in FIG. 35 at the maximum point of the slide position of the supporting plate 108, i.e., the position where it is moved to the maximum degree in the $V_2$ direction indicated by arrow in FIG. 20 to support respective supporting pins 80, 81 of the accommodating unit 73 by the supporting projecting pieces 175 with respect to the maximum point of the slide position of the cam plate 109, i.e., the initial position where it is moved to the maximum degree in the $W_1$ direction indicated by arrow in FIG. 20 or the position where it is moved to the vertical movement position 55 which permits vertical movement operation of the accommodating body 73 moved to the maximum degree in the $W_2$ direction indicated by arrow in FIG. 20. Also with respect to the cam plate 109 and the supporting plate 108 attached to the other side plate 4 side, when the drive cam gear 107 is rotated in a left direction which is counterclockwise direction in FIG. 20, such a phase difference to produce lag of 45° as rotational angle of the drive cam gear 107 takes place as shown in FIG. 36 at the maximum point of the slide position of the supporting plate 108, i.e., the position where it is moved to the maximum degree in the $V_2$ direction indicated by arrow in FIG. 20 to support respective supporting pins 80, 81 of the accommodating unit 73 by the supporting projecting piece 175 with respect to the maximum point of the slide position of the cam plate, i.e., the initial position where it is moved to the maximum degree in the $W_1$ direction indicated by arrow in FIG. 20 or the position where it is moved to the vertical movement position which permits vertical movement operation of the accommodating unit 73 moved to the maximum degree in the $W_2$ direction indicated by arrow in FIG. 20.

In this example, there is attached, through one side plate 3 positioned at the right side in FIG. 1 of the chassis 1, a first detection switch 148 for detecting that the supporting plate 108 is moved to the maximum degree in the $V_2$ direction indicated by arrow in FIG. 20 and is moved to the position where it supports respective supporting pins 80, 81 of the accommodating unit 73 by means of the supporting projection piece 175 to detect position of the tray 84 accommodated within the accommodating unit 73. In the first detection switch 148, when the supporting plate 108 reaches to the position where it supports the accommodating unit 73 moved to the maximum degree in the $V_2$ direction indicated by arrow in FIG. 20, a pressure operation element 148a is caused to undergo pressure operation by a switch pressure piece 108a formed in a bent form at the rear end side of the supporting plate 108, thus to detect that the supporting plate 108 has reached the position where it supports the accommodating unit 73. Further by counting how many times the first detection switch 148 is caused to undergo pressure-operation, detection of how many times the supporting plate 108 is reciprocated in the $V_1$ direction indicated by arrow and in the $V_2$ direction indicated by arrow in FIG. 20, i.e., the number of reciprocations of the accommodating unit 73 is carried out. Thus, the position of the tray 84 accommodated within the accommodating unit 73, i.e., height position of the accommodating unit 73 is detected.

Moreover, on the bottom plate 2 of the chassis 1, as shown in FIG. 2, there is disposed a second detection switch 147 for detecting an initial position of the accommodating unit 73 in a manner opposite to the bottom surface of the accommodating unit 73. When the accommodating unit 73 is moved to the initial position which is the lowest position located at the bottom plate 2 side of the chassis 1, the second detection switch 147 is pressed by the bottom surface of the accommodating unit 73. Accordingly, after the second detection switch 117 is pressed by the accommodating unit 73, how many number of times the first detection switch 117 is pressed by the supporting plate 108 is counted, whereby the rising position from the initial position of the accommodating unit 73 is detected.

The vertical movement mechanism 210 of the accommodating unit 83, which is provided with the cam plates 109 and the supporting plates 108 constituted in a manner as described above permits the accommodating unit 73 to undergo rising operation or falling operation in accordance with forward rotation or rotation in a reverse direction of the vertical movement drive motor 52 constituting the vertical movement drive mechanism 211.

The operation for allowing the accommodating unit 73 to undergo vertical movement operation will now be described.

Figure 22:
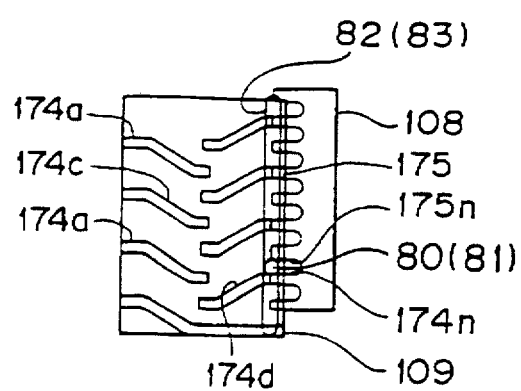
FIG. 22 is a side view showing the positional relationship in the initial state of supporting plate and cam plate constituting the vertical movement mechanism.
Figure 23:
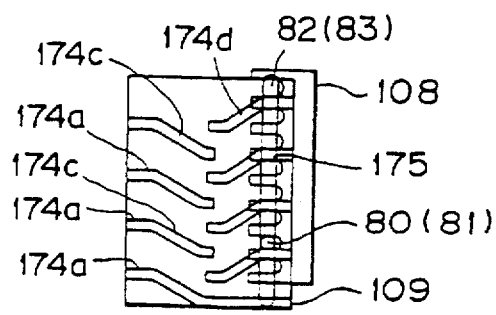
FIG. 23 is a side view showing the positional relationship of the supporting plate and the cam plate when drive cam gear constituting the vertical movement mechanism is rotated by 30°.
Figure 24:
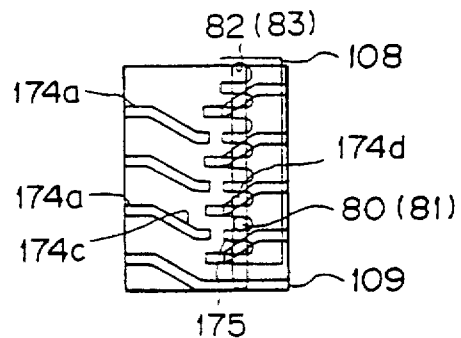
FIG. 24 is a side view showing the positional relationship of the supporting plate and the cam plate when the drive cam gear is rotated by 60°.
Figure 25:
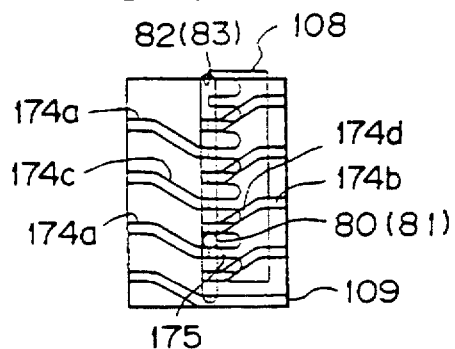
FIG. 25 is a side view showing the positional relationship of the supporting plate and the cam plate when the drive cam gear is rotated by 90°.

Initially, as shown in FIG. 20, the drive cam gear 107 is located at an initial position which is the rotational position where long side of the elliptical cam groove 157 is in parallel to the X-direction indicated by arrow and the Y-direction indicated by arrow in FIG. 20 which are vertical movement direction of the accommodating unit 73, the cam plate 109 is located at an initial position where it is moved to the maximum degree to the front surface side of the outer casing 125 in the $W_1$ direction indicated by arrow in FIG. 20, and supporting pins 80, 81 provided at the accommodating unit 73 are placed in the state where they are supported by arbitrary ones of a plurality of horizontal portions 174a and 174b formed in a multi-step form within the cam groove 111 of the cam plate 109. It is now assumed that, e.g., supporting pins 80, 81 are located on the n-th horizontal portion 174b of the cam groove 111 as shown in FIG. 22. When the drive cam gear, 107 is rotated by 30° in forward rotation direction which is clockwise direction in FIG. 20, supporting pins 80, 81 of the accommodating unit 73 are placed in the state where they are supported on the supporting surface 175a of the supporting projection piece 175 of the supporting plate 108. Namely, the supporting pins 80, 81 of the accommodating unit 73 are placed in the state where they are supported on the supporting projection piece 175 located at the n-th position from the bottom. When the drive cam gear 107 is further rotated in the forward rotation direction from such state and is located at the position where it is rotated by 60° from the initial position, the supporting pins 80, 81 are placed in the state where they are supported on the supporting surface 175a of the supporting projection piece 175 of the supporting plate 108 as shown in FIG. 24. As a result, these pins are caused to be off from the horizontal portion 174b of the cam groove 111, and is thus positioned at the side opposite to the horizontal portion 174a of the other side directed (faced) the horizontal portion 174b. Namely, although the supporting pins 80, 81 are caused to undergo release of supporting by the horizontal portion 174b, they are supported by the supporting projection piece 175 of the supporting plate 108. Thus, movement in the direction of the lower side is limited.

Figure 26:
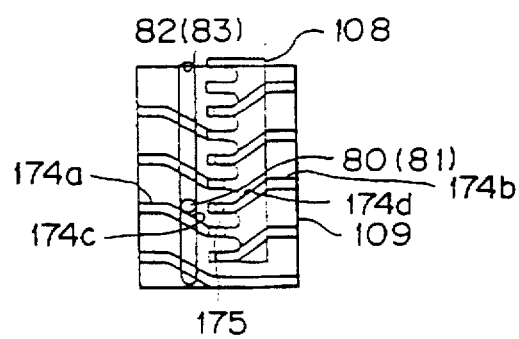
FIG. 26 is a side view showing the positional relationship of the supporting plate and the cam plate when the drive cam gear is rotated by 120°.
Figure 27:
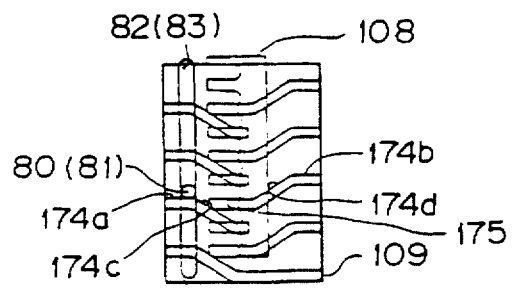
FIG. 27 is a side view showing the positional relationship of the supporting plate and the cam plate when the drive cam gear is rotated by 150°.
Figure 28:
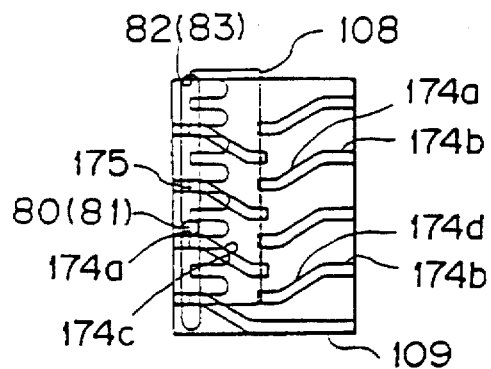
FIG. 28 is a side view showing the positional relationship of the supporting plate and the cam plate when the drive cam gear is rotated by 180°.

When the drive cam gear 107 is further rotated in the forward rotation direction and is located at the position where it is rotated by 90° from the initial position, although the supporting plate 108 attempts to move in a direction to withdraw from the state where it supports the supporting pins 80, 81 on the supporting projection piece 175, the supporting pins 80, 81 are positioned at an inclined surface 174c side continuous to the horizontal portion 174a of one side within the cam groove 111 of the cam plate 109. When the drive cam gear 107 is further rotated in the forward rotation direction and is located at the position where it is rotated by 120° from the initial position, the supporting pins 80, 81 are withdrawn from on the supporting projection piece 175 of the supporting plate 108 as shown in FIG. 26, and is placed in the state where it is supported on an inclined surface portion 174c continuous to the horizontal portion 174a formed at one side within the cam groove 111 of the cam plate 109. When the drive cam gear 107 is further rotated in forward rotation from such state and is located at the position where it is rotated by 150° from the initial position, the supporting pins 80, 81 reach the position on the (n+1)-th horizontal portion 174a located above by one step from the n-th horizontal portion 174b from the bottom which has been supported in the initial state.

Figure 29:
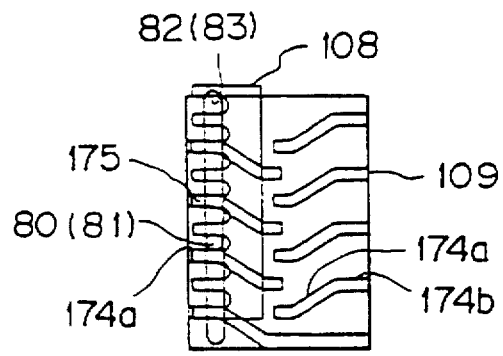
FIG. 29 is a side view showing the positional relationship of the supporting plate and the cam plate when the drive cam gear is rotated by 210°.
Figure 30:
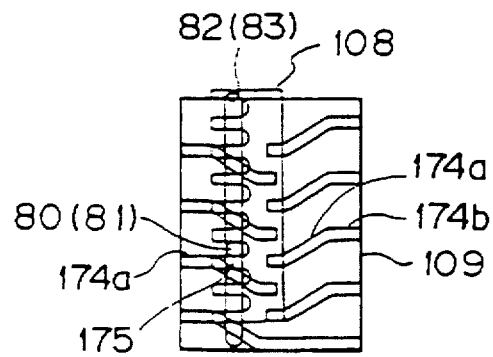
FIG. 30 is a side view showing the positional relationship of the supporting plate and the cam plate when the drive cam gear is rotated by 240°.
Figure 31:
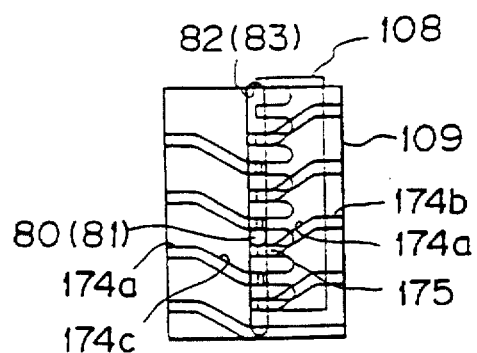
FIG. 31 is a side view showing the positional relationship of the supporting plate and the cam plate when the drive cam gear is rotated by 270°.

In the case where the drive cam gear 107 is further rotated in the forward rotation direction and reaches the position where it is rotated by 180° from the initial position, the supporting pins 80, 81 are placed in the state where they are supported on the (n+1)-th horizontal portion 174a located above by one step from the horizontal portion 174b on which they have been supported beforehand, and the horizontal portions 174a are placed in the state where they are caused to be in correspondence with is further rotated in the forward rotation direction from such state and reaches the position where it is rotated by 210° from the initial position, the supporting pins 80, 81 of the accommodating unit 73 are placed in the state, as shown in FIG. 29, where they are supported on the (n+1)-th supporting projection piece 175 located above by one step from the supporting projection piece 175 on which they have been supported beforehand. When the drive cam gear 107 is further rotated in the forward rotation direction from such state and reaches the position where it is rotated by 240° from the initial position, the supporting pins 80, 81 are placed in the state where they are supported on the supporting projection piece 175 of the supporting plate 108, whereupon they are withdrawn from the (n+1)-th horizontal portion 174a within the cam groove 111 of the cam plate 109, and reaches the position directed (faced) to the (n+2)-th horizontal portion 174b located above further by one step of the other side. At this time, the supporting pins 80, 81 are withdrawn from the (n+1)-th horizontal portion 174a, and are located at the position directed (faced) to the (n+2)-th horizontal portion 174b. However, since the supporting pins 80, 81 are placed in the state where they are supported by the (n+1)-th supporting projection piece 175, movement in a lower direction of the accommodating unit 73 is limited.

Figure 32:
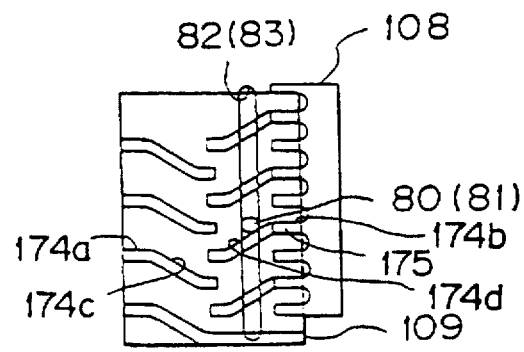
FIG. 32 is a side view showing the positional relationship of the supporting plate and the cam plate when the drive cam gear is rotated by 300°.
Figure 33:
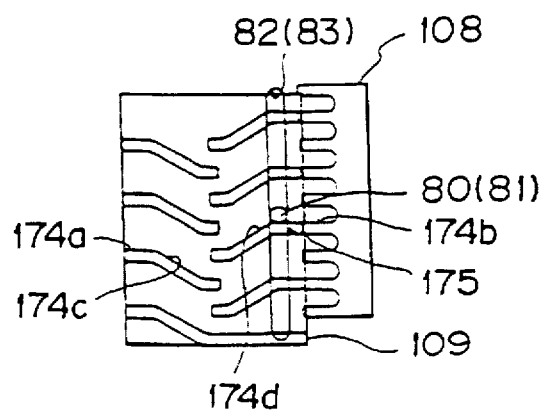
FIG. 33 is a side view showing the positional relationship of the supporting plate and the cam plate when the drive cam gear is rotated by 330°.

When the drive cam gear 107 is further rotated in the forward rotation direction and is located at the position where it is rotated by 270° from the initial position, the supporting plate 108 attempts to move in a withdrawing direction from the state where it supports supporting pins 80, 81 on the (n+1)-th supporting projection piece 175, but the supporting pins 80, 81 are placed at the position opposite to the inclined surface portion 174 continuous to the (n+2)-th horizontal portion 174b provided at the other side within the cam groove 111 of the cam plate 109. When the drive cam gear 107 is further rotated in the forward rotation direction and is located at the position where it is rotated by 300° from the initial position, the supporting pins 80, 81 are withdrawn from the (n+1)-th supporting projection piece 175 of the supporting plate 108 as shown in FIG. 32, and are placed in the state where they are supported on the inclined surface 174d continuous to the (n+2)-th horizontal portion 174b formed on the other side within the cam groove 33 of the cam plate 109. When the drive cam gear 107 is further rotated in the forward rotation direction from such state, and is located at the position where it is rotated by 330° from the initial position, the supporting pins 80, 81 are positioned in the vicinity of the (n+2)-th horizontal portion 174b formed at the other side within the cam groove 33 of the cam 109 as shown in FIG. 33. When the drive cam gear 107 is further rotated in forward rotation direction and is returned to the position where it is rotated by 360° from the initial position, i.e., the initial position, the supporting pins 80, 81 reach the position on the (n+2)-th horizontal portion 174b located above by two steps from the n-th horizontal portion 174b from the bottom in which they have been supported in the initial state.

Namely, when the drive cam gear 107 is rotated by 180° in the forward rotation direction, the supporting pins 80, 81 of the accommodating unit 73 are moved, e.g., from on the n-th horizontal portion 174b located at the other side within the cam groove 111 of the cam plate 109 or to the (n+1)-th horizontal portion 174a provided at one side located above by one step. When the drive cam gear 107 is rotated by 360° in the forward rotation direction, the supporting pins 80, 81 of the accommodating unit 73 are moved from the n-th horizontal portion 174b located at the other side to the (n+2)-th horizontal portion 174b located above by two steps. The drive cam gear 107 is continued to be driven in forward rotation direction in this way, whereby the accommodating unit 73 is caused to undergo rising operation successively by one step on the supporting projection piece 175 of the supporting plate 108 in a rising direction which is the X-direction indicated by arrow in FIG. 20.

Figure 34:
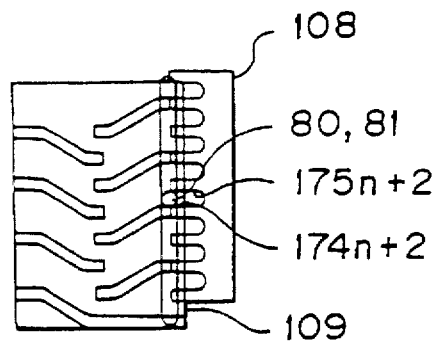
FIG. 34 is a side view showing the positional relationship of the supporting plate and the cam plate when the drive cam gear is rotated by 360°.

When the drive cam gear 107 is rotated in reverse (rotation) direction, movement in a falling direction of the Y-direction indicated by arrow in FIG. 20 is carried out in a manner to trace the previously described process shown in FIG. 22 to 34 in a reverse direction, i.e., in order to shift from the state where the supporting pins 80, 81 shown in FIG. 34 are located at the (n+2)-th horizontal portion 174b from the bottom to the state where the supporting pins 80, 81 shown in FIG. 22 are supported by the n-th horizontal portion 174b. Accordingly, the drive cam gear 107 is continued to be rotated in a reverse rotation direction, whereby the accommodating unit 73 is caused to undergo falling operation by one step in succession in the lower side direction.

The loading mechanism 220 for selecting one of a plurality of trays 84 accommodated within the accommodating unit 73 to allow it to undergo loading operation onto the disc driving unit 7 will now be described. This loading mechanism 220 is provided with a movement block 97 movably supported in a direction in parallel to the plane of the tray 84 accommodated within the accommodating unit 73 in the $O_1$ direction indicated by arrow and in the $O_2$ direction indicated by arrow in FIG. 17 along a guide shaft 101 attached to the right side plate 3 positioned at the right side in FIG. 1 of the chassis 1. The guide shaft 101 for supporting the movement block 97 is formed so as to take pillar-shape which is square in cross section, and is attached in parallel to the outside surface side of the side plate 3 in the state where one end thereof is supported by supporting frame 102 projected substantially at the central portion of the side plate 3, and the other end is supported by supporting frame 103 projected at the backward side of the side plate 3. The movement block 97 is integrally formed by synthetic resin, etc., and is provided with a guide hole 100 through which the guide shaft 101 is inserted. The guide shaft 101 is inserted through the guide hole 100, whereby the movement block 97 is guided by the guide shaft 101 and is movably supported in a direction in parallel to the plane of the tray 84 accommodated within the accommodating unit 73.

Moreover, an engagement projection 99 is projected at the movement block 97 in a manner to face to the side plate 3. This engagement projection 99 is projected inwardly of the chassis 1 through a cut hole 105 bored along the guide shaft 101. When the movement block 97 is positioned at the front end side of the guide shaft 101 in a left direction in FIG. 17, it projects the engagement projection 99 into the accommodating unit 73 through the cut portion 78 at the back side formed at the side plate 76 of the accommodating unit 73 to engage it with the engagement recessed portion 92 provided at any one of plural trays 84 accommodated in a multi-stage shape within the accommodating unit 73.

It is to be noted that since trays 84 accommodated within the accommodating unit 73 are accommodated in a multi-step manner in such a manner they are stacked with their planes being opposite to each other, engagement recessed portions 92 provided at respective trays 84 are caused to communicate in upper and lower directions. Accordingly, even in the state where the engagement recessed portion 99 of the movement block 97 is engaged with the engagement recessed portion 92, the accommodating unit 73 is permitted to undergo vertical movement operation by the vertical movement mechanism 210.

Figure 17:
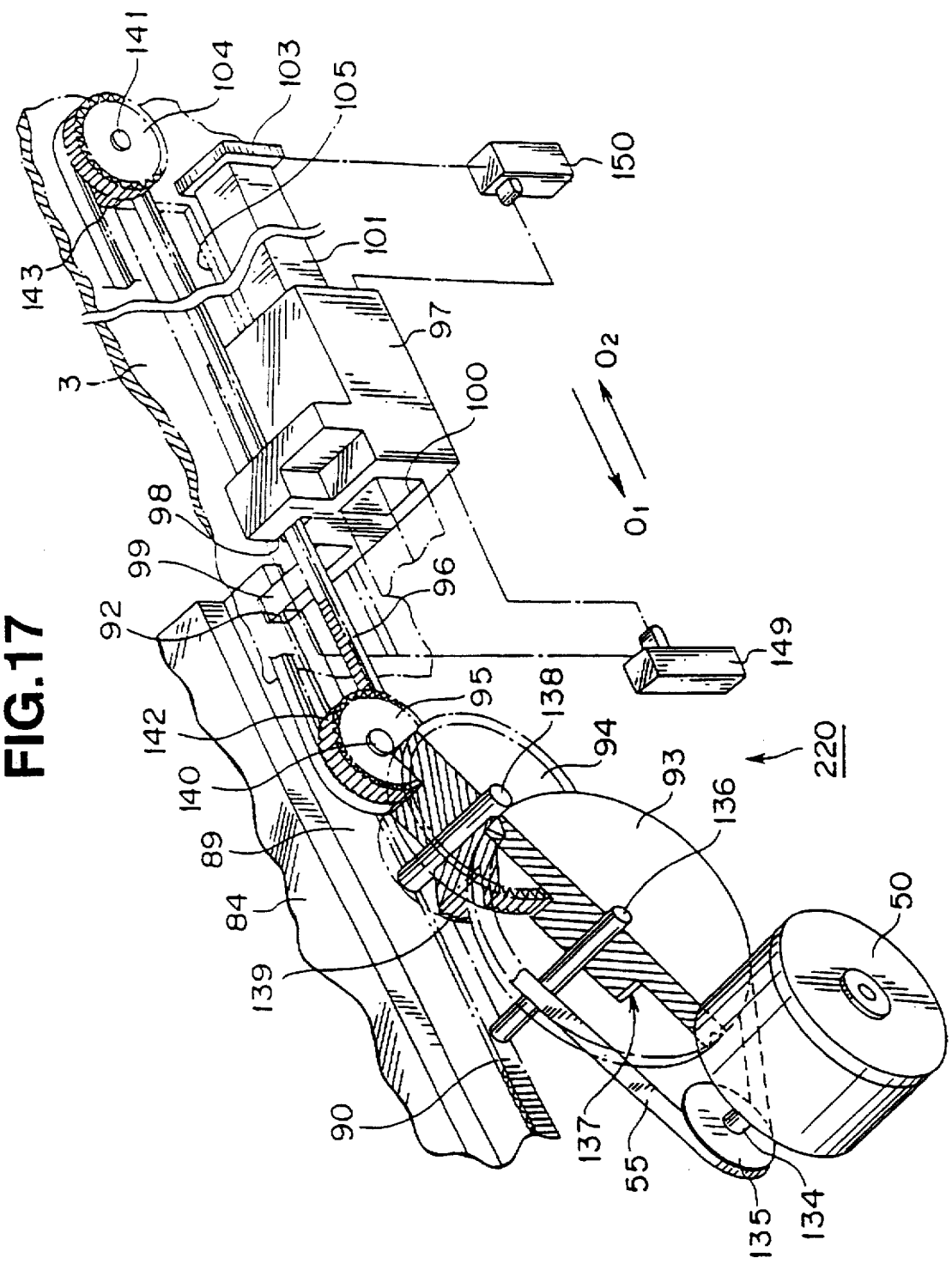
FIG. 17 is an enlarged perspective view showing the essential part of loading mechanism of the disc player according to this invention.

The movement block 97 is caused to undergo movement operation in the $O_1$ direction indicated by arrow and in the $O_2$ direction indicated by arrow in FIG. 17 by the loading drive motor 50 attached to the attachment base 33. The drive force of the loading drive motor 50 is transmitted to a driven pulley 93 through the drive pulley 135 attached to the drive shaft 134 of the drive motor 50 and the drive belt 55 wound on the drive pulley 135. This driven pulley 93 is rotatably attached to the side plate 3 through a support shaft 136. A gear portion 137 is integrally formed at the driven pulley 93. This gear portion 137 is meshed with a drive force transmission gear 94 rotatably pivoted through the support shaft 138 at the side plate 3. A small diameter gear portion 139 is integrally formed at the transmission gear 94. This small diameter gear portion 139 is meshed with a first timing gear 95 on which a timing belt 96 is wound, which is rotatably supported through the support shaft 140 at the side plate 3. This first timing gear 95 is provided in the vicinity of the front end of the cut hole 105. In addition, a second timing gear 104 on which a timing belt 96 is wound is disposed, through a support shaft 141 vertically provided on the side plate 3, in the vicinity of the back end of the cut hole 105.

Further, the timing belt 96 is wound between the first and second timing gears 95, 104. The middle portion of the timing belt 96 is inserted into an insertion groove 98 bored at one side surface of the movement block 97, and is connected to the inside surface of the insertion groove 98 and is thus connected to the movement block 97. Accordingly, when the loading drive motor 50 is driven so that the timing belt 96 is rotated, the movement block 97 is caused to undergo movement operation in the $O_1$ direction indicated by arrow and in the $O_2$ direction indicated by arrow in FIG. 17 in one body with the timing belt 96.

When the movement block 97 is moved toward the backward side in the direction $O_2$ direction in FIG. 17 along the guide shaft 101 in the state where the engagement projection 99 is engaged with the engagement recessed portion 92 of one tray 84 accommodated within the accommodating unit 73, the one tray 84 is drawn out from the accommodating unit 73, and is caused to undergo movement operation in the $O_2$ direction indicated by arrow in FIG. 17. Namely, a selecting operation for carrying out drawing operation of a desired one from a plurality of trays 84 accommodated within the accommodating unit 73 by the loading mechanism 220 is carried out in the state where the movement block 97 is moved in the $O_2$ direction indicated by arrow in FIG. 17 where the movement block 97 is positioned at the accommodating unit 73 side.

The tray 84 which has been drawn out from the accommodating unit 73 through the movement block 97 is supported by a chucking frame 12 positioned at the backward side of the accommodating unit 73, i.e., inwardly of the outer casing 125, and is moved to the loading position opposite to the disc table 10 of the disc rotation operating mechanism 11.

Meanwhile, at the forward position in a left direction in FIG. 17 of the side plate 3, there is disposed an accommodation position detecting switch 149 which is subjected to pressing-operation by the movement block 97 when the movement block 97 is moved in the $O_1$ direction indicated by arrow in FIG. 17 so that tray 84 accommodated within the accommodating unit 73 can be drawn out, or the tray 84 which has been once drawn out from the accommodating unit 73 is moved to the position where it is accommodated within the accommodating unit 73. Moreover, at the backward position in the right direction in FIG. 17 of the side plate 3, there is disposed a draw-out operation detecting switch 150 subjected to pressing-operation by the movement block 97 and adapted for detecting that the tray 84 which has been drawn out reaches the loading position when the movement block 97 moves in the O₂ direction indicated by arrow in FIG. 17 to move the tray 84 which has been drawn out from the accommodating unit 73 to the loading position opposite to the disc driving unit 7.

The chucking mechanism 221 for allowing the tray 84 drawn out from the accommodating unit 73 to undergo loading operation onto the disc driving unit 7 by the above-described loading mechanism 220 will now be described.

This chucking mechanism 221 is provided with chucking frame 12 for holding tray 84 drawn out from the accommodating unit 73. This chucking frame 12 is formed so as to take a thin box-shape which is square as shown in FIG. 1, and is of a structure in which a tray holding portion 12a for holding the tray 84 is provided between top plate 15 and bottom plate 16, and the front surface side opposite to the accommodating unit 73 and one side surface side perpendicular to the front surface side are opened. Thus, the tray 84 which has been dragon out from the accommodating unit 73 is insertion-held by the tray holding portion 12a through the opened portion of the front surface side.

Moreover, at the upper surface side of the bottom plate 15 of the chucking frame 12, guide projections 17 for guiding movement of the tray 84 inserted into the tray holding portion 12a are projected. This guide projection 17 is relatively engaged with the guide groove 91 provided at the bottom surface side from the front surface side of the tray 84 inserted into the tray holding portion 12a and withdrawn therefrom to guide movement direction of the tray 84. Further, at the bottom plate 15 of the chucking frame 12, there is formed an opening portion 16 for allowing optical disc 201 or 202 mounted on the tray 84 held by the tray holding portion 12a to be faced to the lower side. This opening portion 16 is formed so as to have dimensions sufficient to allow the opening portion 87 adapted to face optical disc 201 or 202 to the lower side, which is formed on the bottom surface of the tray 84, to be faced to the lower side.

Substantially at the center portion of the top plate 14 of the chucking frame 12, a chucking plate 18 for clamping the optical disc 201 or 202 mounted on the tray 84 onto the disc table 10 of the disc driving unit 7 is rotatably attached. This chucking plate 18 is formed so as to take a shape of disc having substantially the same dimensions as those of the disc table 10 on which optical disc 201 or 202 is mounted, and the chucking frame 12 is supported by the chassis 1, whereby the chucking plate 18 is opposed to the disc table 10 of the disc rotation operation mechanism 11 with their centers of rotation being in correspondence with each other.

At both sides opposite to each other of the lower end side of the chucking frame 12, a pair of supporting pins 19, 20 and a pair of supporting 19, 20 are respectively projected in left and right directions. The chucking frame 12 is supported, through these supporting pins 19, 20 and 19, 20, by left and right vertical movement operation plates 23, 23 disposed at the outside surface side of respective side plates 3, 4 of the chassis 1. Namely, the chucking frame 12 is supported between left and right side plates 3, 4 of the chassis 1 through vertical movement operation plates 23, 23, and is caused to undergo vertical movement operation in upper and lower directions which is a direction in which the chucking frame 12 is in contact with the bottom plate 2 of the chassis 1 and is away therefrom. Meanwhile, respective supporting pins 19, 20 and 19, 20 are inserted into vertical movement guide grooves 21, 22 and 21, 22 bored extending in upper and lower directions of the side plates 3, 4, whereby the chucking frame 12 is guided by these vertical movement guide grooves 21, 22 and 21, 22 so that they are caused to undergo vertical movement operation in upper and lower directions of the U direction and the T direction indicated by arrow in FIG. 18.

Figure 18:
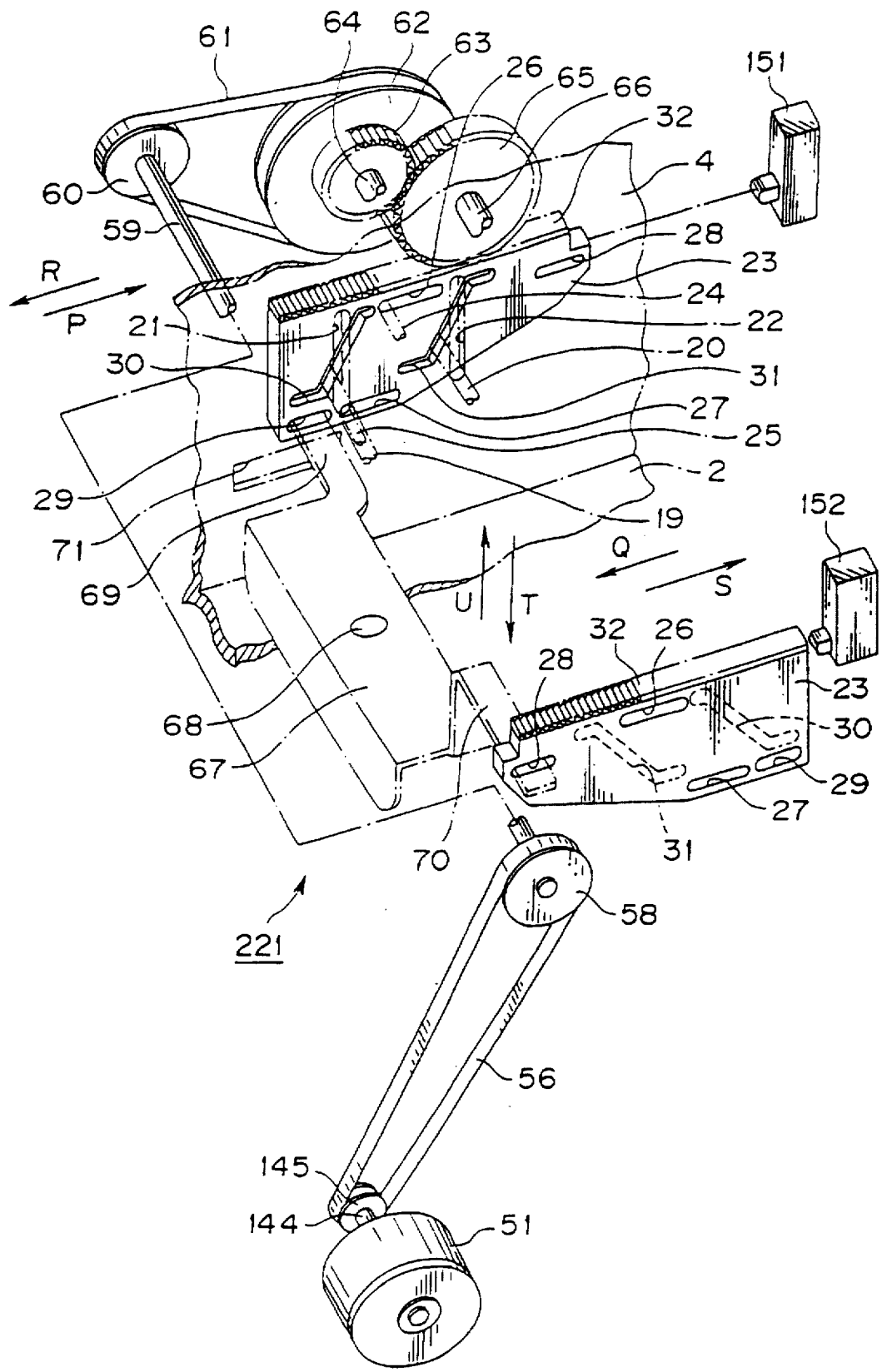
FIG. 18 is an enlarged perspective view showing the essential part of chucking mechanism of the disc player according to this invention.

When the chucking frame 12 is moved toward the upper side of the U-direction indicated by arrow in FIG. 18, it is moved to height position corresponding to the movement block 97 constituting the previously-described loading mechanism 220, i.e., to the position where the tray 84 drawn out from the accommodating unit 73 by the movement block 97 can be horizontally inserted into the tray holding portion 12a through the opened forward end side. Moreover, when the chucking frame 12 is moved toward the lower side of the T-direction indicated by arrow in FIG. 18, it is caused to have height position sufficient for allowing optical disc 201 or 202 mounted on the tray 84 held at the tray holding portion 12a to be loaded onto the disc table 10 of the disc driving unit 7. At this time, the chucking plate 18 holds therebetween the peripheral portion of the center hole 203 of the optical disc 201 or 202 mounted on the disc table 10 in cooperation with the disc table 10 to clamp such optical disc in the state where it can be rotated in one body with the disc table 10. In this example, the disc table 10 includes therewithin a magnet, and is adapted to attract the chucking plate 18 formed with magnetic material such as metallic plate, etc. thereby to hold therebetween optical disc 201 or 202 in cooperation with the chucking plate 18.

A pair of left and right vertical movement operation plates 23, 23 disposed at the outside surface side of respective side plates 3, 4 and adapted for carrying out vertical movement operation of the chucking plate 18 are supported so that they are permitted to undergo movement operation in forward and backward directions of the P-direction indicated by arrow and the R-direction indicated by arrow, and the Q-direction indicated by arrow and the S-direction indicated by arrow in FIG. 18. These left and right vertical movement operation plates 23, 23 are formed so as to have the same shape. These vertical movement operation plates 23, 23 are provided with rack gear portions 32 formed on the upper end surfaces thereof, and are provided with movement guide grooves 26, 27 for guiding movement in forward and backward directions bored at the upper edge side and the lower edge side. On the other hand, at the outside surface side of the side plate 3 positioned at the right side in FIG. 1 of the chassis 1, supporting pins 24, 25 inserted into movement guide grooves 26, 27 board at the vertical movement operation plate 23 are projected. Further, the vertical movement operation plate 23 is disposed on the side plate 3 by inserting supporting pins 24, 25 into the movement guide grooves 26, 27, whereby it is supported on the supporting pins 24, 25. Thus, the vertical movement operation plate 23 is caused to undergo movement operation in forward and backward directions of the Q direction indicated by arrow and the S direction indicated by arrow in FIG. 18 within the range of the movement guide grooves 26, 27. Moreover, also at the side plate 4 side positioned at the left side in FIG. 1 of the chassis 1, similarly to the side plate 3 side of the right side, supporting pins 24, 25 are provided. Further, the vertical movement operation plate 23 is supported by these supporting pins 24, 25, and is caused to undergo movement operation in forward and backward directions of the P direction indicated by arrow and the R direction indicated by arrow in FIG. 18 within the range of the movement guide grooves 26, 27.

At the surface side opposite to respective side plates 3, 4 of the vertical movement operation plates 23, 23, a pair of inclined cam grooves 30, 31 are formed. The front end sides of respective supporting pins 19, 20 projected at the both sides of the chucking plate 18 inserted into the vertical movement guide grooves 21, 22 bored at respective side plates 3, 4 are engaged with these inclined cam grooves 30, 31. The inclined cam grooves 30, 31 provided at the vertical movement operation plate 23 disposed on the side plate 3 of the right side are formed so as to have an inclined surface inclined in a direction from the forward side toward the Q direction indicated by arrow in FIG. 18 toward the backward side toward the S direction indicated by arrow in FIG. 18, and the inclined cam grooves 30, 31 provided at the vertical movement operation plate 23 disposed on the side plate 4 of the left side are formed so as to have an inclined surface inclined in a direction rising from the forward side toward the R direction indicated by arrow in FIG. 18 toward the backward side toward the P direction indicated by arrow in FIG. 18 in a manner opposite to the above.

Namely, at the side plate 3 side of the right side, when the vertical movement operation plate 23 is moved toward the backward side of the S direction indicated by arrow in FIG. 18, chucking frame 12 is moved toward the upper side of the U direction indicated by arrow in FIG. 18. When the vertical movement operation plate 23 is moved toward the forward side of the Q direction indicated by arrow in FIG. 18, the chucking frame 12 is moved toward the lower side of the T direction indicated by arrow in FIG. 18. Moreover, at the side plate 4 side of the left side, when the vertical movement operation plate 23 is moved toward the forward side of the R direction indicated by arrow in FIG. 18, the chucking frame 12 is moved toward the upper side of the U direction indicated by arrow in FIG. 18. When the vertical movement operation plate 23 is moved toward the backward side of the P direction of arrow in FIG. 18, the chucking frame 12 is moved toward the lower side of the T direction indicated by arrow in FIG. 18.

The left and right vertical movement operation plates 23, 23 are connected by a connection arm 67 of which a central portion is movably supported through the support shaft 68 on the bottom surface 2 of the chassis 1, whereby those vertical movement operation plates are connected so that they are moved in directions opposite to each other. Namely, in the vertical movement operation plate 23 disposed at the side plate 4 side of the left side, engagement portion 69 formed at one end of the connecting arm 67 is engaged with engagement groove 29 bored at one end side of the vertical movement operation plate 23. The engagement portion 69 of one end side is projected toward the external side of the side plate 4 through a through-hole 71 bored at the side plate 4. Moreover, in the vertical movement operation plate 23 disposed at the side plate 3 side of the right side, engagement portion 70 formed at the other end of the connecting arm 67 is engaged with engagement groove 28 bored at the other end side of the vertical movement operation plate 23. The engagement portion 70 of the other end side is projected toward the external side of the side plate 3 through a through-hole 72 bored at the side plate 3.

Respective vertical movement operation plates 23, 23 disposed on the left and right side plates 3, 4 are caused to undergo movement operation in directions opposite to each other by drive force of a chucking drive motor 51 attached at the attachment base 33. Namely, drive force is transmitted to a right side transmission pulley 58 on which the drive belt 55 is wound through drive pulley 145 attached to drive shaft 144 of the drive motor 51 and the drive belt 56 wound on the drive pulley 145. This right side transmission pulley 58 is attached to the right end side in FIG. 18 of support shaft 59 rotatably supported extending between respective side plates 3, 4. A left side transmission pulley 60 is attached to the left end side of the support shaft 59. A drive belt 61 is wound between the left side transmission pulley 60 and a driven pulley 62 rotatably attached through the support shaft 64 vertically provided on the side plate 4 of the left side. A gear portion 63 is integrally formed at the driven pulley 62. This gear portion 63 is meshed with a transmission gear 65 rotatably supported through a support shaft 66 at the side plate 4 of the left side. This transmission gear 65 is meshed with the rack gear portion 32 of the vertical movement operation plate 23 disposed along the side plate 4 of the left side.

Namely, the vertical movement operation plate 23 disposed along the side plate 4 of the left side is caused to undergo movement operation in forward and backward directions of the R direction indicated by arrow and the P direction indicated by arrow in FIG. 18 by driving of the chucking drive motor 51, and the vertical movement operation plate 23 disposed along the side plate 3 of the right side is caused to undergo movement operation in the S direction indicated by arrow and in the Q direction indicated by arrow in FIG. 18 which is the direction opposite to that of the vertical movement operation plate 23 disposed along the side plate 4 of the left side. The respective vertical movement operation plates 23, 23 are caused to undergo movement operation in directions opposite to each other in this way, where by the chucking frame 12 is caused to undergo movement operation, while maintaining the horizontal state, in upper and lower directions of the U direction indicated by arrow and the T direction indicated by arrow in FIG. 18 extending between height position which permits tray 84 drawn out from the accommodating unit 73 to be inserted into the tray holding portion 12a by the loading mechanism 220 and height position for allowing optical disc 201 or 202 mounted on the tray 84 held by the tray holding portion 12a to be loaded onto the disc table 10.

At the position opposite to the backward end portion of the vertical movement operation plate 22 disposed at the side plate 4 side of the left side, there is disposed a disc loading (mounting) position detecting switch 151 for detecting that optical disc 201 or 202 mounted on the tray 84 has been loaded. When the chucking frame 12 is caused to undergo movement operation toward the lower side in the T direction indicated by arrow in FIG. 18, and the optical disc 201 or 202 mounted on the tray 84 held by the chucking frame 12 takes a height position where it is mounted on the disc table 10, the disc loading position detecting switch 151 is caused to undergo pressing-operation by the backward end portion of the vertical movement operation plate 23. At the position opposite to the backward end portion of the vertical movement operation plate 23 disposed at the side plate 3 side of the right side, there is disposed a tray insertion/withdrawal position detecting switch 152 for detecting that the chucking frame 12 is moved to the position which can receive the tray 84 drawn out from the accommodating unit 73 by the loading mechanism 220 or accommodate the tray 84 held at the tray holding portion 12a into the accommodating unit 73. This tray insertion/withdrawal position detecting switch 152 is caused to undergo pressing-operation by the backward end portion of the vertical movement operation plate 23 when the chucking frame 12 is caused to undergo movement operation toward upper side in the U direction indicated by arrow in FIG. 18 and is moved to a height position which permits insertion/withdrawal of the tray 84 with respect to the accommodating unit 73 by the loading mechanism 220.

The eject mechanism 230 for allowing the tray 84 accommodated within the accommodating unit 73 to undergo draw-out operation toward the external direction of the outer casing 125 constituting the player body will now be described.

Figure 15:
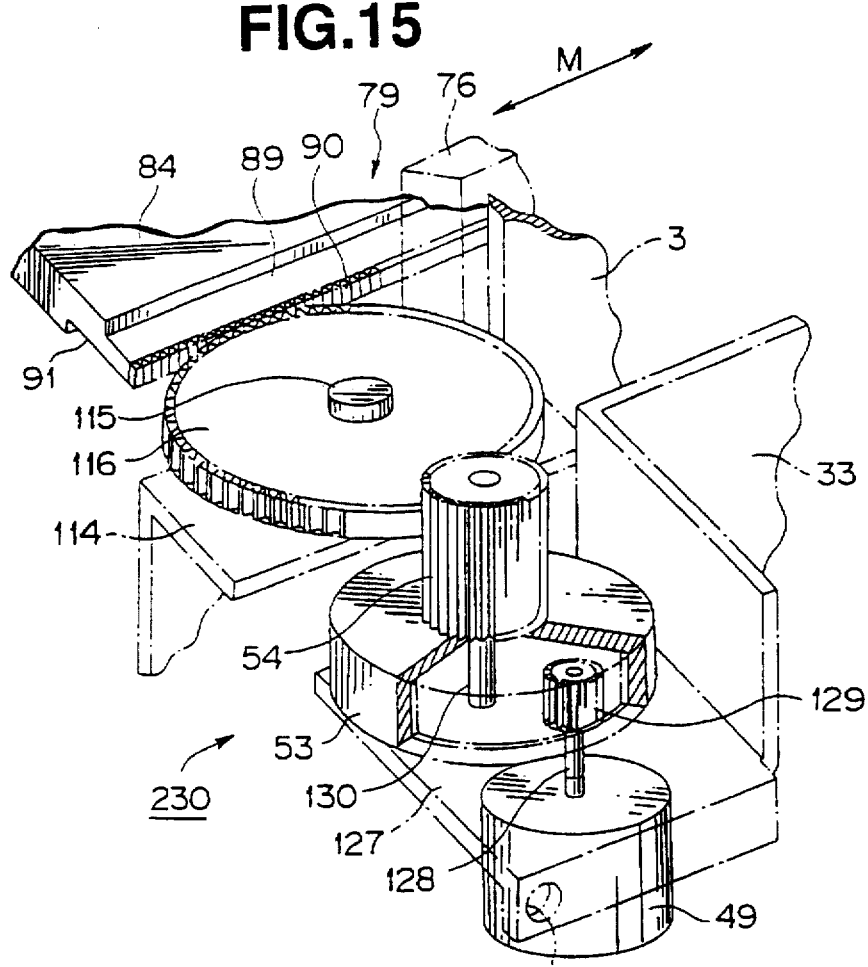
FIG. 15 is an enlarged perspective view showing the essential part of eject mechanism of a disc player according to this invention.

The eject mechanism 230 is provided, as shown in FIG. 15, with a drive motor 49 for eject operation attached on the attachment base 33. This drive motor 49 for eject operation is attached, as shown in FIG. 1, to the horizontal plate portion 127 formed by bending the front end portion of the attachment base 33 with the drive shaft 128 being directed toward the upper side. At the drive shaft 128 of the drive motor 49 for eject operation, a drive gear 129 is attached. This drive gear 129 is meshed with a cylindrical gear 53 having a gear portion formed on the inner circumferential surface, which is pivoted on the support shaft 130 vertically provided on the horizontal plate portion 127. At the cylindrical gear 53, a transmission gear 54 is coaxially integrally formed. This transmission gear 54 is meshed with a pinion gear 116 pivoted on the support shaft 115 vertically provided on the side plate 3 of the right side. The support shaft 115 for supporting the pinion gear 116 is vertically provided on the horizontal plate portion 114 formed by bending the front end portion of the side plate 3 of the right side.

The pinion gear 116 is meshed, as shown in FIG. 15, with the front side portion of the rack gear potion 90 of the tray 84 selected so that it is drawn out toward the external of the outer casing 125 of trays 84 accommodated within the accommodating unit 73. The relationship between the pinion gear 116 and the rack gear portion 90 from any one of trays 84 accommodated within the accommodating unit 73 with which the pinion gear 116 is meshed is determined in dependency upon height position of the accommodating unit 73. The pinion gear 116 is faced to the internal of the accommodating unit 73 through front side cut portion 79 provided at the side plate 76 of the accommodating unit 73.

When the accommodating unit 73 is caused to undergo vertical movement operation through the vertical movement mechanism 210, respective trays 84 accommodated within the accommodating unit 73 are moved while allowing the rack gear portion 90 to be in slide contact with the pinion gear 116. The tray which has stopped in the state where the rack gear portion 90 is meshed with the pinion gear 116 is selected as tray 84 which is subjected to eject operation. The tray 84 selected by the eject mechanism 230 in this way is different from the tray 84 caused to undergo drawing operation by the loading mechanism 220. In this embodiment, the tray 84 selected by the eject mechanism 230 is accommodated at the position below by one step with respect to the position where the tray 84 selected by the loading mechanism 220 is accommodated.

Figure 16:
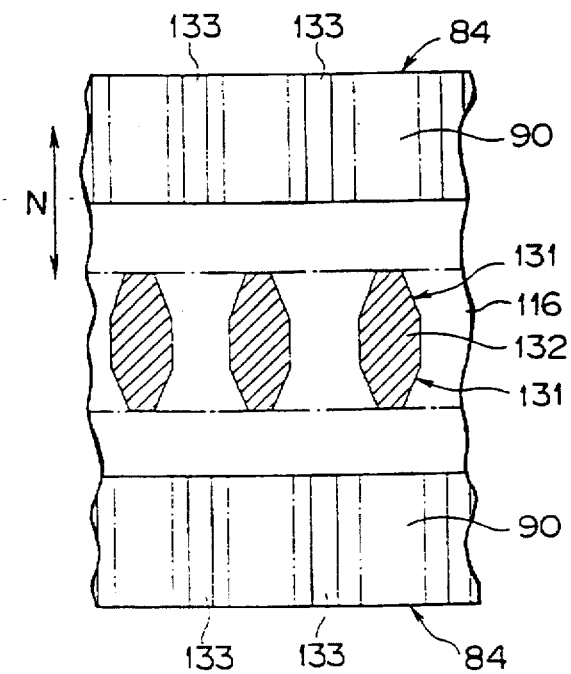
FIG. 16 is an enlarged side view showing the essential part of shape of rack gear portion and pinion gear constituting the eject mechanism.

In the pinion gear 116, as shown in FIG. 16, side portions of both sides of the toothed portion. 132, i.e., the portions in a direction perpendicular to respective rack gear portions 90 of the tray 84 are caused to be inclined portions 131, 131 having widths narrowed in a taper form. Accordingly, when the tray 84 accommodated within the accommodating unit 73 is moved in the N direction indicated by arrow in FIG. 16 with respect to the pinion gear 116, toothed portions 133 of respective rack gear portions 90 are permitted to be smoothly admitted into the portions between toothed portions 132 of the pinion gear 116, thus to guarantee smooth vertical movement operation of the accommodating unit 73.

The tray 84 which has been selected by the eject mechanism 230 in this way is caused to undergo draw-out operation from the accommodating unit 73 through the rack gear portion 90 by driving of the drive motor 49 for eject operation, and is projected toward the external of the outer casing 125.

Figure 37:
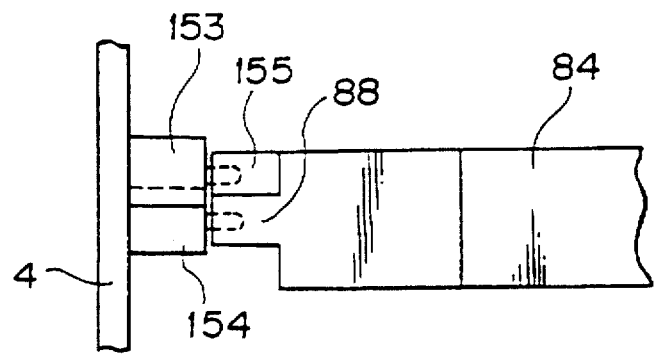
FIG. 37 is a front view showing the configuration of arrangement of detection switches for detecting position of tray.
Figure 38:
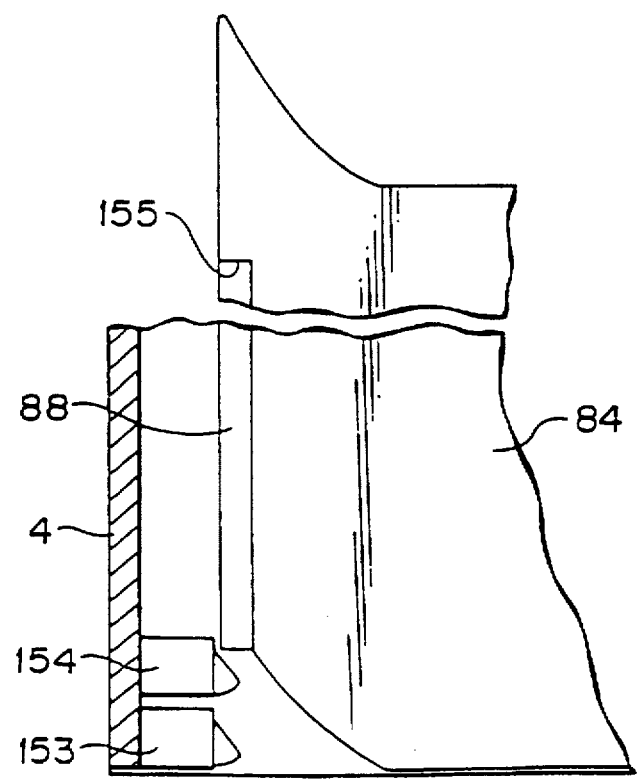
FIG. 38 is a plan view showing the configuration of arrangement of detection switches for detecting position of tray.
Figure 39:
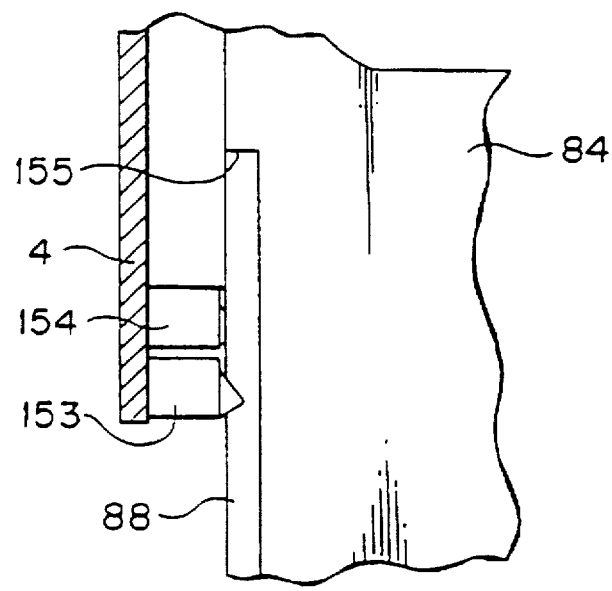
FIG. 39 is a plan view showing the operation state of the detection switch in the middle state where tray is drawn out toward outward direction of the outer casing.
Figure 41:
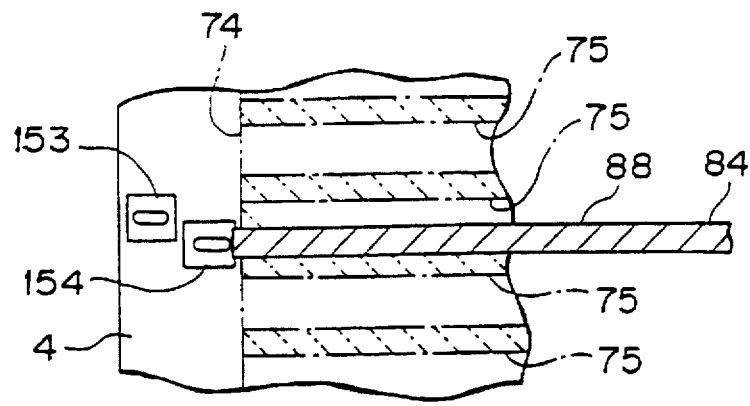
FIG. 41 is a side view showing the configuration of arrangement of detection switches for detecting position of tray.
Figure 42:
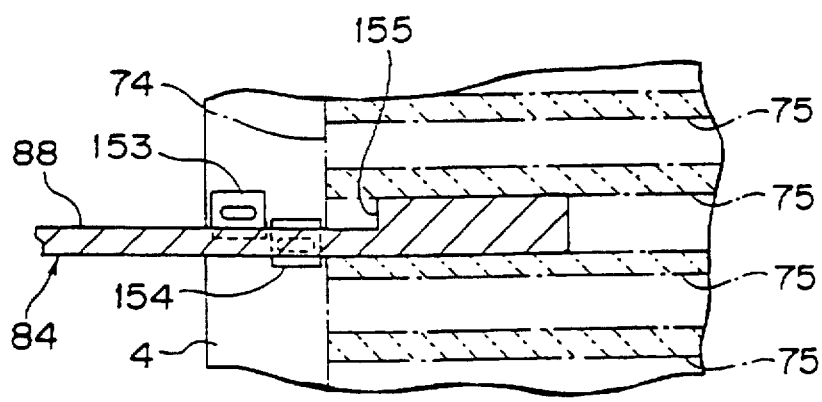
FIG. 42 is a plan view showing the configuration of arrangement of detection switches for detecting position of tray.

At the inside surface side of the side plate 4 of the right side of the chassis 1, a first tray position detecting switch 154 and a second tray position detecting switch 153 are disposed as shown in FIGS. 37, 38 and 41. These tray position detecting switches 154, 153 are caused to undergo pressing operation by one side edge portion of the tray 84 subjected to eject operation by the eject mechanism 230.

In the state where the tray 84 selected by the eject mechanism 230 is accommodated within the accommodating unit 73, the first tray position detecting switch 154 is disposed at the position close to the front end portion of one supporting piece 88 of the tray 88. Accordingly, when the tray 84 is caused to undergo movement operation toward the front surface side of the outer casing 125 toward the eject position direction even if quantity of such movement operation is very small, the first tray detection detecting switch 154 is caused to undergo pressing operation by the side end edge portion of one supporting piece 88.

The second tray position detecting switch 153 is disposed in the state positioned at the upper side with respect to one supporting piece 88 of the tray 84 selected by the eject mechanism 230. When the tray 84 is moved in a direction toward the external of the outer casing 125 which is the $Z_1$ direction indicated by arrow in FIG. 40 so that it reaches the eject position, the second tray position detecting switch 153 is caused to undergo pressing operation by the side surface portion of the tray 84 at the backward side of the rising surface 155 of the backward end side of one supporting piece 88 as shown in FIGS. 40 and 43.

Figure 40:
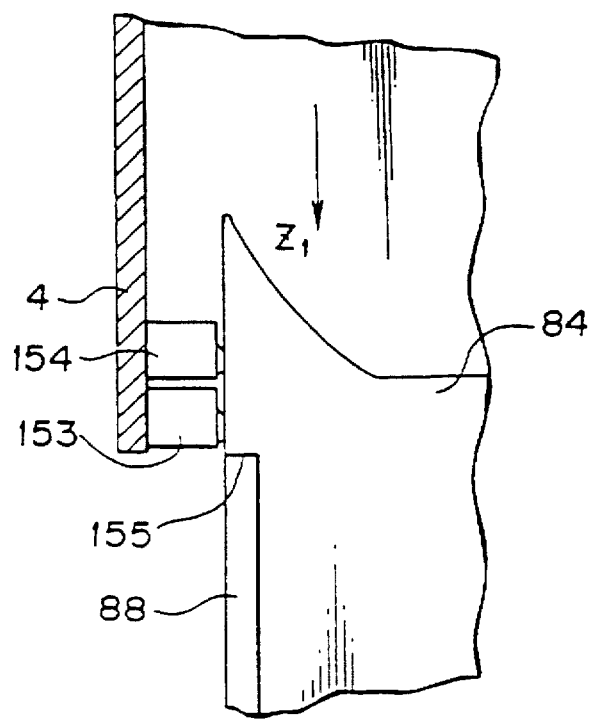
FIG. 40 is a plan view showing the state of detection switch in the state where tray is drawn out in an outward direction of the outer casing.

Accordingly, when the first and second tray position detecting switches 154, 153 are both in OFF state, there does not exists tray 84 drawn out by the eject mechanism 230 as shown in FIGS. 38 and 40, i.e., all trays 84 are accommodated and retained within the accommodating unit 73, or one tray 84 which has been drawn out from the accommodating unit 73 is caused to undergo loading operation by the loading mechanism 220, or is accommodated and held within the chucking frame 12 by the chucking mechanism 221 and other all trays 84 are accommodated and held within the accommodating unit 73.

Figure 43:
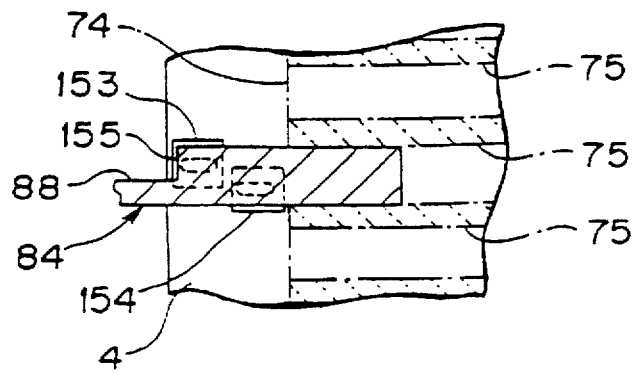
FIG. 43 is a plan view showing operation state of detection switch in the state where the tray is drawn out in an outward direction of the outer casing.

When the first and second tray position detecting switches 154, 153 are both in ON state, one tray 84 which has been selected by the eject mechanism 230 is moved to the eject position where it is drawn out toward the external of the outer casing 12 as shown in FIGS. 40 and 43.

When only the first tray position detecting switch 154 is in ON state and the second tray position detecting switch 153 is in OFF state, one tray 84 which has been selected by the eject mechanism 230 is located at the intermediate position between the accommodating position where this tray is accommodated and retained within the accommodating unit 73 and the eject position where it is drawn out toward the external of the outer casing 125.

In this example, at the position in the vicinity of the insertion/withdrawal hole 124 of the tray 84 within the outer casing 125, there is disposed, as shown in FIG. 2, a disc presence/absence detection sensor 176 for detecting whether or not optical disc 201 or 202 is mounted on the tray 84 caused to undergo movement operation toward the accommodating unit 73 side within the outer casing 125 from the eject position. This disc presence/absence sensor 176 is constituted by an optical sensor consisting of a light emitting element and a light receiving element. In the case where optical disc 201 or 202 is mounted on the tray 84 caused to undergo movement operation toward the accommodating unit 73 side within the outer casing 125 from the eject position, a light emitted from the light emitting element is reflected by the optical disc 201 or 202, and a reflected light is detected by the light receiving element. Thus, it is detected that the optical disc 201 or 202 is mounted on the tray 84. In the case where optical disc 201 or 202 is not mounted on the tray 84, a light emitted from the light emitting element is transmitted. Since detection by the light receiving element is not carried out, it is detected that optical disc 201 or 202 is not mounted on the tray 84.

It is to be noted that while the above-described disc presence/absence detection sensor 176 detects presence or absence of light reflected from the optical disc 201 or 202 to detect presence of absence of optical disc 201 or 202 on the tray 84, there may be employed a configuration in which a light emitting element and a light receiving element; are disposed with tray 84 subjected to movement operation being put therebetween, whereby when a light emitted from the light emitting element is detected by the light receiving element, a detection is made such that optical disc 201 or 202 does not exist on the tray 84.

Figure 44:
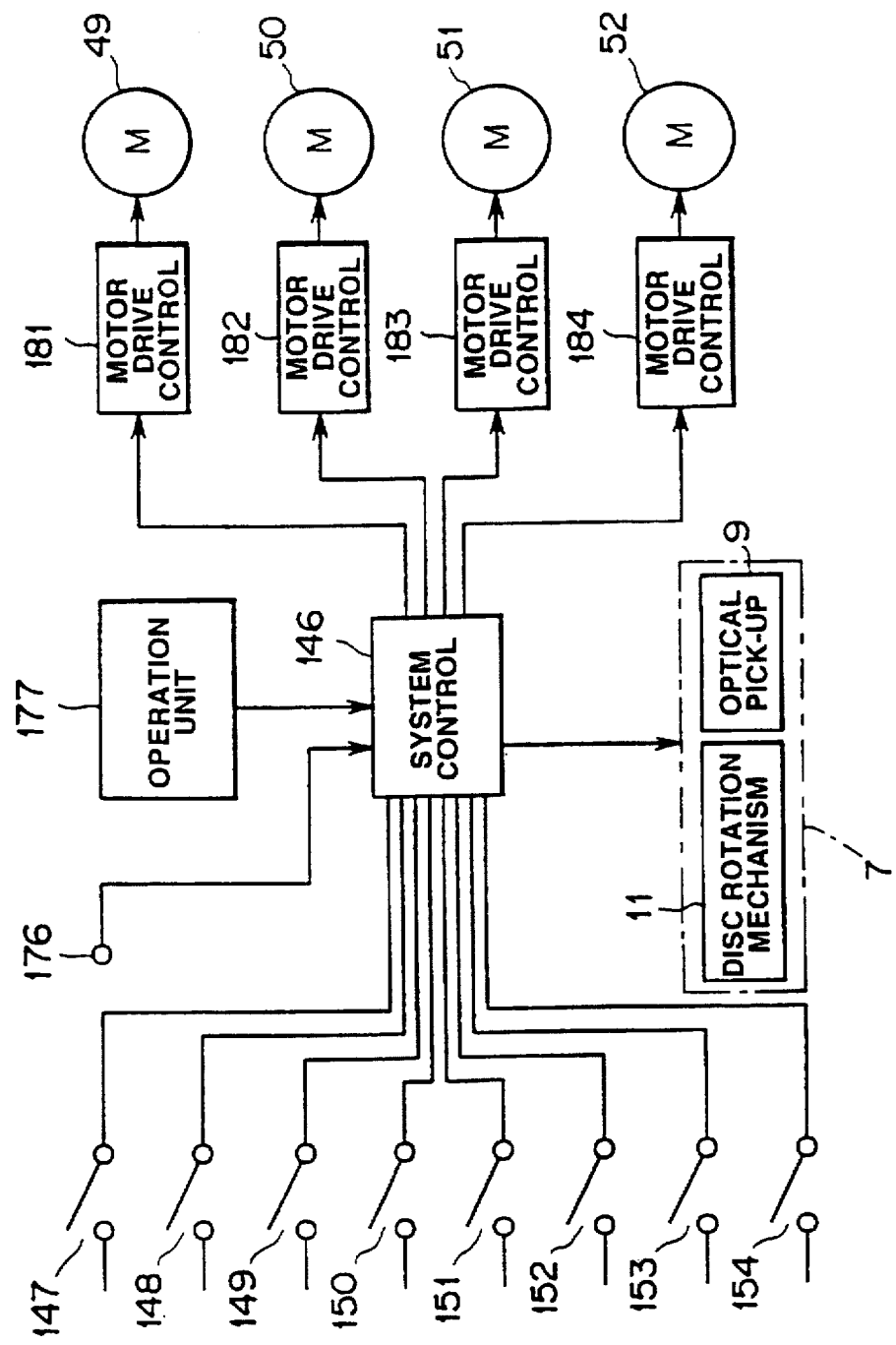
FIG. 44 is a block diagram showing system control unit for controlling the operation of the disc player according to this invention.

The disc player of this embodiment includes, as shown in FIG. 44, a system control unit 146 for controlling the operating mode or the operating state of this player. To the system control unit 146, a control signal selected by operation of an operation unit 177 for selecting various operating states such as an operation to select the operation mode of this player to select a desired one from a plurality of trays 84 accommodated within the accommodating unit 73 is inputted. Further, a detection output from the disc presence/absence detection sensor 176, a detection output from first detection switch 147 for detecting that the accommodating unit 73 is located at the initial position of the lowest position, a detection output from second detection switch 148 for detecting vertical movement position of the accommodating unit 73, a detection output from accommodation position detecting switch 149, a detection output from a drawing-out position detecting switch 150, a detection output from disc loading position detecting switch 151, a detection output from tray insertion/withdrawal position detecting switch 152, and detection outputs from tray position detecting switch 154 and second tray position detecting switch 153 are inputted to the system control unit 146, thus to control the operation of the disc player in dependency upon the results of these detection outputs.

Moreover, the system control unit 146 drives and controls, through respective motor drive control circuit sections 181 to 184, drive motor 49 for eject operation, drive motor 50 for loading, drive motor 51 for chucking and vertical movement drive motor.

Further, the system control unit 146 drives and controls respective drive motors 49, 50, 51, 52 in dependency upon a control signal inputted from the operation unit 177, and detection outputs from the disc presence/absence detection sensor 176 and respective detecting switches 147, 148, 149, 150, 151, 152, 154, 153. Moreover, the system control unit 146 also controls the disc driving unit 7 and the optical pick-up unit 9. Further, the system control unit 146 includes a memory for storing information indicating on which tray optical disc 201 or 202 is mounted among trays accommodated within the accommodating unit 73, which tray is drawn out toward the disc drive 7 side, and/or whether or not optical disc 201 or 202 mounted on the tray 84 is loaded on the disc driving unit 7.

In the disc player of this embodiment, when power is turned ON, position of the tray 84 is discriminated by the system control unit 146 on the basis of detection outputs from first and second tray position detecting switches 154, 153. Namely, whether or not any one of plural trays 84 accommodated within the accommodating unit 73 is in the state drawn out by the eject mechanism 230 is discriminated. When it is detected by first and second tray position detecting switches 154, 153 that any one of trays 84 is placed in the state where it is drawn out from the accommodating unit 73 by the eject mechanism 230, i.e., in the state where it is drawn out to the position between the eject position where it is drawn out toward the external of the outer casing 125 or the position where it is accommodated within the accommodating unit 73 and the eject position, the system control unit 146 drives and controls the drive motor 49 for ejection operation through a motor drive control circuit section 181 to allow the tray 84 placed in drawn out state to be accommodated within the accommodating unit 73.

When power is once turned ON so that this disc player is placed in the operable state, in the case where the state where any one of trays 84 is drawn out from the accommodating unit 73 is detected by the first and second tray position detecting switches 154, 153, the system control unit 146 permits the drive motor 49 for eject operation to be subjected to drive control only so as to accommodate the tray 84 drawn out in this way into the accommodating unit 73. In the case where it is not detected by the first and second tray position detecting switches 154, 153 that the tray 84 is drawn out from the accommodating unit 73 by the eject mechanism 230, i.e., when all trays 84 are placed in the state accommodated within the accommodating unit 73, the system control unit 146 permits the drive motor 49 for eject operation to be subjected to drive control only in a direction of drawing out the tray 84 from the accommodating unit 73.

In the initial state where power is turned ON, the system control unit 146 discriminates the state of the loading mechanism 220 and the chucking mechanism 221 by accommodation position detecting switch 149 for detecting the state where the tray 84 is accommodated within the accommodating unit 73, draw-out position detecting switch 150 for detecting that the tray 84 is drawn out from the accommodating unit 73 by the loading mechanism 220, disc loading position detecting switch 151 for detecting that the tray 84 is moved to the disc drive unit 7 side and optical disc 201 or 202 mounted on the tray 84 is loaded onto the disc drive unit 7, and tray insertion/withdrawal position detecting switch 152 for detecting whether or not chucking frame 12 constituting the loading mechanism 220 is located at the position where it can insert the tray 84 into the accommodating unit 73 or withdraw it therefrom.

When it is detected that the chucking frame 12 is in the state moved to the disc driving unit 7 side at the time of turning ON of power, the system control unit 146 drives the drive motor 51 for chucking through a motor drive control circuit section 183 to move the chucking frame 12 to the rising position spaced from the disc driving unit 7. When the movement block 97 is placed in the state where it is moved toward backward side in a direction to draw out the tray 84 from the accommodating unit 73, the system control unit 146 drives the drive motor 50 for loading through a motor drive control circuit section 182 to move it to the front position where the tray 84 is permitted to be drawn out from the accommodating unit 73. Namely, in the disc player of this embodiment, in the initial state after power is turned ON, as shown in FIG. 3, the chucking frame 12 is placed at an upper position spaced from the disc driving unit 7 side. Moreover, the movement block 97 constituting the loading mechanism 220 is positioned at the forward side located at the accommodating unit 73 side as shown in FIG. 11 to allow the engagement projection 99 to be faced to the engagement recessed portion 92 of the tray 84 accommodated within the accommodating unit 73, thus placing the tray 84 in the state where it can be drawn out from the accommodating unit 73.

Moreover, when power is turned ON, in the case where there is no detection output from the second position detecting switch 147 for detecting the initial position of the accommodating unit 73, and it is not detected that the accommodating unit 73 is located at the initial position, the system control unit 146 drives the vertical movement drive motor 52 through a motor drive control circuit section 184 to move the accommodating unit 73 toward the lower side in the B direction indicated by arrow in FIG. 3. Thus, the vertical movement drive motor 52 continues to be driven until the accommodating unit 73 allows the second position detecting switch 147 for detecting the initial position of the accommodating unit 73, which is disposed on the bottom surface 2 of the chassis 1, to undergo pressing operation to move the accommodating unit 73 to the initial position. When the second position detecting switch 147 for detecting the initial position of the accommodating unit 73 is caused to undergo pressing operation, the first detecting switch 148 for detecting the support position of the accommodating unit 73 is reset as the result of the fact that it is subjected to pressing operation by supporting plate 108 for supporting the accommodating unit 73.

In this example, the system control unit 146 detects the height position of the accommodating unit 73 in such a manner that the second position detecting switch 147 is caused to undergo pressing operation so that the accommodating unit 73 is moved to the initial position, whereupon the supporting plate 108 is caused to undergo reciprocating operation by the vertical movement drive motor 52, and the first detecting switch 148 counts the number of pressing times of the first detecting switch 148 by the supporting plate 108.

After the accommodating unit 73 is moved to the initial position, a tray select push-button provided on the operation unit 177 is operated thus to select the tray 84 accommodated within the accommodating unit 73. Such selection of tray 84 is carried out by designating an arbitrary one of addresses of the tray accommodation steps of the accommodating unit 73. These addresses are assigned in order toward the lower step side with the uppermost step of the accommodating unit 73 being the first address 1. When the tray select push-button provided at the operation unit 177 is operated so that a desired address is designated, the vertical movement drive motor 52 is driven to allow the cam plate 109 and the supporting plate 108 to respectively undergo reciprocating operation in the $W_1$ direction indicated by arrow and the $W_2$ direction indicated by arrow, and in the $V_1$ direction indicated by arrow and the $V_2$ direction indicated by arrow in FIG. 20 thus to move the accommodating unit 73 in a rising direction of the A direction indicated by arrow in FIG. 2. At this time, the system control unit 146 counts the number of pressing operations of the first detecting switch 148 pressed when the supporting plate 108 is moved in the $V_2$ direction indicated by arrow in FIG. 20 to detect height position of the accommodating unit 73, i.e., position of the step where the accommodating unit 73 has risen from the initial position. When the number of pressing operations of the first detecting switch 148 by the supporting plate 108 and the address of the tray 84 accommodated within the accommodating unit 73 are in correspondence with each other, the system control unit 146 stops the vertical movement drive motor 52 through the motor drive control circuit section 182. At this time, the tray 84 accommodated within the tray accommodation step of the designated address corresponds to the movement block 97. Namely, there results the state where the engagement projection 99 of the movement block 97 is engaged with the engagement recessed portion 92 of the tray accommodated at the designated address.

Then, the system control unit 146 controls the motor drive control circuit section 182 to drive the drive motor 50 for loading so as to move the movement block 97 toward the backward side in the $O_2$ direction indicated by arrow in FIG. 17. When the movement block 97 is moved in the $O_2$ direction indicated by arrow in FIG. 17, the tray 84 which has caused the engagement projection 99 of the movement block 97 to be engaged with the engagement recessed portion 92 is moved in the D direction indicated by arrow in FIG. 6 and in the K direction indicated by arrow in FIG. 13 in one body with the movement block 97, and is drawn out from the accommodating unit 73. The tray 84 which has been drawn out from the accommodating unit 73 is opposed to the accommodating unit 73, and is inserted into the tray holding portion 12a of the chucking frame 12 disposed at a height position corresponding to the movement block 97. When the movement block 97 is moved in the $O_2$ direction indicated by arrow in FIG. 17, and is moved to the position where the tray 84 drawn out from the accommodating unit 73 is insertion-held by the tray holding portion 12a of the chucking frame 12 as shown in FIGS. 6 and 13, the draw-out position detecting switch 150 is caused to undergo pressing operation. Thus, it is detected that the tray 84 has been drawn out from the accommodating unit 73. When it is detected by the draw-out position detecting switch 150 that the tray 84 has been drawn out, this detection output is inputted to the system control unit 146. Thus, the system control unit 146 stops the loading drive motor 50 through the motor drive control circuit section 182.

When it is detected by the draw-out position detecting switch 150 that the tray 84 drawn out, from the accommodating unit 73 has been held by the chucking frame 12 and the loading drive motor 50 is stopped, the system control unit 146 drives the chucking-drive motor 51 through the motor drive control circuit section 182. At this time, the chucking drive motor 51 rotates so as to move a pair of vertical movement operation plates 23, 23 in the P and Q directions indicated by arrow in FIG. 18 in order to move the chucking frame 12 toward the lower direction of the disc drive unit 7 side in the GI direction indicated by arrow in FIG. 8 and in the T direction indicated by arrow in FIG. 18. When a pair of vertical movement operation plates 23, 23 are moved in the P and Q directions indicated by arrow in FIG. 18, supporting pins 19, 20 are moved toward the lower side of inclined cam grooves 30, 31 provided at the vertical movement operation plates 23, 23, whereby the chucking frame 12 is fallen toward the disc driving unit 7 side in the $G_1$ direction indicated by arrow in FIG. 8. When the chucking frame 12 is moved toward the disc driving unit 7 side, optical disc 201 or 202 mounted on the tray 84 held by the tray holding portion 12a is mounted on the disc table 10. At this time, the chucking plate 18 provided at the top plate 14 of the chucking frame 12 is caused to be in pressure contact with the portion on the disc table 10, thus to clamp the optical disc 201 or 202 loaded (mounted) on the disc table 10 in the state where it can be rotated in one body with the disc table 10.

It is to be noted that when the chucking frame 12 which has held the tray 84 is moved toward the disc driving unit 7 side, the engagement projection 99 of the movement block 97 is withdrawn from the engagement recessed portion 92 of the tray 84.

When a pair of vertical movement operation plates 23, 23 are moved in the P and Q directions indicated by arrow in FIG. 18, and the chucking frame 12 is fallen as shown in FIG. 10 down to the position where it is loaded (mounted) on the disc table 10, the disc loading position detecting switch 151 is caused to undergo pressing operation by one vertical movement operation plate 23 disposed along the side plate 4 of the left side. Thus, it is detected that the optical disc 201 or 202 has been loaded (mounted) on the disc table 10. When it is detected by the disc loading position detecting switch 151 that the optical disc 201 or 202 has been loaded (mounted) on the disc table 10, its detection output is inputted to the system control unit 146. Thus, the system control unit 146 stops the chucking drive motor 51 through the motor drive control circuit section 182 on the basis of the detection output. The chucking drive motor 51 is stopped, whereby a loading operation from drawing-out of the tray 84 from the accommodating unit 73 up to loading (mounting) onto the disc drive unit 7 of the optical disc 201 or 202 mounted on the tray 84 is completed.

Meanwhile, in the disc player of this embodiment, information indicating whether or not optical disc 201 or 202 is mounted on respective trays 84 accommodated within the accommodating unit 73 is stored in the memory of the system control unit 146. Accordingly, in the case where tray 84 on which optical disc 201 or 202 is not mounted is designated, the system control unit 146 inhibits the drawing-out operation from the accommodating unit 73 of the tray 84 without starting drive of the chucking drive motor 51. It is to be noted that in the case where the tray 84 on which optical disc 201 or 202 is mounted is designated for a second time, the chucking drive motor 51 is caused to be driven to start loading operation as described above.

Then, loading onto the disc driving unit 7 of the optical disc 201 or 202 mounted on the tray 84 is completed and drive operations of the disc driving unit 7 and the optical pick-up section 9 are started. Thus, reproduction of information signals such as music signals, etc. recorded on the optical disc 201 or 202 is carried out. When reproduction of the optical disc 201 or 202 is completed, the system control unit 146 drives, in a reverse direction, the chucking drive motor 51 through the motor drive control circuit section 182 so as to move it in a rising direction which is the $G_2$ direction indicated by arrow in FIG. 10 in a manner opposite to the previously described direction to fall the chucking frame 12. When the chucking drive motor 51 is driven in a reverse direction, a pair of vertical movement operation plates 23, 23 are moved in the R and S directions indicated by arrow in FIG. 18. As a result, the supporting pins 19, 20 are moved toward the upper side of inclined cam grooves 30, 31 of the vertical movement operation plates 23, 23. Thus, the chucking frame 12 is moved to the position spaced from the disc driving unit 7. When the chucking frame 12 is moved upwardly, the chucking plate 18 is also spaced from the disc table 10 to release clamping onto the disc table 10 of the optical disc 201 or 202. Thus, the optical disc 201 or 202 which has been loaded on the disc table 10 is mounted into the first or second accommodating recessed portion 85 or 86 of the tray 84 held by the tray holding portion 12a for a second time.

When the chucking drive motor 51 is driven in a reverse direction, a pair of vertical movement operation plates 23, 23 are moved in the R and S directions indicated by arrow in FIG. 18, and the chucking frame 12 is moved up to the rising position where the chucking frame 12 is opposed to the movement block 97 constituting the loading mechanism 220, the tray insertion/withdrawal position detecting switch 152 is caused to undergo pressing operation by the other vertical movement operation plate 23 disposed along the side plate 3 of the right side. Thus, it is detected that the chucking frame has been returned to the rising position. As a result, its detection output is inputted to the system control circuit section 146. Thus, the system control unit 146 stops the chucking drive motor 51 through the motor drive control circuit section 182 on the basis of its detection output.

When the chucking frame 12 is returned to the rising position, the movement block 97 is engaged with the engagement recessed portion 92 of the tray 84 held by the chucking frame 12.

When it is detected that the clucking frame 12 is returned to the rising position and the chucking drive motor 51 is stopped, the system control unit 146 drives, in a reverse direction, the loading drive motor 50 through the motor drive control circuit section 182 to drive the movement block 97 in the accommodating unit 73 direction of the $O_1$ direction indicated by arrow in FIG. 17. When the movement block 97 is moved in the $O_1$ direction indicated by arrow in FIG. 17, the tray 84 held within the chucking frame 12 is accommodated within the accommodating unit 73. At this time, the tray 84 is accommodated at the accommodating position of the own designated address within the accommodating unit 73. In the case where the tray 84 accommodated within the accommodating unit 73 from the chucking frame 12 and the accommodating position at which the tray 84 is accommodated are not in correspondence with each other, the motor drive control circuit section 184 is controlled by a control signal from the system control unit 146. As a result, the vertical movement drive motor 52 is driven, and vertical movement operation of the accommodating unit 73 is carried out. Thus, the tray 84 to be accommodated and the accommodating position are caused to be in correspondence with each other.

When the movement block 97 is moved up to the position where the tray 84 held at the chucking frame 12 is caused to be accommodated into the accommodating unit 73, the accommodating position detecting switch 149 is caused to undergo pressing operation by the movement block 97. As a result, the driving in reverse direction of the loading drive motor 50 is stopped. Thus, accommodating operation into the accommodating unit 84 of the tray 84 is completed. By accommodation into the accommodating unit 73 of the tray 84, reproduction operation of the selected one optical disc 201 or 202 is completed.

When any other tray 84 accommodated at another address of the accommodating unit 73 is selected, drawing-out operation of the tray 84 is carried out in the same manner as in the previously described case. As a result, loading operation up to loading onto the disc driving unit 7 is carried out. Thus, reproduction of the optical disc 201 or 202 mounted on the tray 84 is carried out. After reproduction of the optical disc 201 or 202 mounted on the tray 84 is carried out, the optical disc 201 or 202 is accommodated for a second time within the accommodating unit 73 along with the tray 84 on which the optical disc 201 or 202 is mounted so that there results original state.

In the case where after power is turned ON, any other tray 84 is drawn out from the accommodating unit 73 subsequently to reproduction of the optical disc 201 or 202 mounted on the tray 84 first selected, an approach is employed to calculate a position where the accommodating unit 73 is to be moved from the address corresponding to the position where the accommodating unit 73 is positioned at present and the address corresponding to the position where the selected tray 84 is accommodated to control the motor drive control circuit section 184 to control rotational direction of the vertical movement drive motor 52 to allow the accommodating unit 73 to undergo vertical movement operation to allow the selected tray 84 to correspond to the movement block 97 constituting the loading mechanism 220.

In the disc player of this embodiment, irrespective of whether or not the optical disc mounted on the tray 84 accommodated within the accommodating unit 73 is loaded onto the disc driving unit 7 and reproduction operation is being conducted, an eject operation to selectively draw out the tray 84 accommodated within the accommodating unit 73 toward the external of the outer casing 125 is carried out.

Figure 14:
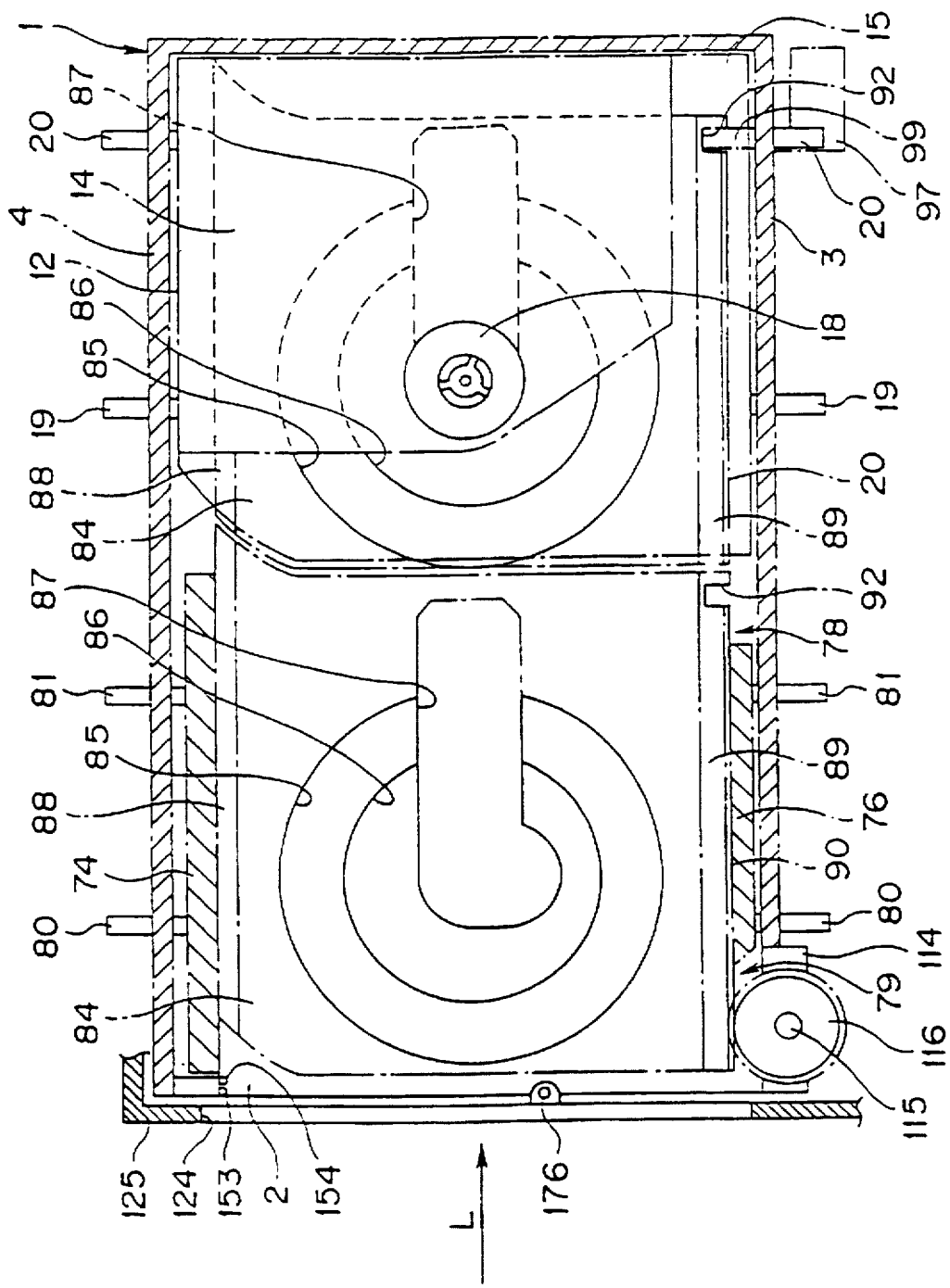
FIG. 14 is a plan view showing the state where one tray is drawn out to the loading position and other trays are accommodated within the accommodating unit.

Namely, when there results the state where the movement block 97 which allows the tray 84 accommodated within the accommodating unit 73 to undergo drawing-out operation is moved to the accommodating unit 73 side as shown in FIGS. 2, 3 and 11 to allow the accommodating position detecting switch 149 to undergo pressing operation, whereby it is detected that the movement block 97 is positioned at the accommodating unit 73 side which permits the movement block 97 to draw out the tray 84 from the accommodating unit 73, and when there results the state where the movement block 97 is moved to the position where it has drawn the tray 84 from the accommodating unit 73 as shown in FIGS. 8, 9 and 14 to allow the draw-out position detecting switch 150 to undergo pressing operation to allow the movement block 97 to draw out the tray 84 from the accommodating unit 93, whereby it is detected that the movement block 97 has been moved to the position where it is accommodated within the chucking frame 2, an eject operation to selectively the tray 84 accommodated within the accommodating unit 73 toward the external of the outer casing 125 is enabled.

When the movement block 97 is in the state where it has been moved to the accommodating unit 73 side, the engagement projection 99 is placed in the state faced to the engagement recessed portion of the tray 84 accommodated within the accommodating unit 73. As a result, the engagement projection 99 can be moved within the engagement recessed portions 92 of respective trays 84 accommodated in a multi-step form within the accommodating unit 73. Thus, vertical movement operation of the accommodating unit 73 is enabled. Moreover, when the movement block 97 is moved up to the position where it has drawn out the tray 48 from the accommodating unit 73, the accommodating unit 73 is permitted to desirably undergo vertical movement operation.

In order to select an arbitrary tray 84 from the accommodating unit 73 to draw out is toward the external of the outer casing 125, the eject tray select push-button provided on the operation unit 177 is operated thus to select tray 84 to be ejected from a plurality trays 84 accommodated within the accommodating unit 73.

When the tray 84 to be ejected is designated, the system control unit 146 controls the motor drive control circuit section 184 in accordance with the designated address to cause the vertical movement drive motor 52 to be driven to allow the cam plate 109 and the supporting plate 108 to undergo reciprocating operation in the $W_1$ direction indicated by arrow and the $W_2$ direction indicated by arrow and in the $V_1$ direction indicated by arrow and the $V_2$ direction indicated by arrow in FIG. 20. When the accommodating unit 73 is located at the lowest position within the outer casing 125, the vertical movement drive motor 52 is driven so as to raise the accommodating unit in the A direction indicated by arrow in FIG. 2 to allow the pinion gear 116 constituting the eject mechanism 230 to be meshed with the rack gear portion 90 provided at the tray 84 accommodated at the address where the eject operation has been designated. When the accommodating unit 73 is located at the uppermost position within the outer casing 125, the vertical movement drive motor 52 is driven so as to raise the accommodating unit in the B direction indicated by arrow in FIG. 3 to allow the pinion gear 116 constituting the eject mechanism 230 to be meshed with the rack gear portion 90 provided at the tray 84 accommodated at the address where the eject operation has been designated. Further, in the case where the accommodating unit 73 is positioned at the intermediate portion extending in upper and lower directions within the outer casing 125, the address where the tray 84 with which the pinion gear 116 constituting the eject mechanism 230 is meshed is accommodated and the address in which the eject operation has been designated are compared with each other at the system control unit 146 to control the rotational direction of the vertical movement drive motor 52 in dependency upon the operation result thereof to allow the accommodating unit 73 to undergo vertical movement operation in the F direction indicated by arrow in FIG. 8 to allow the pinion gear 116 to be meshed with the rack gear portion 90 of the tray 84 accommodated at the address where the eject operation has been designated.

At this time, the tray 84 caused to undergo eject operation is placed at the position opposite to the insertion/withdrawal hole 124 provided at the front side of the outer casing 125.

It is to be noted that in the case where, at the time of eject operation, the address where the tray which has been drawn out from the accommodating unit 73, has been held by the chucking frame 12, and loaded (mounted) on the disc driving unit 7 is accommodated is designated, the eject operation is inhibited by the system control unit 146. In this case, display to the effect that the eject operation is inhibited, e.g., display indicating that the optical disc is being reproduced, etc. is displayed on the display section provided at the front surface side of the outer casing 125.

When the accommodating unit 73 is caused to undergo vertical movement operation so that it is located at the position where the rack gear portion 90 of the tray 84 accommodated at the address where the eject operation his been designated is meshed with the pinion gear 116, the system control unit 146 stops the vertical movement drive motor 52 through the motor drive control circuit section 184. Subsequently to stoppage of the vertical movement drive motor 52, the system control unit 146 drives the drive motor 49 for ejection operation through the motor drive control circuit section 181 to rotationally operate the pinion gear 116 to move the tray 84 in the C direction indicated by arrow in FIG. 5 and in the J direction indicated by arrow in FIG. 12 to allow it to undergo drawing-out operation toward the external of the outer casing 125 through the insertion/withdrawal hole 124.

The state shown in FIG. 5 is the state where all trays 84 are accommodated within the accommodating unit 73, and the state where one tray 84 is caused to selectively undergo eject operation. If the accommodating unit 73 is in the vertically movable state, the eject operation can be made. At the loading position where other tray 84 is drawn out from the accommodating unit 73 as shown in FIG. 6, is accommodated within the chucking frame 12, and can be loaded on the disc driving unit 7, or also in the state where other tray 84 is drawn out from the accommodating unit 73 as shown in FIGS. 9 and 10 and the optical disc 201 or 202 mounted on the tray 84 is loaded on the disc driving unit 7, the eject operation drive motor 49 is driven to select a desired tray 84 to move it in the H direction indicated by arrow in FIGS. 9 and 10, thus making it possible to carry out drawing-out operation toward the external of the outer casing 125 through the insertion/withdrawal hole 124.

Meanwhile, when the eject operation drive motor 49 starts driving so that the tray 84 starts movement toward the insertion/withdrawal 124 side of the outer casing 125, the first tray position detecting switch 154 is caused to undergo pressing-operation by the side end edge portion of one supporting piece 88 of the tray 84 as previously described. Thus, it is detected that the eject operation of the tray 84 has been started. When it is detected by the first tray position detecting switch 154 that the eject operation of the tray 84 has been carried out, since at least a portion of the tray 84 is placed in the state where it has been drawn out from the accommodating unit 73, vertical movement operation of the accommodating unit 73 is inhibited. Namely, this is because when the tray 84 is in the eject state and the accommodating unit 73 is caused to undergo vertical movement operation, the tray 84 being subjected to eject operation and the optical disc 201 or 202 mounted on the tray 84 may be damaged.

When the eject operation drive motor 49 is driven and the tray 84 is moved to the eject position drawn out toward the external of the outer casing 125 as shown in FIGS. 5, 6, 9, 10, 12 and 13, the second tray position detecting switch 153 is caused to undergo pressing operation by the side surface portion of the tray 84 of the rising surface 155 backward side of the backward end side of one supporting piece 88 in addition to the first tray position detecting switch 154, so it is detected that the tray 84 has reached the eject position. As a result, the drive motor 49 is stopped. Thus, the eject operation is completed.

When the tray 84 is drawn out toward the external of the outer casing 125, since the first and second accommodation recessed portions 88, 89 on which optical disc 201 or 202 is mounted, which are provided at this tray 84, are faced to the external of the outer casing 125 as shown in FIGS. 12 and 13, it is possible to exchange the optical disc 201 or 202 mounted on the first or second accommodation recessed portion 88, 89 by a desired one.

Moreover, the tray 84 which has undergone eject operation, which has been drawn out in an external direction of the outer casing 125, is drawn into the outer casing 125 through the insertion/withdrawal hole 124 by operating the tray accommodation operation push-button provided on the operation unit 177 to drive the eject operation drive motor 49 in a reverse direction to rotationally operate the pinion gear 116 to move the tray 84 in the E direction indicated by arrow in FIG. 7 and in the L direction indicated by arrow in FIG. 14. When the tray 84 is drawn to the position where it is accommodated within the accommodating unit 73, pressing state of the first and second tray position detecting switches 154, 155 is released. As a result, it is detected that the tray 84 has been accommodated within the accommodating unit 73, so the eject operation drive motor 49 is stopped. Thus, accommodation into the accommodating unit 73 of the tray 84 is completed.

Meanwhile, when the tray 84 is caused to undergo drawing-in operation into the outer casing 125, detection as to whether or not optical disc 201 or 202 is mounted on the tray 84 is carried out by the disc presence/absence detection sensor 176. When it is detected that optical disc 201 or 202 is mounted on the tray 84 which has undergone drawing-in operation, the number of the tray 84 is stored into the memory of the system control circuit section 146. This number of the tray 84 corresponds to the address where the tray 84 of the accommodating unit 73 is accommodated.

In a manner stated above, an approach is employed to detect presence/absence of optical disc 201 or 202 on the tray 84 ever eject operation of the tray 84 to store the number of the tray 84 on which the optical disc 201 or 202 is mounted into the memory of the system control circuit section 146, whereby information indicating on which any one of trays 84 accommodated within the accommodating unit 73 the optical disc 201 or 202 is mounted is stored, thus making it possible to draw out only the tray 84 on which the optical disc 201 or 202 is mounted to allow it to undergo loading onto the disc driving unit 7. Thus, it becomes possible to continuously reproduce the optical disc 201 or 202 mounted on the tray 84 accommodated within the accommodating unit 73.

Moreover, the system control circuit section 146 allows the display unit provided on the front surface side of the outer casing 125 to display information indicating on which any one of trays 84 accommodated within the accommodating unit 73 the optical disc 201 or 202 is mounted, e.g., address number of tray 84 on which the optical disc 201 or 202 is mounted. As the display unit, so called liquid crystal display panel, display comprised of a plurality of LED elements, or photoelectric display device, etc. may be used.

It is to be noted that, in the disc player of this embodiment, if height position of the tray 84 selected by the eject mechanism 230 is a position different from height position of the tray 84 selected by the loading mechanism 220, any position may be adopted. In order to allow height of the player itself to be low and to allow the disc player to become compact, it is desirable to allow the height position of the tray 84 selected by the eject mechanism 230 and height position of the tray 84 selected by the loading mechanism 220 to be close to each other.

Outline of various operating states executed in the disc player of this embodiment will now be described.

Initially, an operation state in which tray 84 accommodated at the address 1 which is the uppermost step position of the accommodating unit 73 is caused to undergo eject operation to exchange optical disc 201 or 202 mounted on the tray 84 to carry out reproduction of the optical disc 201 or 202 will now be described.

Figure 45:
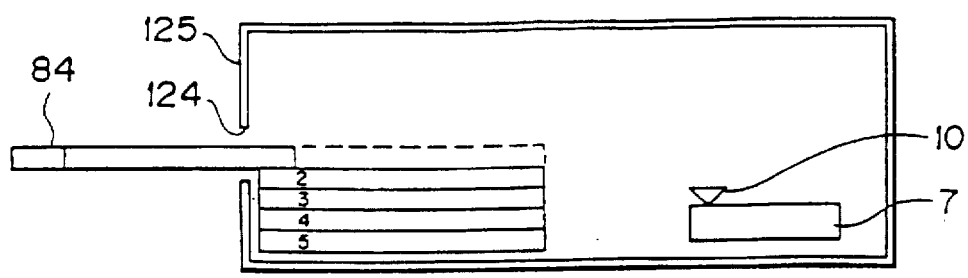
FIGS. 45 to 49 are side views showing, in a model form, the state where the tray accommodated at the uppermost step position of the accommodating unit is drawn out in an outward direction of the outer casing to exchange optical disc mounted thereon to reproduce it.
Figure 46:
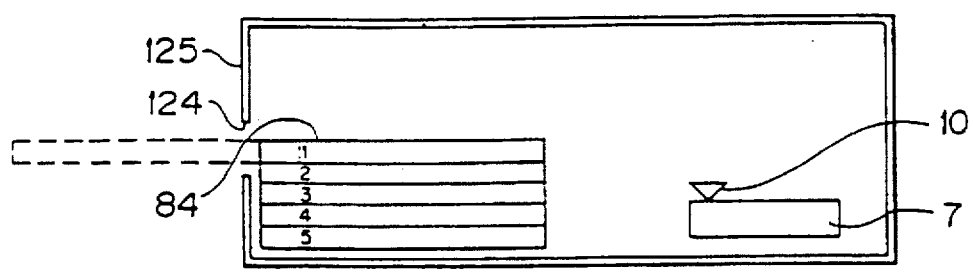

In order to allow the tray 84 accommodated at the address 1 which is the uppermost step position to undergo eject operation, the accommodating unit 73 is moved to the lowermost position within the outer casing 125 as shown in FIG. 45 to allow the tray 84 accommodated at the address 1 to be opposite to the insertion/withdrawal hole 124. Namely, when the accommodating unit 73 is located at the lowermost position, the tray 84 accommodated at the address 1 is opposite to the insertion/withdrawal hole 124, and the pinion gear 116 constituting the eject mechanism 230 is meshed with the rack gear portion 90 of the tray 84 accommodated at the address 1. Then, the eject operation drive motor 49 is driven to draw out the tray 84 in an external direction of the outer casing 125 through the insertion/withdrawal hole 124. In the state where the tray 84 has been drawn out, exchange of the optical disc 201 or 202 mounted on the tray 84 is carried out. After exchange of the optical disc 201 or 202 has been carried out, the eject operation drive motor 49 is driven in a reverse direction to draw in the tray 84 located at the eject position which has been drawn out in an external direction of the outer casing 125 into the outer casing 125 as shown in FIG. 46 to accommodate it at the accommodation position of the address 1 within the accommodating unit 73.

Figure 47:
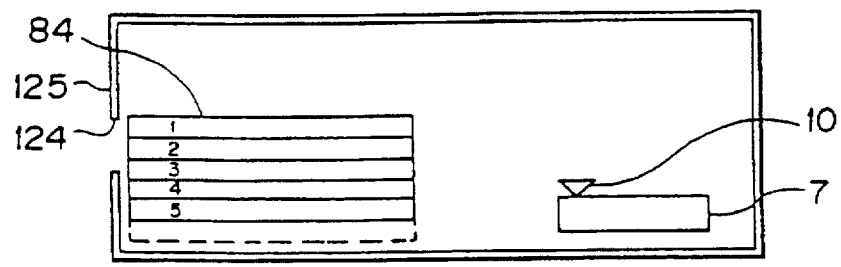
Figure 48:
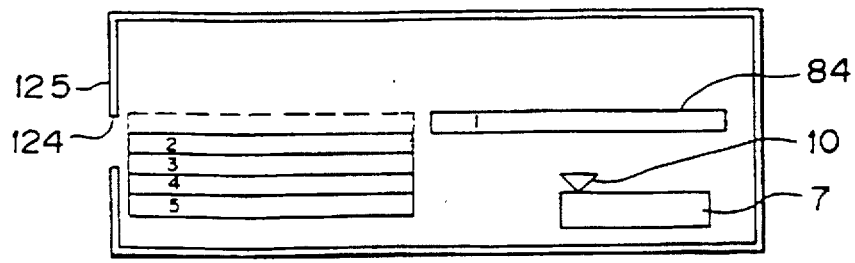
Figure 49:
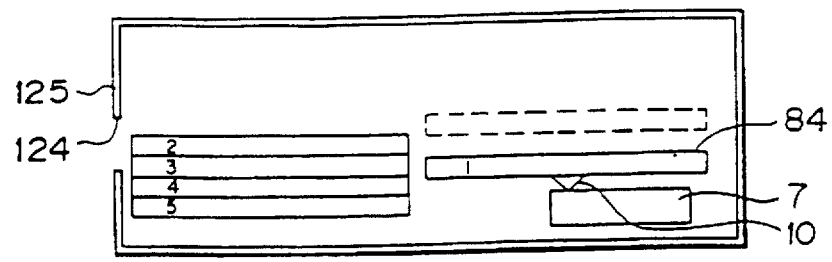
Figure 50:
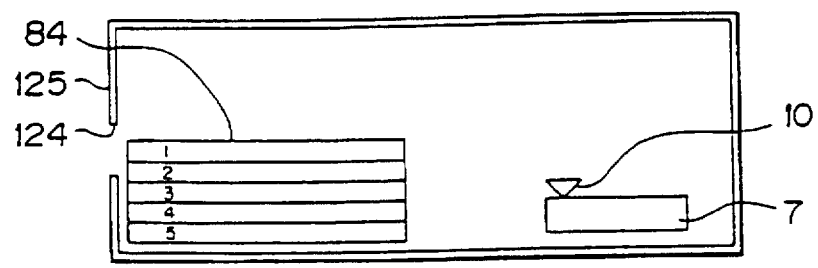
FIGS. 50 to 53 are side views showing, in a model form, the state where the tray accommodated within the accommodating unit is drawn out to reproduce the optical disc mounted on the tray.

Subsequently, the vertical movement drive motor 52 is driven to allow the accommodating unit 73 to undergo rising operation by one step as shown in FIG. 47 to allow the tray 84 accommodated at the address 1 to correspond to the movement block 97 constituting the loading mechanism 220. Then, the loading drive motor 50 is driven to move the movement block 97 to draw out the tray 84 accommodated at the accommodating position of the address 1 from the accommodating unit 73 as shown in FIG. 48 to allow the chucking frame 12 to accommodate and hold it. At the time point when the chucking frame 12 is caused to accommodate and hold the tray 84, the chucking drive motor 51 is driven to fall the chucking frame 12 toward the disc drive unit 7 side to allow the optical disc 201 or 202 mounted on the tray 84, which has been held by the chucking frame 12, to undergo loading onto the disc table 10 of the disc driving unit 7 as shown in FIG. 49 to carry out reproduction. When reproduction of the optical disc 201 or 202 is completed, the optical disc 201 or 202 is mounted on the tray 84 via an operation opposite to the above-described operation. Thus, such optical disc is accommodated and restored at the accommodating position of the address 1 of the accommodating unit 73.

The operation for allowing power to be turned ON to reproduce the optical disc 201 or 202 mounted on the tray 84 which is placed in the state accommodated within the accommodating unit 73 will now be described.

Figure 51:
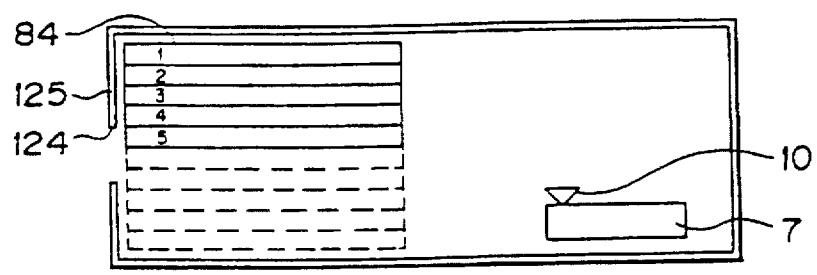
Figure 52:
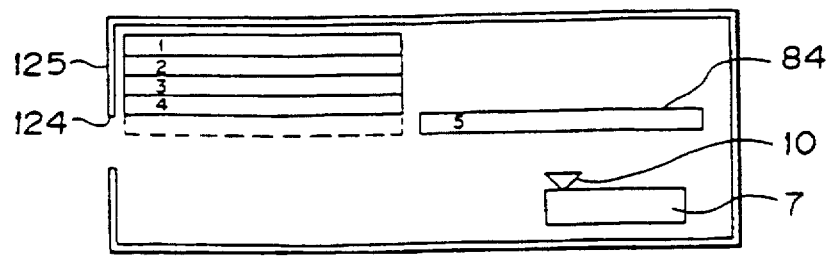
Figure 53:
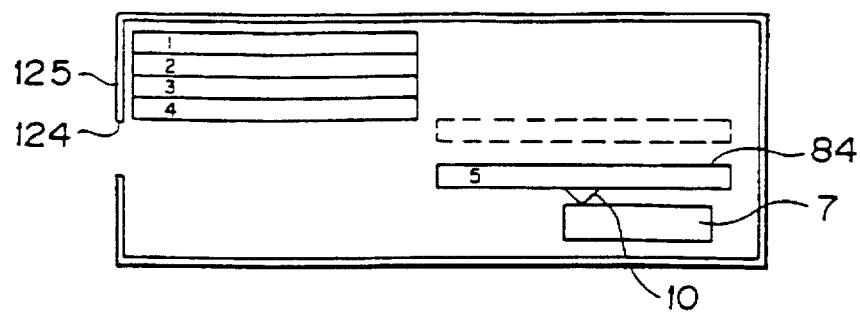
Figure 54:
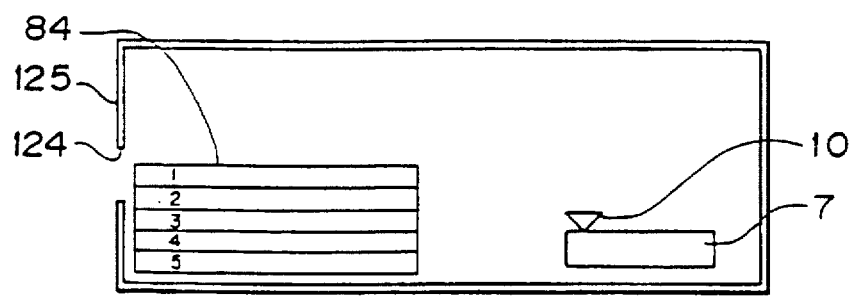
FIG. 54 to 56 are side views showing, in a model form, the state where the tray accommodated at the uppermost step position of the accommodating unit is drawn out outwardly of the outer casing.

For example, the operation for reproducing the optical disc 201 or 202 mounted on the tray 84 accommodated at address 5 which is the lowermost step position of the accommodating unit 73 will now be described. Initially, the vertical movement drive motor 52 is driven to move the accommodating unit 73 to the initial position of the lowest position within the outer casing 125. Subsequently to movement to the lowest position of the accommodating unit 73, the vertical movement drive motor 52 is driven for a second time to raise the accommodating unit 73 until the tray 84 accommodated at the address 5 is located at the position corresponding to the movement block 97 as shown in FIG. 51. At the time point when the tray 84 accommodated at the address 5 is caused to correspond to the movement block 97, the loading drive motor 50 is driven to move the movement block 97 to draw out the tray 84 accommodated at the accommodating position of the address 5 as shown in FIG. 52 to allow the chucking frame 12 to accommodate and hold it. At the time when the chucking frame 12 is caused to accommodate and hold the tray 84, the chucking drive motor 51 is driven to fall the chucking frame 12 toward the disc drive unit 7 side to allow the optical disc 201 or 202 mounted on the tray 84, which has been held by the chucking frame 12, to undergo loading onto the disc table 10 of the disc driving unit 7 as shown in FIG. 53 to carry out reproduction. When reproduction of the optical disc 201 or 202 is completed, the optical disc 201 or 202 is mounted on the tray 84 via an operation opposite to the above-described operation, and is accommodated and is restored at the accommodating position of the address 5 of the accommodating unit 73.

The state in which an eject operation to draw out an arbitrary tray 84 accommodated within the accommodating unit 73 in an external direction of the outer casing 125 is carried out will now be described.

Figure 55:
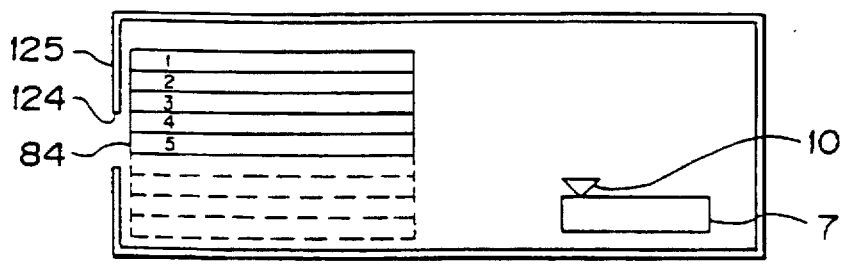
Figure 56:
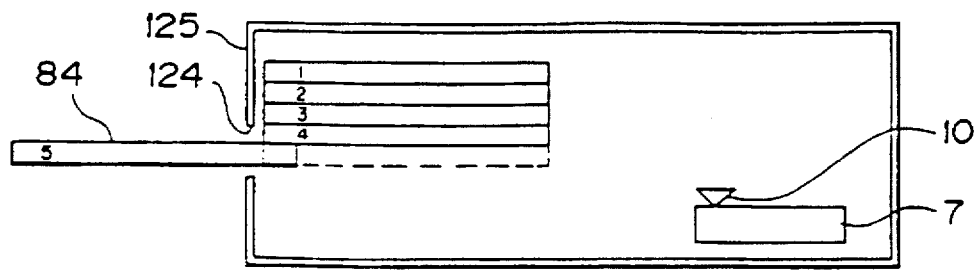

In order to allow the tray 84 accommodated at the address 5 of the lowermost step position of the accommodating unit 73 to undergo eject operation, for example, the eject tray select push-button provided at the operation unit 177 is operated to designate the tray 84 of the address 5. When designation of the tray 84 is carried out, the vertical movement drive motor 52 is driven to allow the accommodating unit 73 to undergo rising, operation from the state located at the lowest position within the outer casing 125 shown in FIG. 54 so that the tray 84 accommodated at the address 5 is moved to the position opposite to the insertion/withdrawal hole 124 as shown in FIG. 55. At this time point, the eject operation drive motor 49 is driven to draw out the tray 84 in an external direction of the outer casing 125 through the insertion/withdrawal hole 124 as shown in FIG. 56.

The state where an eject operation to draw out other tray 84 in an external direction of the outer casing 125 in the middle of loading optical disc 201 or 202 mounted on an arbitrary tray 84 accommodated within the accommodating unit 73 onto the disc driving unit 7 is carried out will now be described.

For example, the state where for a time period during which reproduction of optical disc 201 or 202 mounted on the tray 84 accommodated at the address 1 of the uppermost step position of the accommodating unit 73 is being carried out, the tray 84 accommodated at the address 5 of the lowermost step position of the accommodating unit 73 is caused to undergo eject operation to exchange the optical disc 201 or 202 mounted on the tray 84 to further allow the tray 84 accommodated at the address 1 of the accommodating unit 73 to undergo eject operation after reproduction of the optical disc 201 or 202 mounted on the tray 84 is completed will now be described.

Figure 57:
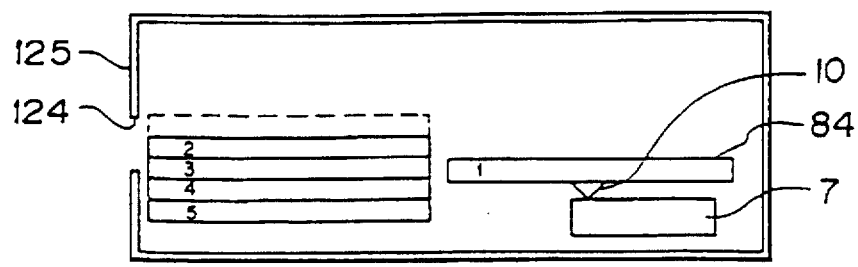
FIGS. 57 to 64 are side views showing, in a model form, the state where the optical disc mounted on one tray accommodated within the accommodating unit is reproduced to draw out, in an outward direction of the outer casing, any other tray in the middle of reproducing the optical disc mounted on the tray to exchange the optical disc mounted to further draw out, outwardly of the outer casing, the tray on which the once reproduced optical disc is mounted.
Figure 58:
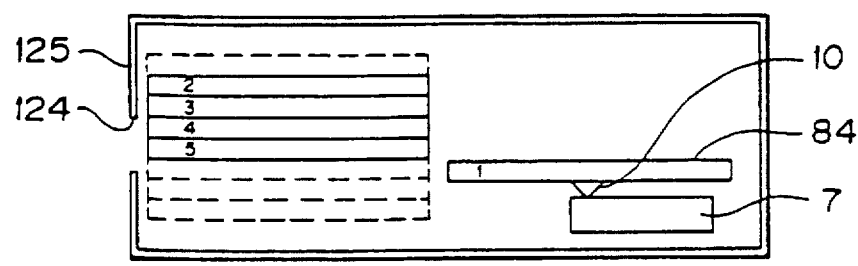
Figure 59:
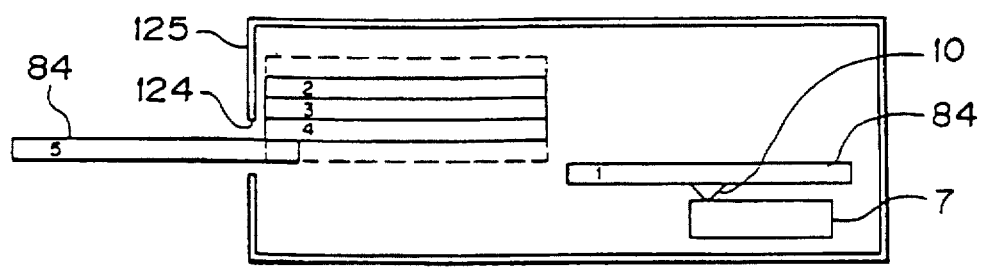
Figure 60:
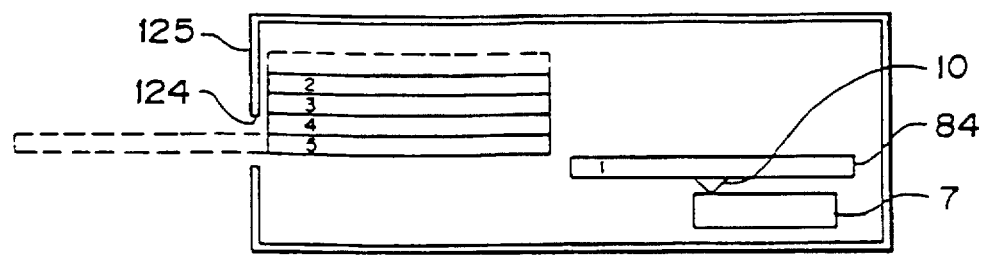

Initially, in order to carry out eject operation of tray 84 accommodated at the address 5 of the lowermost step position of the accommodating unit 73 in the process where optical disc 201 or 202 mounted on the tray 84 accommodated at the address 1 of the uppermost step position of the accommodating unit 73 is loaded on the disc driving unit 7 and is reproduced as shown in FIG. 57, the eject tray select push-button provided at the operation unit 177 is operated to designate the tray 84 of the address 5. When designation of the tray 84 is carried out, the vertical movement drive motor 52 is driven to move, in rising direction, the accommodating unit 73 up to the position where the tray 84 accommodated at the address 5 is opposite to the insertion/withdrawal hole 124 as shown in FIG. 58. At this time point, the ejection operation drive motor 49 is driven to draw out the tray 84 in the external direction of the outer casing 125 through the insertion/withdrawal hole 124 as shown in FIG. 59 to exchange the optical disc 201 or 202 mounted on the tray 84. After exchange of the optical disc 201 or 202 is carried out, the eject operation drive motor 49 is driven in a reverse direction to draw in the tray 84 located at the eject position which has been drawn out in an external direction of the outer casing 125 into the outer casing 125 as shown in FIG. 60 to allow the accommodating unit 73 to accommodate it at the accommodating position of address 5 therewithin. At this time, the accommodating unit 73 is kept in the state where the accommodating position of the address 5 is opposite to the insertion/withdrawal hole 124 of the outer casing 125 as shown in FIG. 60.

Figure 61:
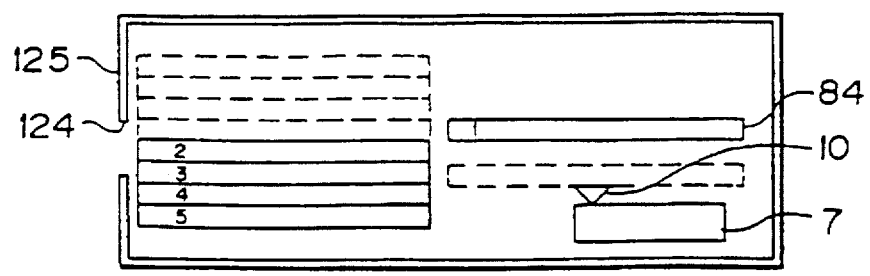
Figure 62:
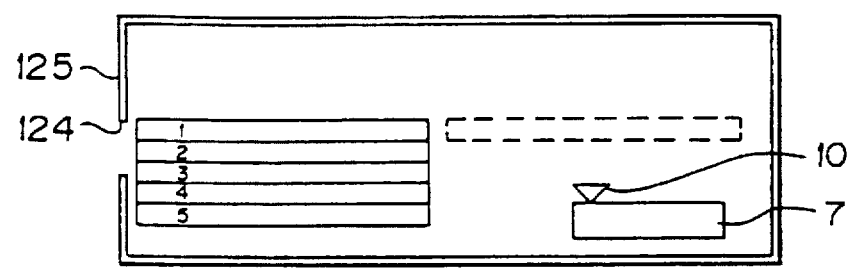
Figure 63:
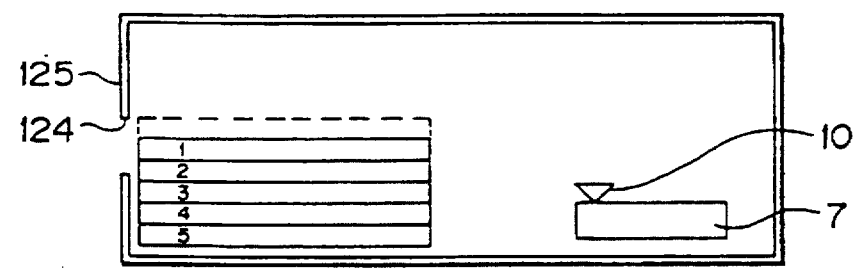
Figure 64:
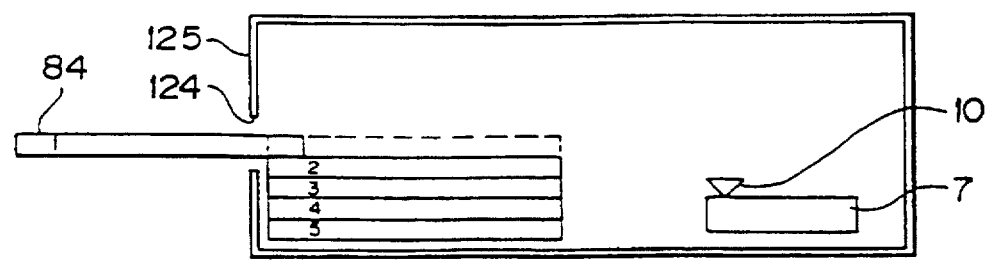

Then, the eject operation of the tray 84 which has been accommodated at the address 5 is carried out. After the tray 84 is accommodated at the original accommodating position, the chucking drive motor 51 is driven in a reverse direction to raise the chucking frame 12 from the disc drive unit 7 side as shown in FIG. 61 to mount the optical disc 201 or 202 on the tray 84 held by the chucking frame 12, and to drive the vertical movement drive motor 52 to fall the accommodating unit 73 to allow the accommodating position of the address 1 of the accommodating unit 73 to correspond to the chucking frame 12. Subsequently, the loading drive motor 50 is driven in a reverse direction to move the movement block 97 toward the accommodating unit 73 side to allow the tray 84 to be accommodated at the accommodating position of the address 1 as shown in FIG. 62. After accommodation into the accommodating unit 73 of the tray 84 is completed, the vertical movement drive motor 52 is driven for a second time to fall the accommodating unit 73 to allow the tray 84 accommodated at the address 1 to be opposite to the insertion/withdrawal hole 124 as shown in FIG. 63. At this time point, the eject operation drive motor 49 is driven to draw out the tray 84 in an external direction of the outer casing 125 through the insertion/withdrawal hole 124 as shown in FIG. 64. Then, an operation to exchange the optical disc 201 or 202 mounted on the tray 84, or the like is carried out to drive the eject operation drive motor 49 for a second time to draw in the tray 84 of the address 1 into the outer casing 125 to allow it to be accommodated at the accommodating position of the address 1 within the accommodating unit 73. Thus, a series of operations are completed.

Industrial Applicability

The disc recording and/or reproducing apparatus according to this invention is adapted so that the disc-shaped recording medium is loaded onto the recording and/or reproducing unit within the apparatus of this invention, whereby even when the apparatus is carrying out recording and/or reproducing operation, it is possible to selectively draw out the tray on which any other disc-shaped recording medium accommodated within the accommodating unit is mounted in external direction of the apparatus. Accordingly, it is possible to desirably exchange a desired disc-shaped recording medium, and it is possible to continuously carry out recording and/or reproduction with respect to disc-shaped recording media of which the number is greater than that of disc-shaped recording media accommodated within the accommodating unit.

What is claimed is:

1. A disc recording and/or reproducing apparatus, comprising:

an apparatus body with an opening formed in a front side thereof;

an accommodating unit within which a plurality of trays formed so that disc-shaped recording media can be respectively mounted are accommodated in parallel relation to each other and separated from each other by a predetermined distance, said accommodating unit disposed within and toward the front side of said apparatus body, said accommodating unit including a support pin extending from a side surface thereof;

vertical displacement means for displacing said accommodating unit in a direction perpendicular to a major surface of said disc-shaped recording media, said vertical displacement means comprising:

a first cam plate in facing relation to said side surface of said accommodating unit, said first cam plate including a driving slot, said support pin extending through said driving slot, said driving slot having a plurality of inclined portions arranged alternately with a plurality of horizontal portions in a vertically extending zig-zag pattern, the vertical displacement between each of said horizontal portions corresponding to said predetermined distance between said trays, a second cam plate arranged in facing relation to said first cam plate and including a holding slot, said support pin extending through said holding slot, said holding slot having an open area to accommodate vertical motion of said support pin and a plurality of supporting segments arranged to support said support pin in one of a plurality of predetermined vertical positions, and reciprocal cam driving means for driving said first and second cam plates horizontally along a direction parallel to said side surface of said accommodating unit with a predetermined phase difference therebetween, wherein when said second cam plate is driven in a first direction to disengage said support pin from said supporting segments and said first cam plate is driven in a second direction to move said support pin along said inclined portions of said driving slot said accommodating unit is raised or lowered by a distance equal to said predetermined distance between said trays, and when said second cam plate is driven in said second direction a one of said supporting segments supports said accommodating unit at a predetermined vertical position;

taking-out means for selectively drawing out one of said plurality of trays accommodated within the accommodating unit to take out the disc-shaped recording medium mounted on said taken out tray;

recording and/or reproducing means for carrying out recording and/or reproduction of information signals with respect to the disc-shaped recording medium taken out by the taking-out means, said recording and/or reproducing means disposed within and toward a rear side of said apparatus body; and eject means for drawing out a remaining tray accommodated within the accommodating unit through the opening in the front side of the apparatus body, while the recording and/or reproducing means disposed toward the rear side of the apparatus body is recording on or reproducing from the taken-out disc-shaped recording medium.

2. A disc recording and/or reproducing apparatus as set forth in claim 1 further comprising:

detecting means connected to said accommodating unit for detecting a displacement of the accommodating unit by the vertical displacement means; and control means for controlling the vertical displacement means on the basis of a detection signal from the detecting means, whereby the control means controls the vertical displacement means on the basis of the detection signal from the detecting means to position the taken out tray selected from the plurality of trays accommodated within the accommodating unit in alignment with the recording and/or reproducing means.

3. A disc recording and/or reproducing apparatus as set forth in claim 1 further comprising:

horizontal position detecting means for detecting a horizontal position of a selected tray; and control means for controlling respective operations of the taking-out means and the eject means, whereby the control means controls the operations of the taking-out means and the eject means on the basis of a detection signal from the horizontal position detecting means.

4. A disc recording and/or reproducing apparatus as set forth in claim 3 wherein the control means is operative so that when the horizontal position detecting means detects that the taken out tray is accommodated within the accommodating unit, and/or when the horizontal position detecting means detects that the taken out tray is drawn out from the accommodating unit, the control means allows the eject means to be operative so that the remaining trays accommodated within the accommodating unit can be drawn out in an external direction of the apparatus body through the opening in the front side thereof.

5. A disc recording and/or reproducing apparatus as set forth in claim 3 further comprising vertical detecting means connected to the accommodating unit for detecting a vertical displacement of said accommodating unit and for communicating the vertical displacement to the control means, whereby the control means controls the vertical displacement means on the basis of a detection signal from the vertical detecting means to position the tray selected from the plurality of trays accommodated within the accommodating unit in alignment with the recording and/or reproducing means.

6. A disc recording and/or reproducing apparatus as set forth in claim 3 further comprising initial position detecting means for detecting when the accommodation unit is in an initial vertical position and for communicating an initial vertical position signal to the control means, whereby the control means drives, prior to starting the recording and/or reproducing operation with respect to the disc-shaped recording medium, the vertical displacement means to carry out vertical movement of the accommodating unit to place the accommodating unit in the initial vertical position.

7. A disc recording and/or reproducing apparatus as set forth in claim 1 further comprising medium detecting means such that when an ejected tray drawn out in the external direction through the opening in the front side of the apparatus body by the eject means is returned into the apparatus body by the eject means, the medium detecting means detects whether there is a disc-shaped recording medium on the ejected tray.

8. A disc recording and/or reproducing apparatus as set forth in claim 1 wherein each of the plurality of trays is provided with at least one recessed portion formed at a side surface thereof, wherein the eject means is provided with an engagement projection for engagement with the recessed portion, and wherein the recessed portion of a selected tray of the plurality of trays accommodated within the accommodating unit and the engagement projection are relatively engaged with each other to thereby selectively draw out the selected tray from the accommodating unit.

9. A disc recording and/or reproducing apparatus as set forth in claim 1 wherein each of the plurality of trays is provided with a rack gear portion formed at a side surface thereof, and wherein the eject means is provided with a gear for engagement with the rack gear portion, whereby the gear and the rack gear portion of a selected tray are engaged with each other so that said selected tray is selectively drawn out in the external direction through the opening in the front side of the apparatus body from the accommodating unit.

10. A disc recording and/or reproducing apparatus as set forth in claim 9 wherein the gear is formed with teeth shaped so that two side surface portions of the teeth are tapered in a direction perpendicular to the rack gear portion.

11. A disc recording and/or reproducing apparatus comprising:

an apparatus body having an opening in a front side thereof;

an accommodating unit disposed at the front side within the apparatus body and within which a plurality of trays formed so that disc-shaped recording media can be respectively mounted are accommodated in parallel relation to each other and separated from each other by a predetermined distance, said accommodating unit including a support pin extending from a side surface thereof;

vertical displacement means for displacing said accommodating unit in a direction perpendicular to a major surface of said disc-shaped recording media, said vertical displacement means comprising:

a first cam plate in facing relation to said side surface of said accommodating unit, said first cam plate including a driving slot, said support pin extending through said driving slot, said driving slot having a plurality of inclined portions arranged alternately with a plurality of horizontal portions in a vertically extending zig-zag pattern, the vertical displacement between each of said horizontal portions corresponding to said predetermined distance between said trays, a second cam plate arranged in facing relation to said first cam plate and including a holding slot, said support pin extending through said holding slot, said holding slot having an open area to accommodate vertical motion of said support pin and a plurality of supporting segments arranged to support said support pin in one of a plurality of predetermined vertical positions, and reciprocal cam driving means for driving said first and second cam plates horizontally along a direction parallel to said side surface of said accommodating unit with a predetermined phase difference therebetween, wherein when said second cam plate is driven in a first direction to disengage said support pin from said supporting segments and said first cam plate is driven in a second direction to move said support pin along said inclined portions of said driving slot said accommodating unit is raised or lowered by a distance equal to said predetermined distance between said trays, and when said second cam plate is driven in said second direction a one of said supporting segments supports said accommodating unit at a predetermined vertical position;

taking-out means for selectively drawing out a first tray of the plurality of trays accommodated within the accommodating unit to take out a disc-shaped recording medium mounted on the first tray;

recording and/or reproducing means for carrying out recording and/or reproduction of information signals with respect to the disc-shaped recording medium taken out by the taking-out means, said recording and/or reproducing means disposed toward a rear side within the apparatus body;

eject means for selectively drawing out a tray remaining within the accommodating unit in an external direction of the apparatus body; and control means for independently driving and controlling the eject means and the taking-out means, whereby the taking-out means selectively draws out the first tray from the accommodating unit toward the recording and/or reproducing means in a rearward direction, and the eject means selectively draws out one of the remaining trays in a frontward direction through the opening in the front side of the apparatus body from the accommodating unit.

12. A disc recording and/or reproducing apparatus as set forth in claim 11 further comprising detecting means for detecting the vertical movement of the accommodating unit and for communicating a detection signal to said control means, whereby the control means controls the vertical displacement means on the basis of the detection signal from the detecting means to allow said first tray selected from the plurality of trays accommodated within the accommodating unit to be aligned with the recording and/or reproducing means.

13. A disc recording and/or reproducing apparatus as set forth in claim 11 further comprising position detecting means for detecting a horizontal position of a selected tray and for communicating a horizontal position signal to said control means for controlling respective operations of the taking-out means and the eject means, whereby the control means controls respective operations of the taking-out means and the eject means on the basis of the horizontal position signal from the position detecting means.

14. A disc recording and/or reproducing apparatus as set forth in claim 13 wherein when the position detecting means detects that the first tray is accommodated within the accommodating unit, and/or when the position detecting means detects that the first tray is drawn out from the accommodating unit, the control means allows the eject means to be operative so that said remaining trays accommodated within the accommodating unit can be drawn out in the external direction through the opening in the front side of the apparatus body.

15. A disc recording and/or reproducing apparatus as set forth in claim 11 further comprising detecting means for detecting the vertical movement of said accommodating unit and for communicating a detection signal to said control means, whereby the control means controls the vertical displacement means on the basis of the detection signal from the detecting means to allow said first tray selected from the plurality of trays accommodated within the accommodating unit to be aligned with the recording and/or reproducing means.

16. A disc recording and/or reproducing apparatus as set forth in claim 11 further comprising initial position detecting means connected to the control means for detecting an initial vertical position of the accommodating unit, whereby the control means drives, prior to starting the recording and/or reproducing operation with respect to the disc-shaped recording medium, the vertical displacement means to carry out vertical movement of the accommodating unit to place the accommodating unit in the initial vertical position.

17. A disc recording and/or reproducing apparatus as set forth in claim 11 further comprising medium detecting means such that when an ejected tray drawn out in the external direction through the opening in the front side of the apparatus body by the eject means is returned into the apparatus body by the eject means, the medium detecting means detects whether there is a disc-shaped recording medium on the ejected tray.

18. A disc recording and/or reproducing apparatus as set forth in claim 11 wherein each of the plurality of trays is provided with at least one recessed portion formed at a side surface thereof, and wherein the eject means is provided with an engagement projection for engagement with the recessed portion, whereby the recessed portion of a selected tray of the plurality of trays accommodated within the accommodating unit and the engagement projection are relatively engaged with each other to thereby selectively draw out the selected tray from the accommodating unit.

19. A disc recording and/or reproducing apparatus as set forth in claim 11 wherein each of the plurality of trays is provided with a rack gear portion formed at a side surface thereof, and wherein the eject means is provided with a gear for engagement with the rack gear portion, whereby the gear and the rack gear portion of a selected tray are engaged with each other so that one tray is selectively drawn out in the external direction through the opening in the front side of the apparatus body from the accommodating unit.

20. A disc recording and/or reproducing apparatus as set forth in claim 19 wherein the gear is formed with teeth shaped so that two side surface portions of the teeth are tapered in a direction perpendicular to the rack gear portion.

21. A disc recording and/or reproducing apparatus comprising:

an apparatus body having an opening in a front side thereof;

an accommodating unit disposed within said apparatus body toward the front side thereof within which a plurality of trays formed so that disc-shaped recording media can be respectively mounted are accommodated in parallel relation to each other, said accommodating unit including a support pin extending from a side surface thereof;

a recording and/or reproducing unit disposed toward a rear side of said apparatus body;

loading means for selectively drawing out remaining trays accommodated within the accommodating unit in an external direction through the opening in the front side of the apparatus body;

eject means for selectively drawing out a tray remaining within the accommodating unit in an external direction of the apparatus body;

vertical movement means for allowing the accommodating unit to undergo vertical movement with respect to the recording and/or reproducing unit, said vertical movement means comprising:

a first cam plate in facing relation to said side surface of said accommodating unit, said first cam plate including a driving slot, said support pin extending through said driving slot, said driving slot having a plurality of inclined portions arranged alternately with a plurality of horizontal portions in a vertically extending zig-zag pattern, the vertical displacement between each of said horizontal portions corresponding to a predetermined distance between said trays, a second cam plate arranged in facing relation to said first cam plate and including a holding slot, said support pin extending through said holding slot, said holding slot having an open area to accommodate vertical motion of said support pin and a plurality of supporting segments arranged to support said support pin in one of a plurality of predetermined vertical positions, and reciprocal cam driving means for driving said first and second cam plates horizontally along a direction parallel to said side surface of said accommodating unit with a predetermined phase difference therebetween, wherein when said second cam plate is driven in a first direction to disengage said support pin from said supporting segments and said first cam plate is driven in a second direction to move said support pin along said inclined portions of said driving slot said accommodating unit is raised or lowered by a distance equal to said predetermined distance between said trays, and when said second cam plate is driven in said second direction a one of said supporting segments supports said accommodating unit at a predetermined vertical position; and control means for independently controlling the loading means, the eject means and the vertical movement means, whereby the vertical movement means allows the loading means to load the tray containing the disc-shaped recording medium onto the recording and/or reproducing unit from the accommodating unit, and allows the eject means to selectively draw out the remaining trays in the external direction of the apparatus body from the accommodating unit.

22. A disc recording and/or reproducing apparatus as set forth in claim 21 wherein a selected tray is moved in a horizontal direction between a forward position where the selected tray is drawn out in the external direction of the apparatus body by the eject means through the accommodating unit and a rearward position where the selected tray can be subjected to loading onto the recording and/or reproducing unit.

23. A disc recording and/or reproducing apparatus as set forth in claim 21 wherein the loading means comprises taking-out means for selectively taking out trays from the accommodating unit, and a loading mechanism for loading a tray taken out by the taking-out means onto the recording and/or reproducing unit.

24. A disc recording and/or reproducing apparatus as set forth in claim 23 wherein each of the plurality of trays is provided with at least one recessed portion formed at a side surface thereof, and wherein the eject means is provided with an engagement projection for engagement with the recessed portion, whereby the recessed portion of a selected tray of the plurality of trays accommodated within the accommodating unit and the engagement projection are engaged with each other so that the selected tray is selectively drawn out from the accommodating unit.

25. A disc recording and/or reproducing apparatus as set forth in claim 21 wherein each of the plurality of trays is provided with a rack gear portion formed at a side surface thereof, and wherein the eject means is provided with a gear for engagement with the rack gear portion, whereby the gear and the rack gear portion of a selected tray of the plurality of trays accommodated within the accommodating unit are engaged with each other so that the selected tray is selectively drawn out in the external direction of the apparatus body from the accommodating unit.

26. A disc recording and/or reproducing apparatus as set forth in claim 25 wherein the gear is formed with teeth shaped so that two side surface portions of the teeth are tapered in a direction perpendicular to the rack gear portion.

* * * * *